United States Patent [19]

Ozawa et al.

[11] Patent Number: 5,210,931
[45] Date of Patent: May 18, 1993

[54] APPARATUS FOR ATTACHING AND DETACHING TRUNK OR A HOOD TO AND FROM A VEHICLE BODY

[75] Inventors: Shougo Ozawa, Hanno; Toru Yamamoto, Saitama; Yasuji Watanabe; Mituyoshi Obata, both of Kobe; Masahiko Yomota, Nishinomiya; Shizuo Maeda, Kobe, all of Japan

[73] Assignees: Honda Giken Kogyo Kabushiki Kaisha, Tokyo; Kabushiki Kaisha Kobe Seiko Sho, Kobe, both of Japan

[21] Appl. No.: 783,203

[22] Filed: Oct. 28, 1991

Related U.S. Application Data

[62] Division of Ser. No. 509,520, Apr. 13, 1990, Pat. No. 5,079,832.

[30] Foreign Application Priority Data

| Apr. 18, 1989 | [JP] | Japan | 1-97867 |
| Apr. 18, 1989 | [JP] | Japan | 1-97868 |
| Apr. 18, 1989 | [JP] | Japan | 1-97869 |

[51] Int. Cl.⁵ .............................................. B23P 21/00
[52] U.S. Cl. ........................................ 29/712; 29/709; 29/787
[58] Field of Search ............. 29/712, 709, 281.1, 29/281.5, 429, 430, 431, 771, 783, 787, 791

[56] References Cited

U.S. PATENT DOCUMENTS

| 4,589,184 | 5/1986 | Asano et al. | 29/791 |
| 4,589,199 | 5/1986 | Ohtaki et al. | 29/791 |
| 4,793,055 | 12/1988 | Shintani | 29/786 |
| 4,907,331 | 3/1990 | Kabuki et al. | 29/213.1 |
| 5,079,822 | 1/1992 | Arai et al. | 29/430 |

Primary Examiner—P. W. Echols
Assistant Examiner—Bryant, David P.
Attorney, Agent, or Firm—Oblon, Spivak, McClelland, Maier & Neustadt

[57] ABSTRACT

The present invention relates to an apparatus for automatically attaching and detaching such exterior parts as doors, a trunk, and a hood, etc. which are openably mounted to a vehicle body by way of tightening devices such as pins, bolts, etc. on the assembling line of a vehicle. The invention relates to a trunk or hood attaching and detaching apparatus in which a trunk or hood is opened with respect to a vehicle body by a trunk or hood opening and closing mechanism. A holding member which constitutes the holding mechanism is closed by a driving device positioned on a base plate, so that the holding member moves and follows the position of the trunk or hood, thereby causing the trunk or hood to be held. Also, the position of the screw member screwed in the vehicle body is detected by a detection mechanism, and simultaneously the position of a nut runner mechanism is compensated on the basis of the position of the screw member detected by the detection mechanism. Thereafter, the screw member can be tightened and loosened by the nut runner mechanism.

1 Claim, 51 Drawing Sheets (b)

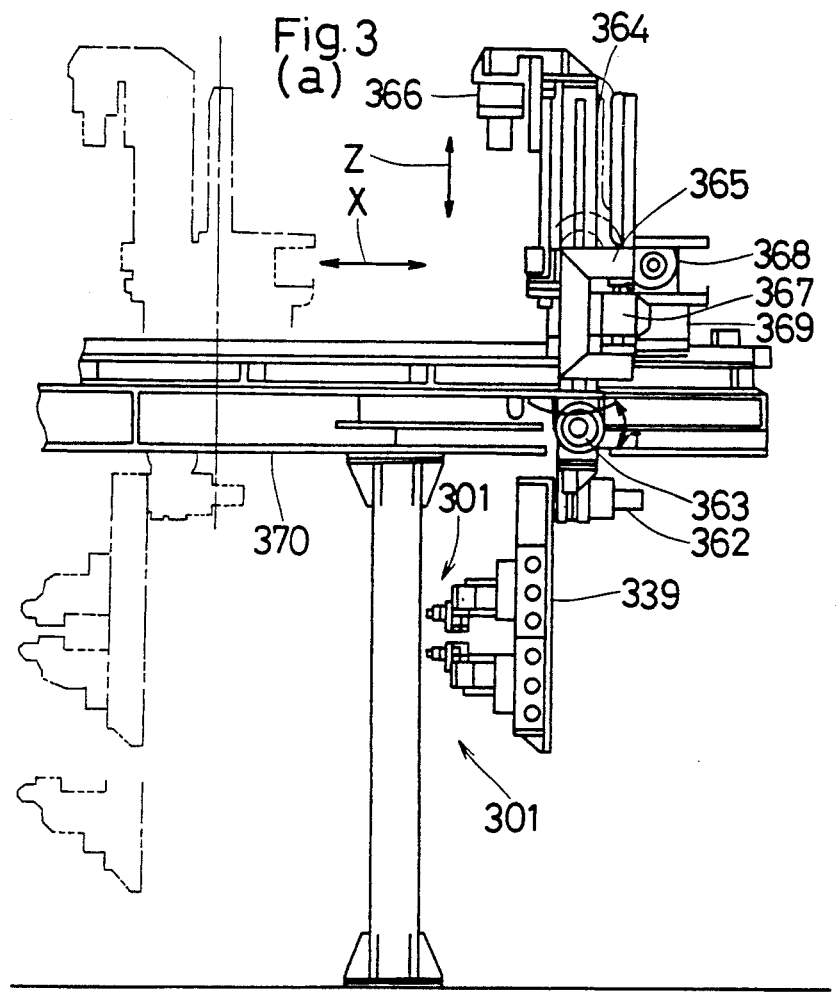
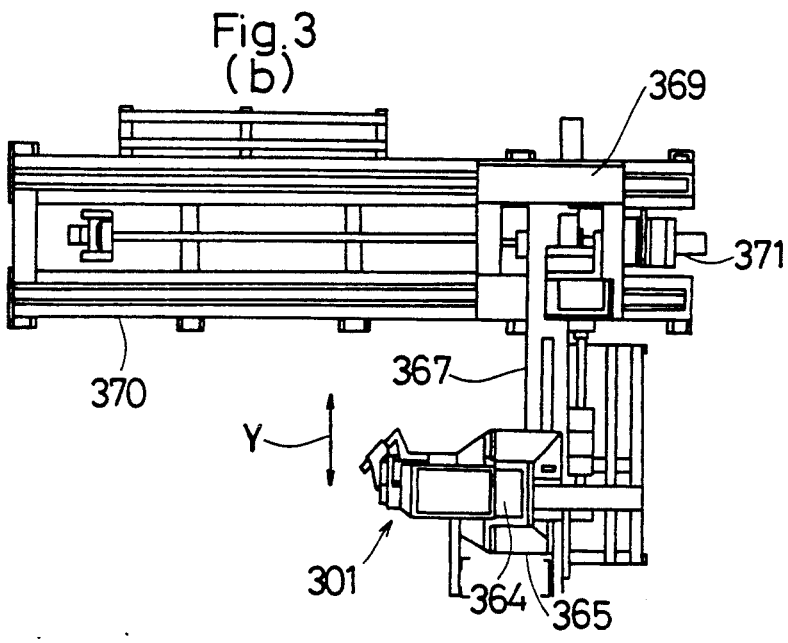

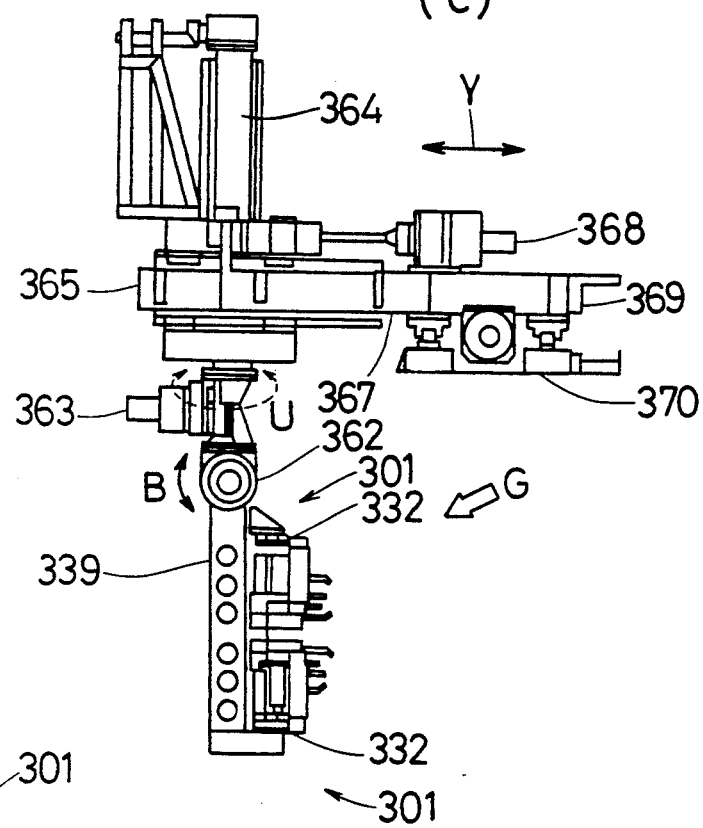
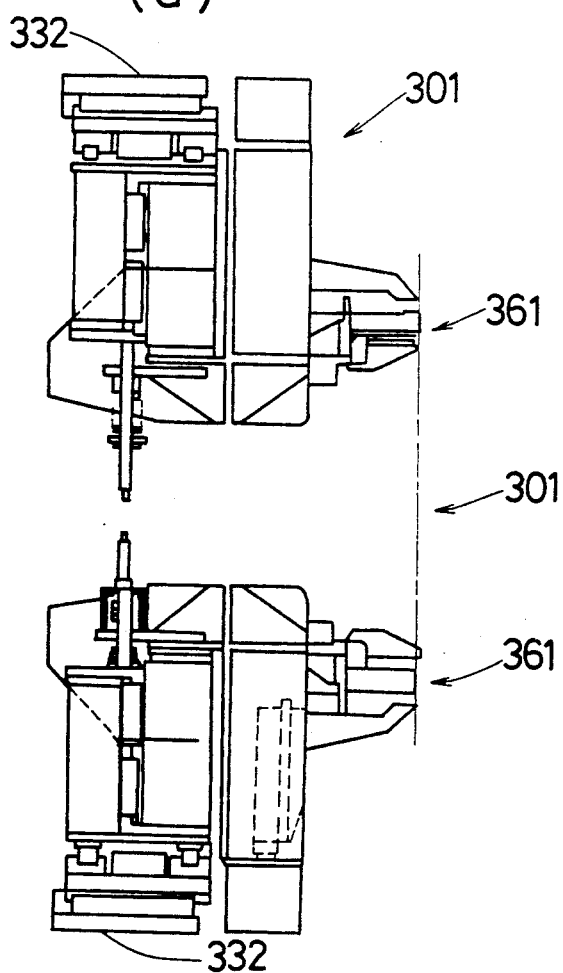
Fig.3 (c)
Fig.3 (d)

(b)

(c)

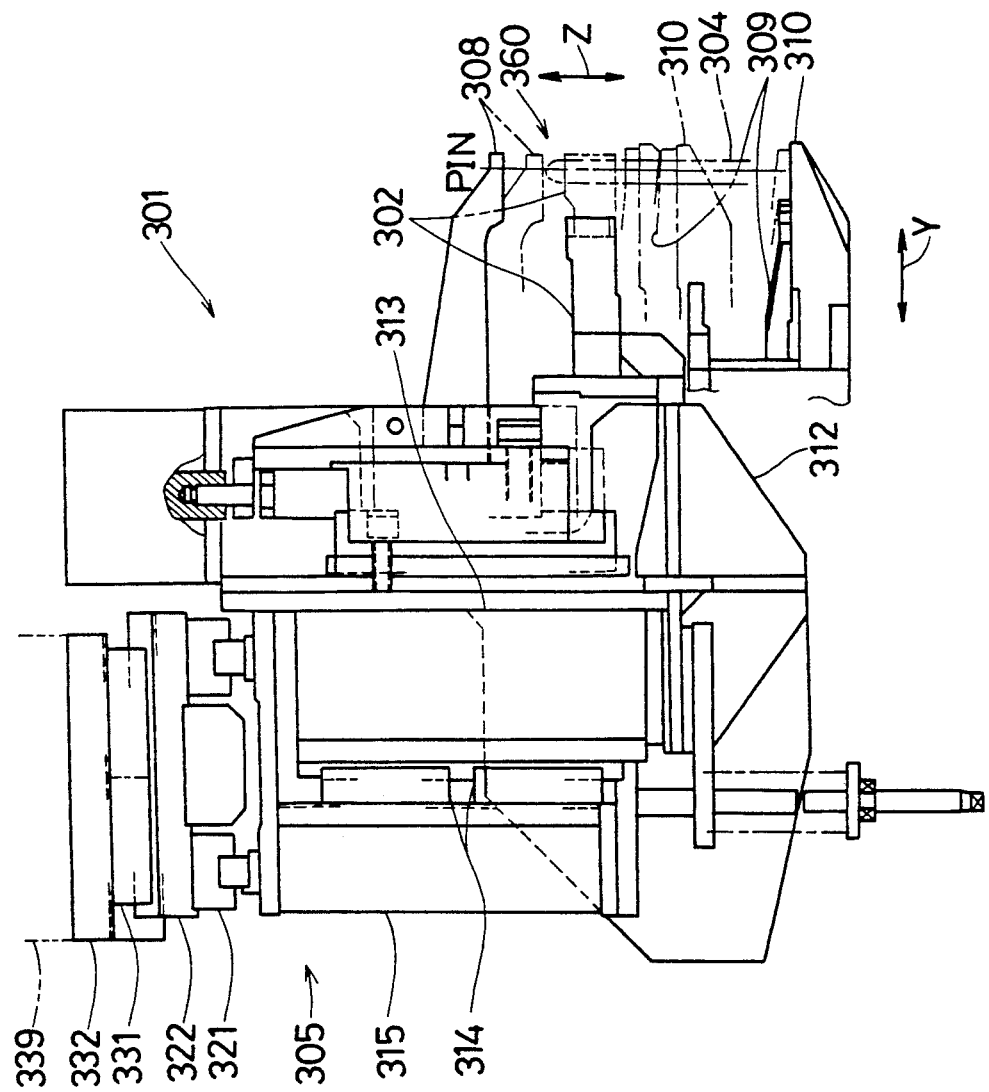

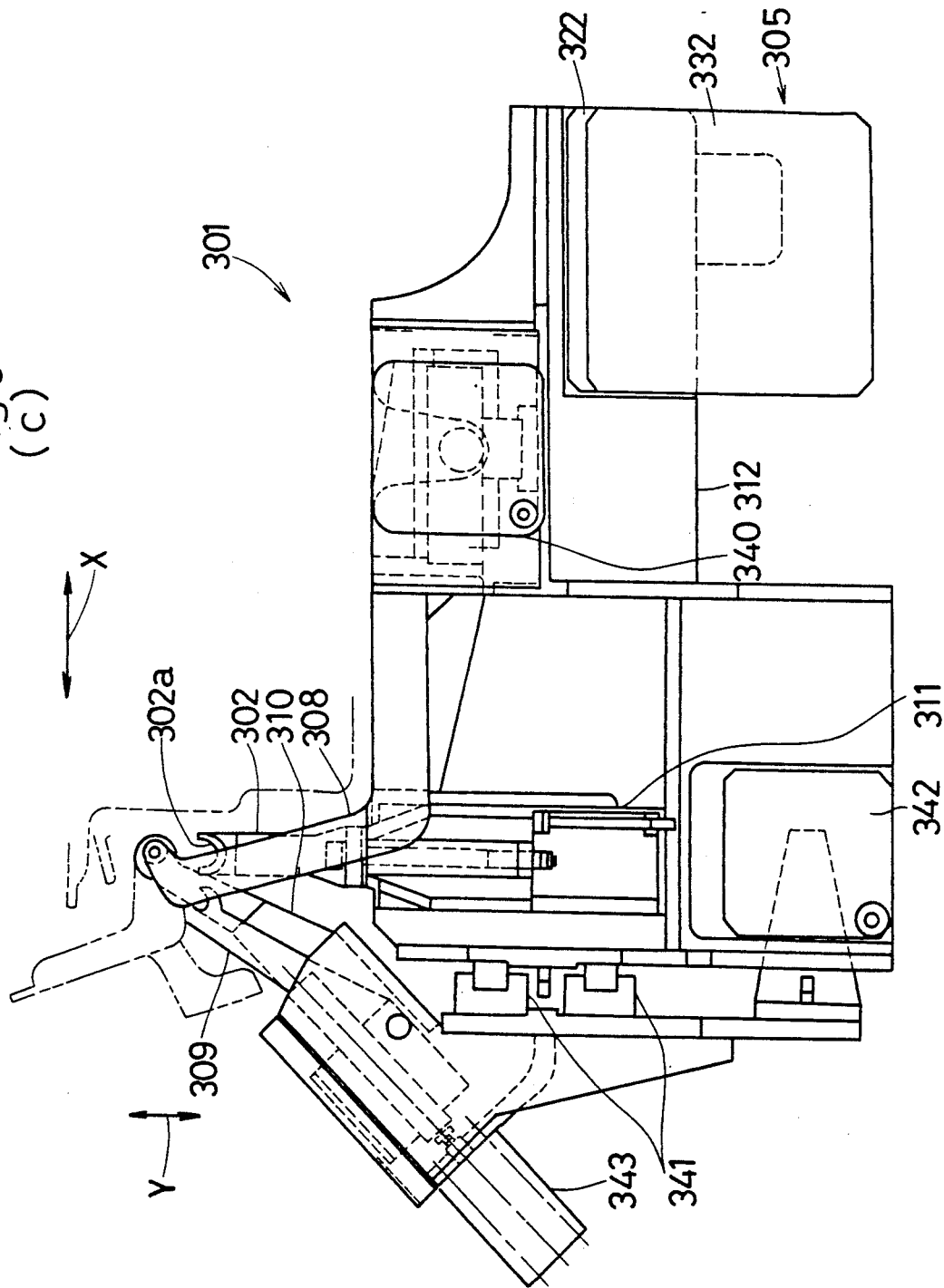

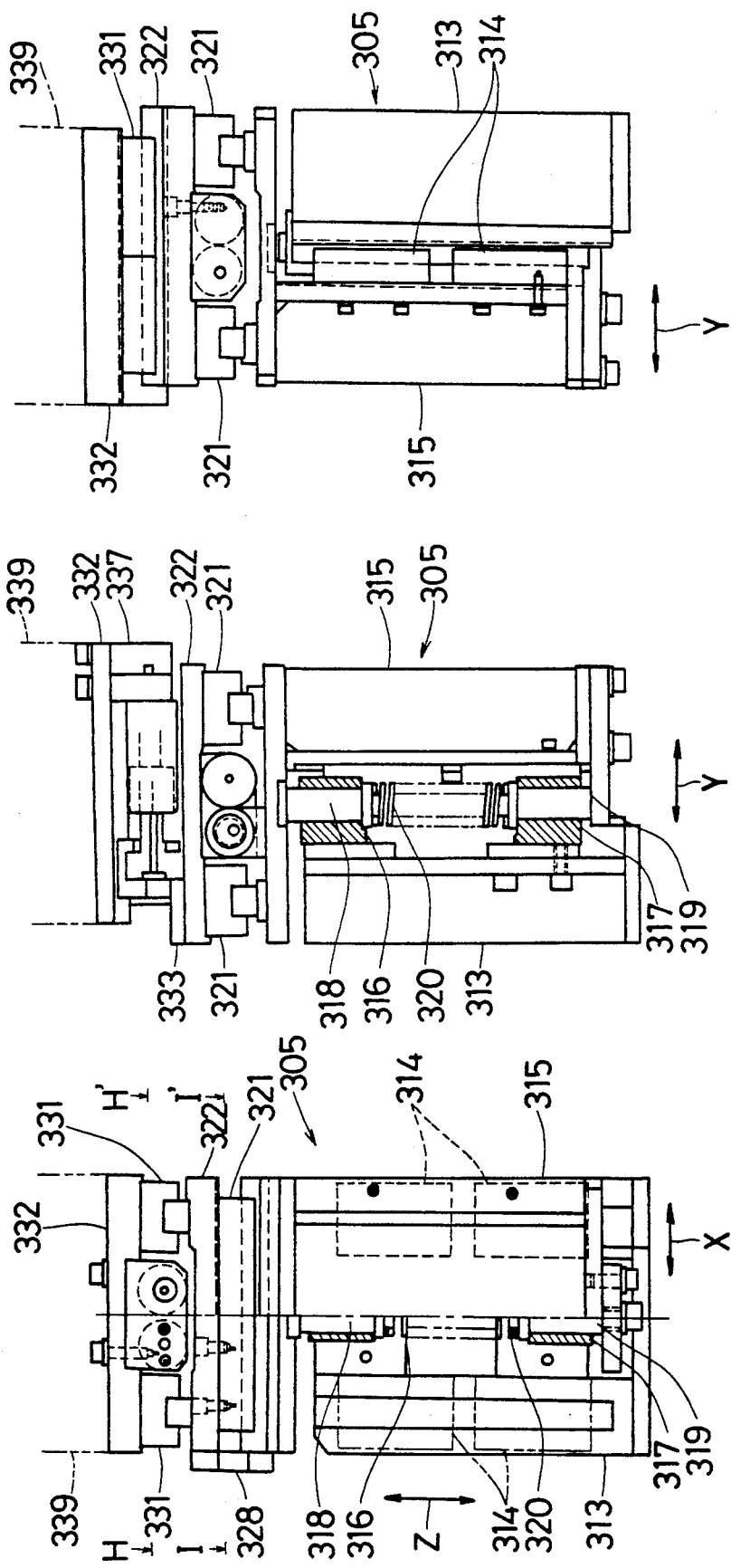

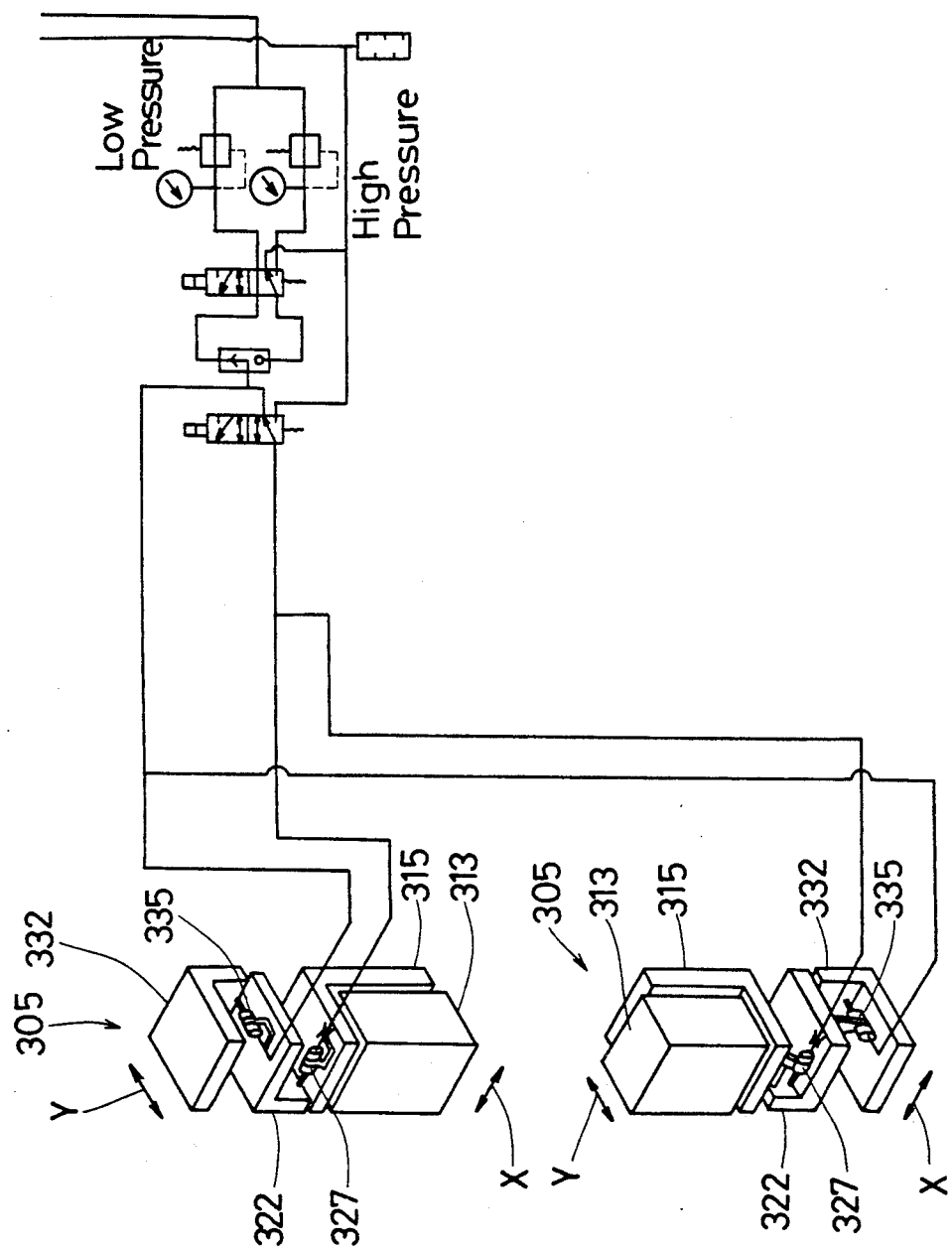

(b)

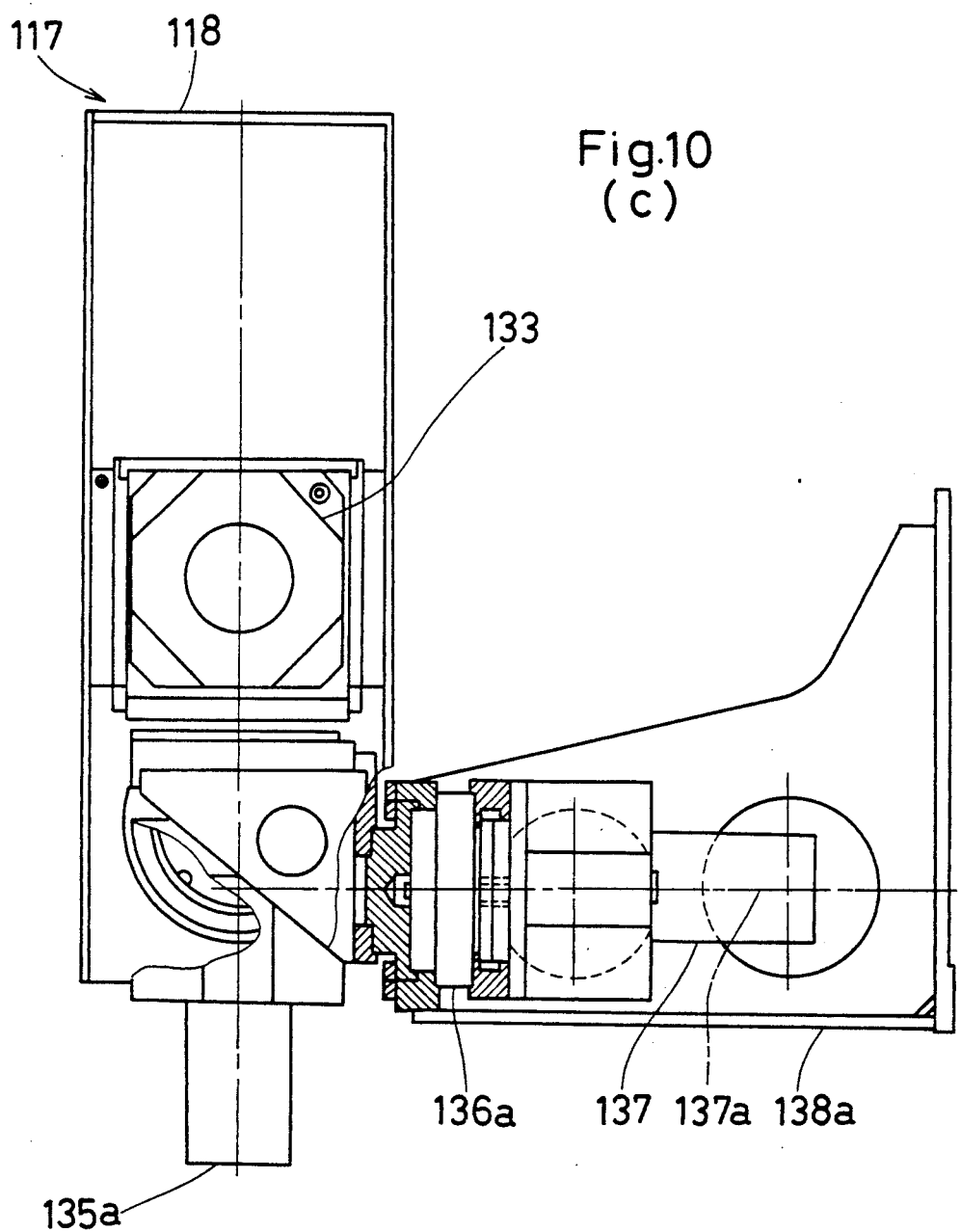

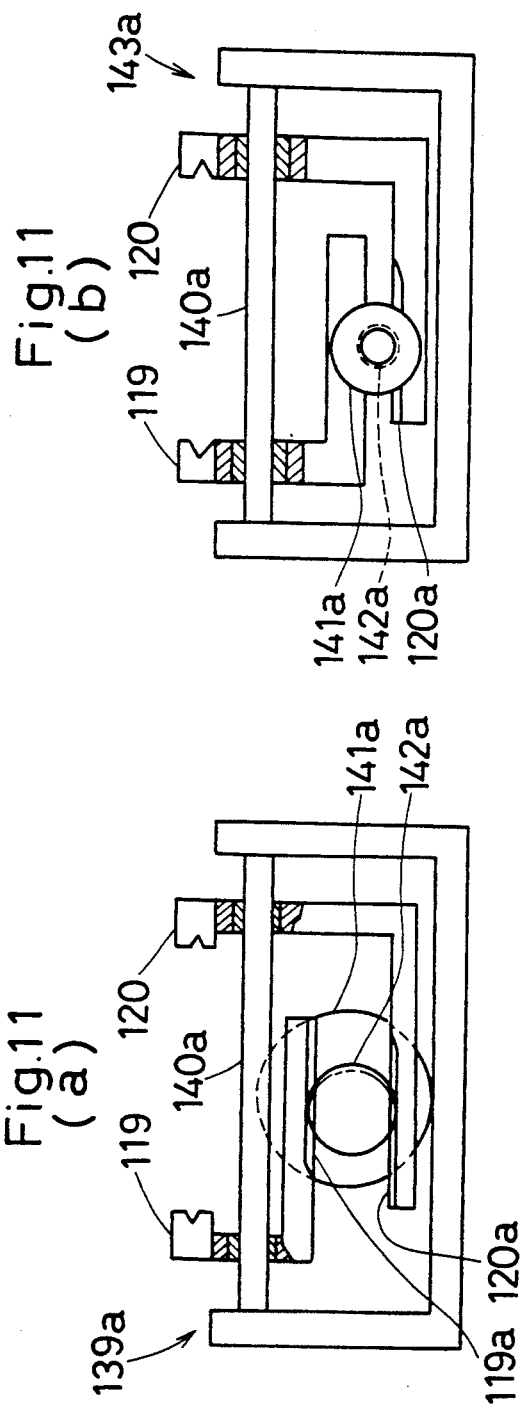

(a)

(b)

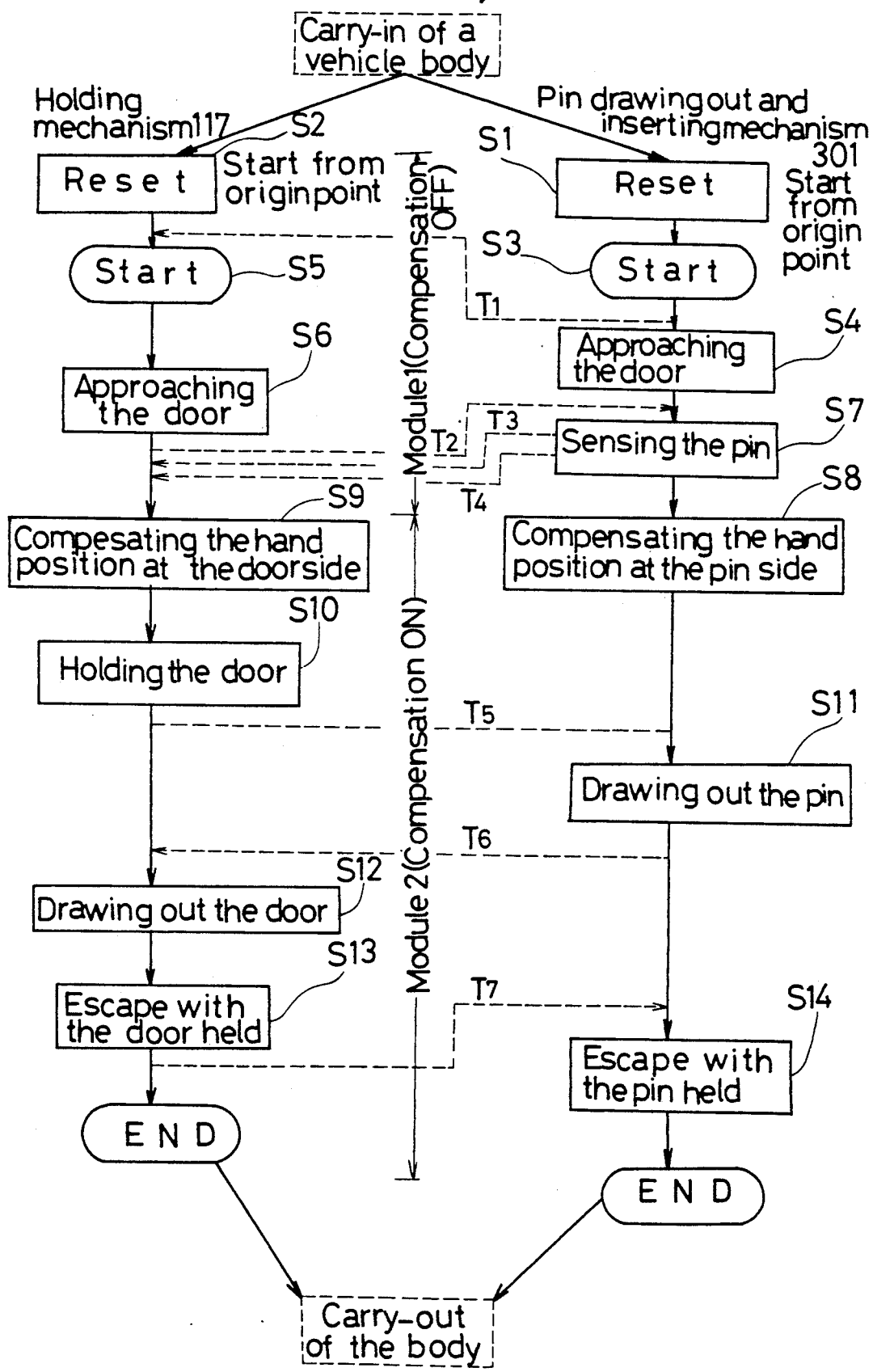

(a)

(b)

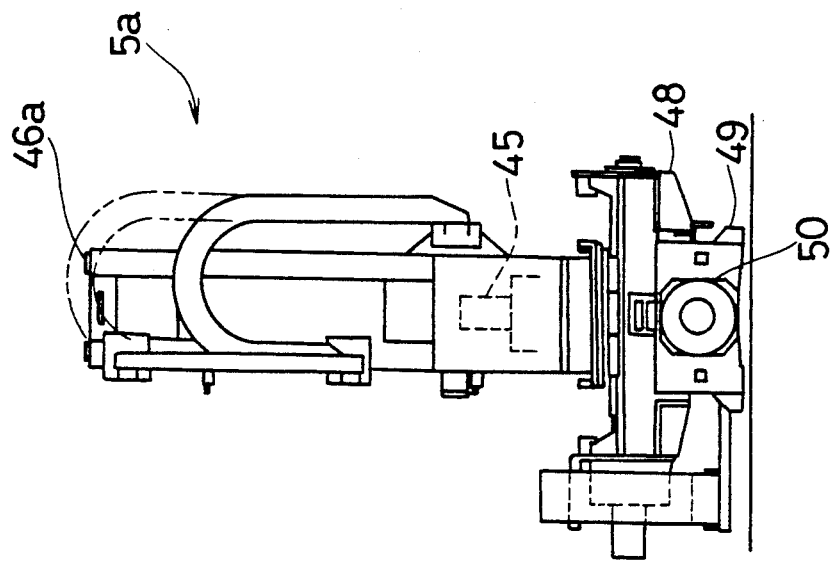
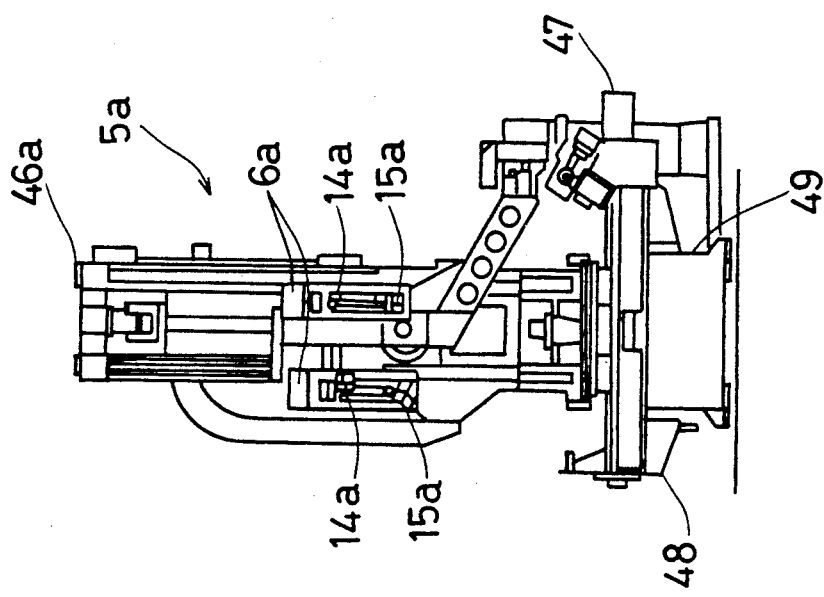
Fig.15 (d)
Fig.15 (c)

(a)

(b)

(c)

(a)

(b)

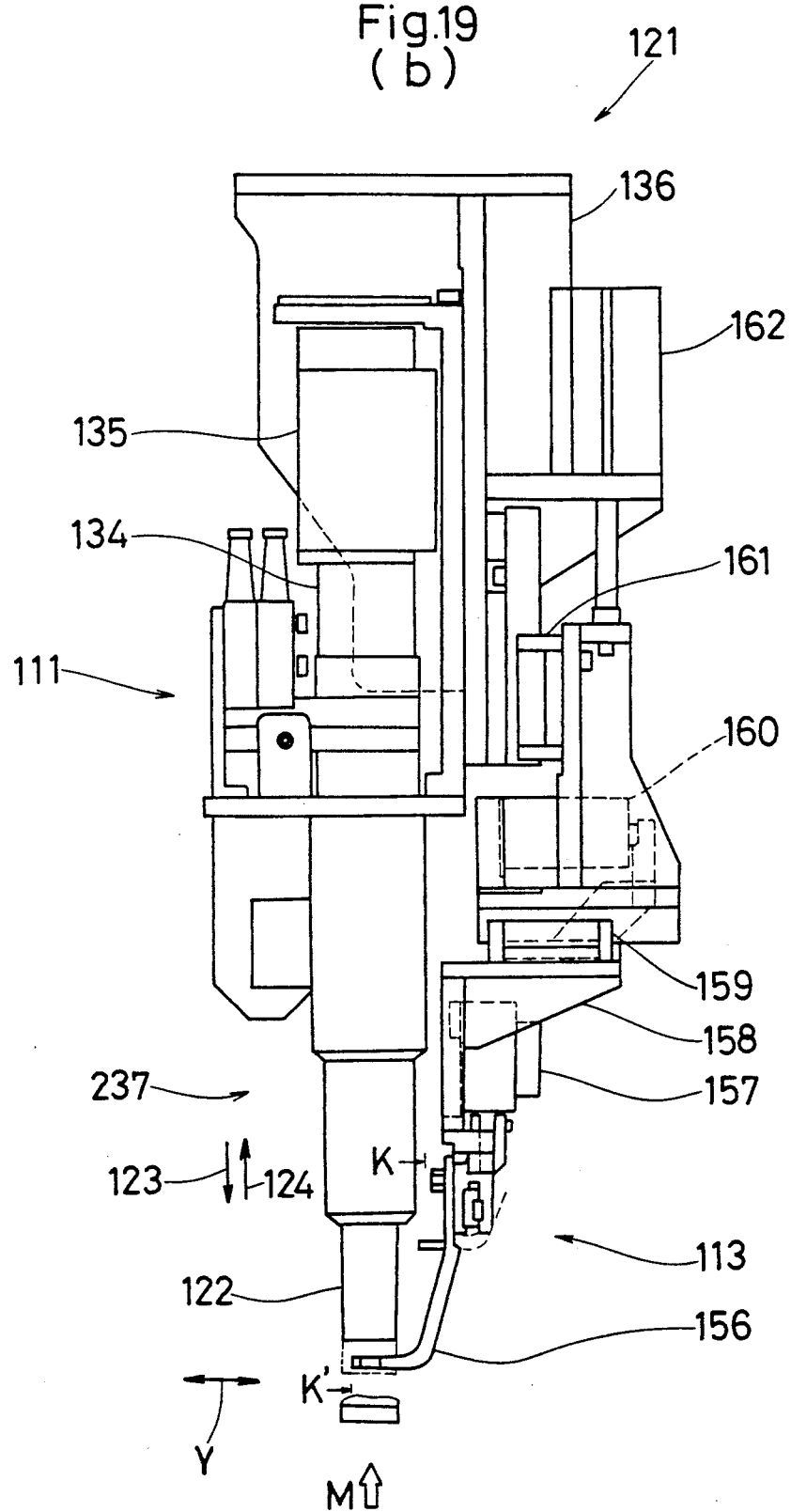

156

156

138

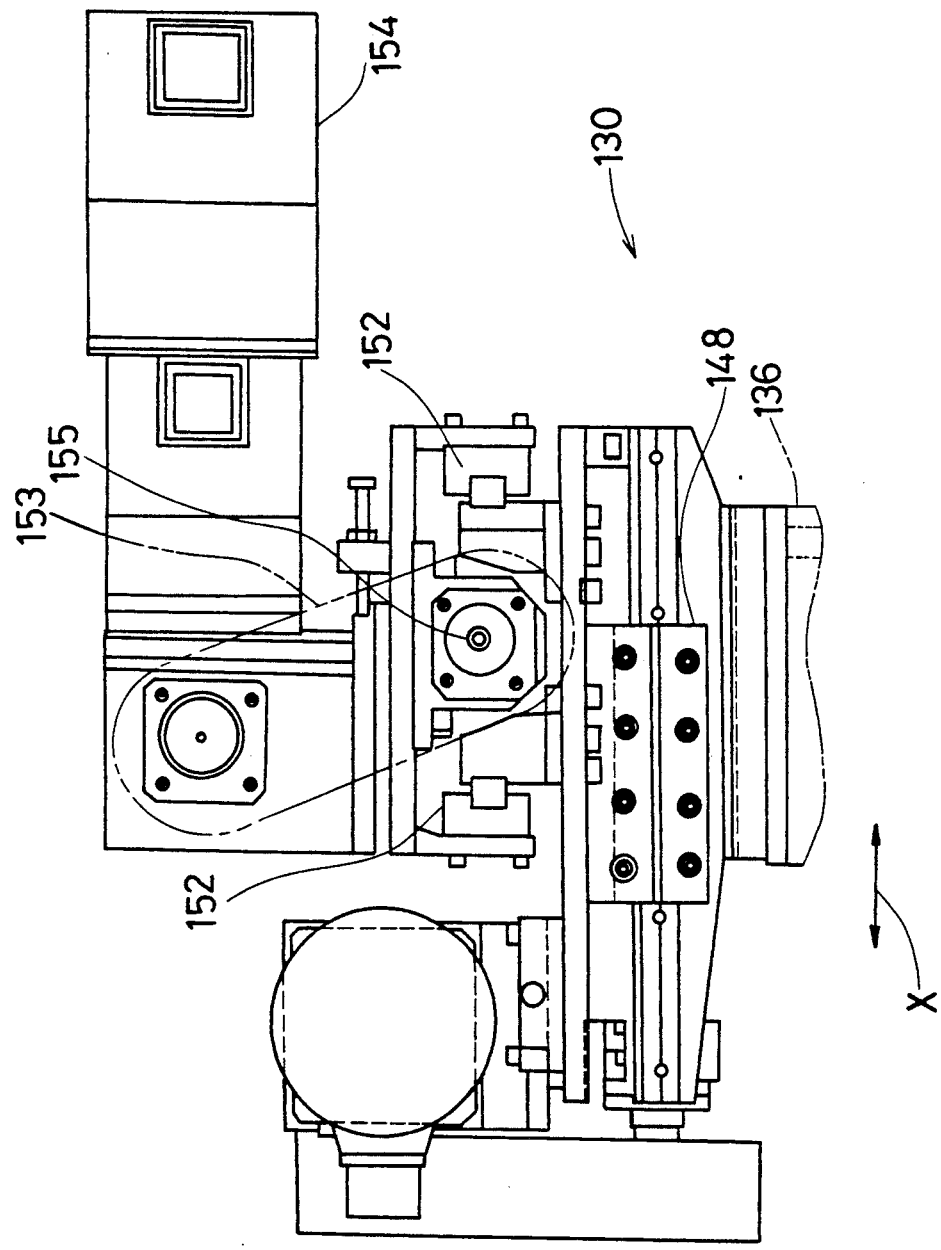

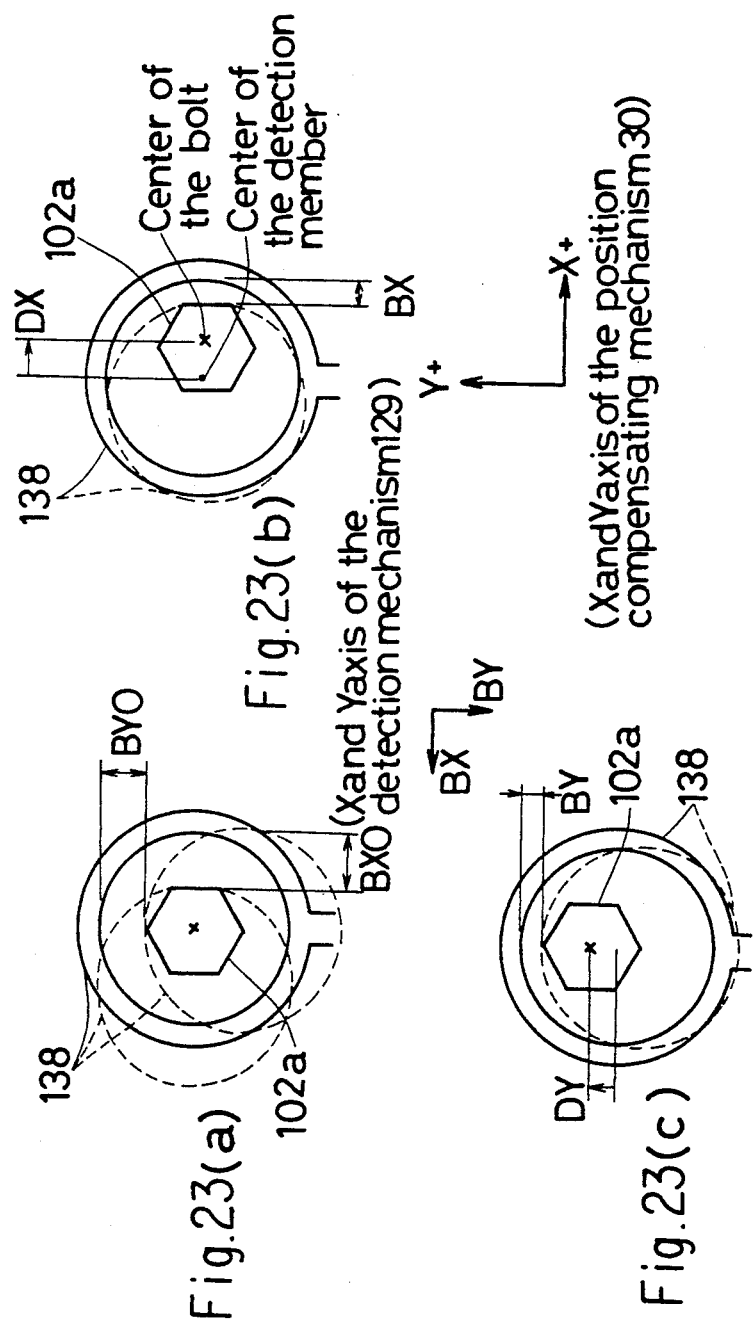

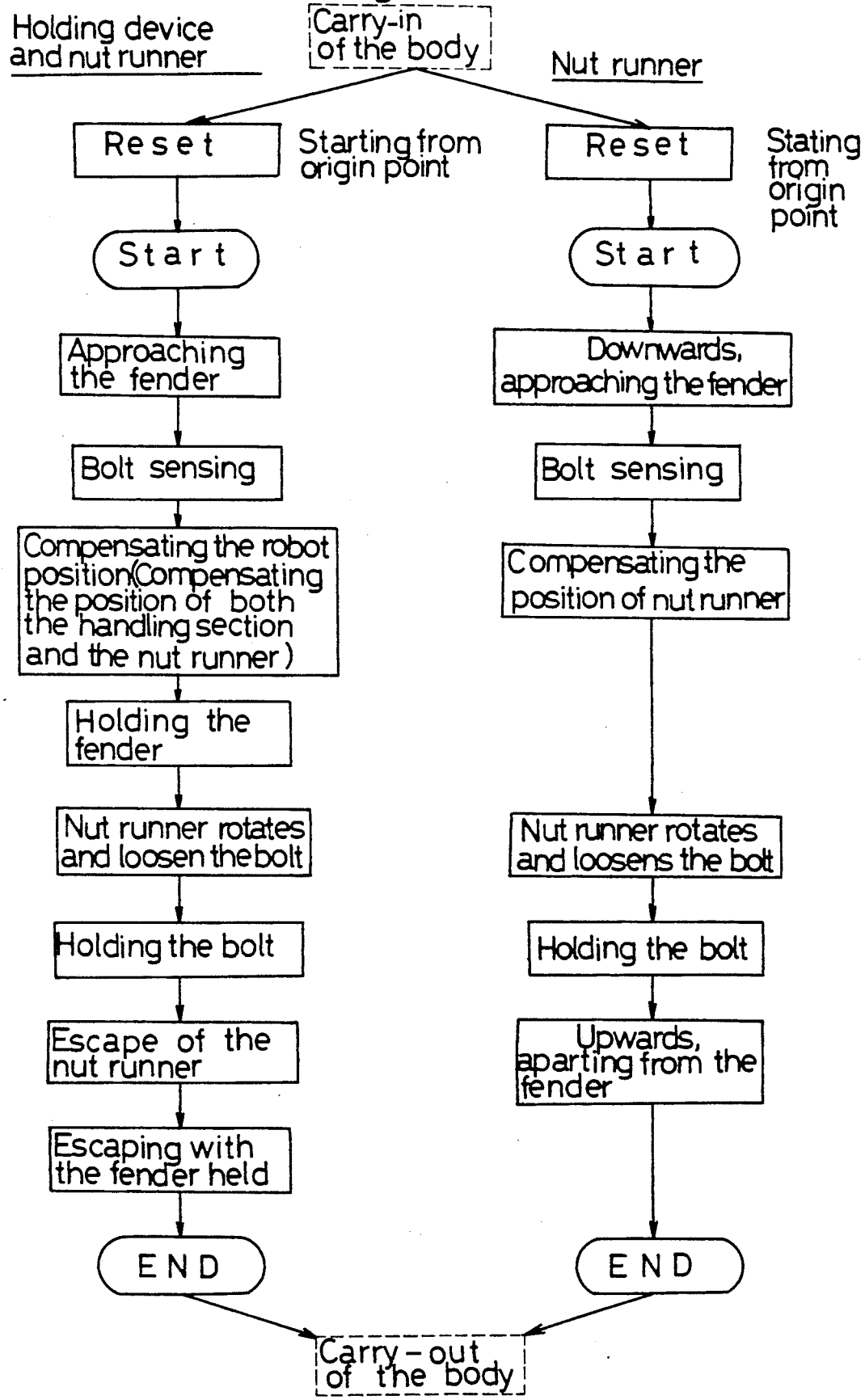

(a)

(b)

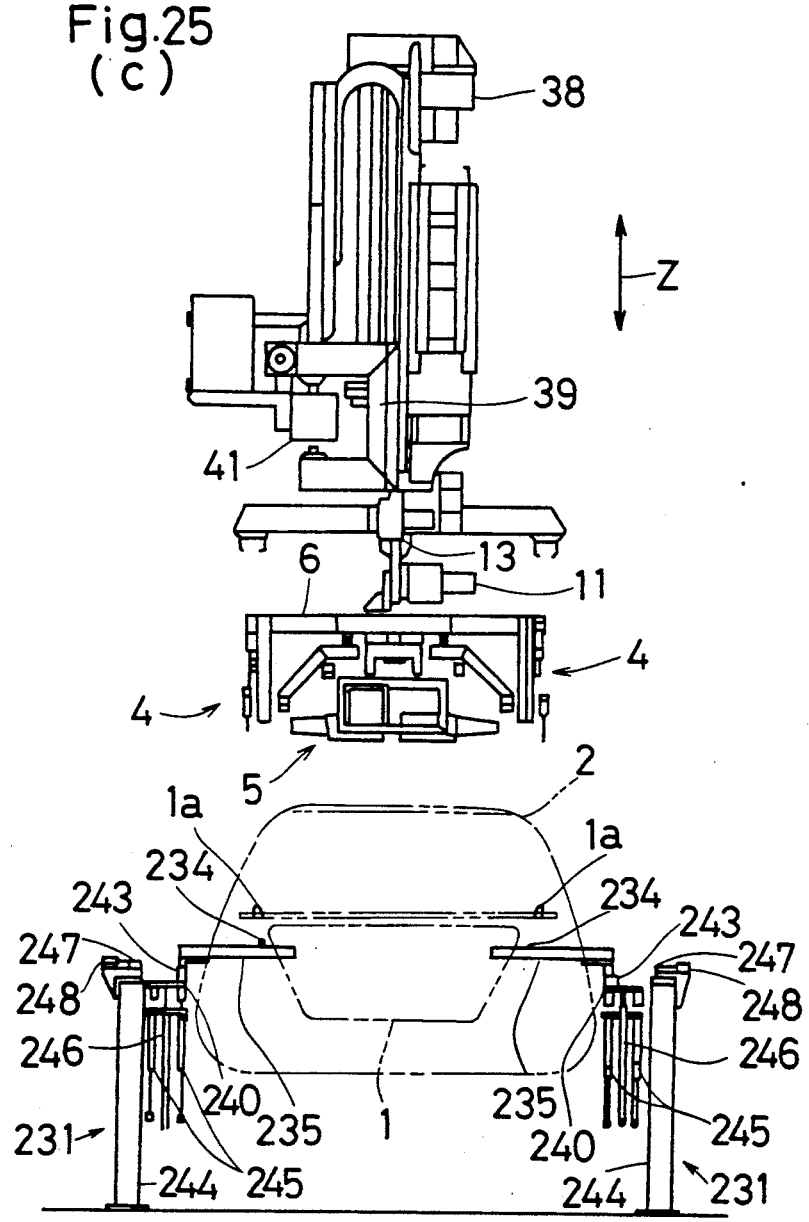

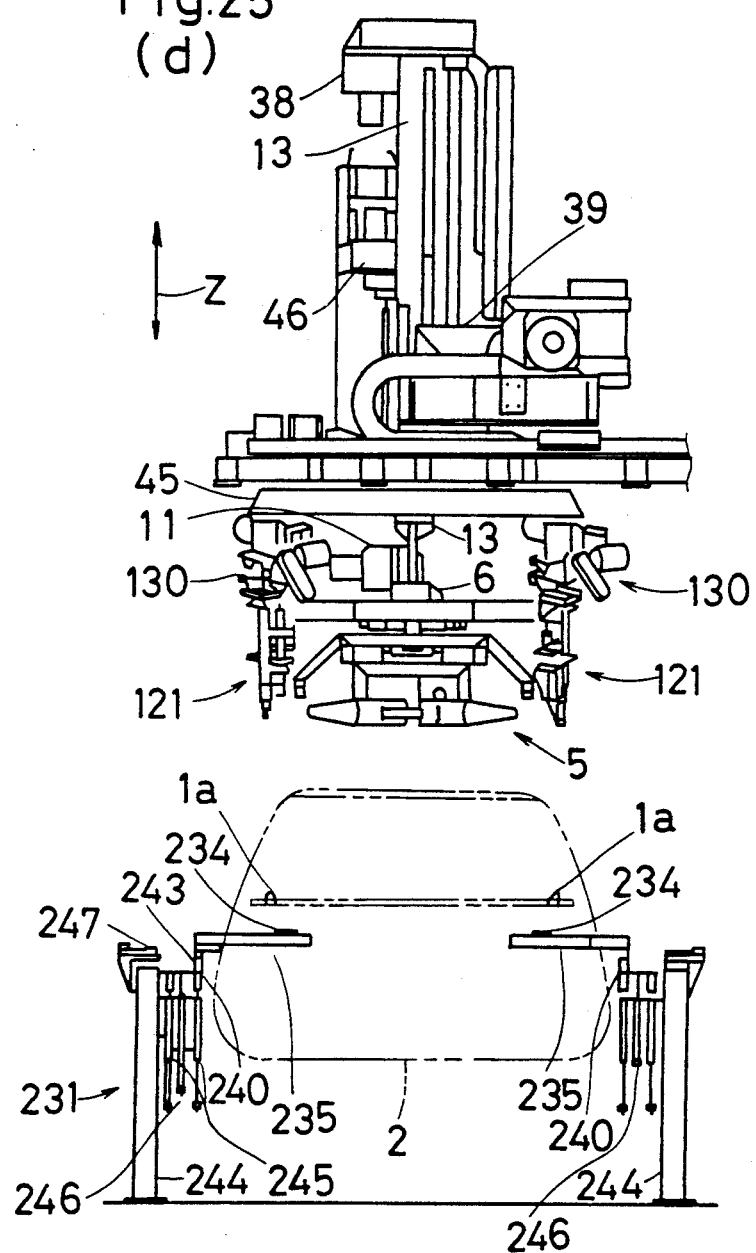

APPARATUS FOR ATTACHING AND DETACHING TRUNK OR A HOOD TO AND FROM A VEHICLE BODY

This is a division of application Ser. No. 07/509,520, filed on Apr. 13, 1990, now U.S. Pat. No. 5,079,832.

BACKGROUND OF THE INVENTION

1. Field of the Invention

This invention relates to an apparatus for attaching and detaching such exterior members as doors, a trunk, a hood, and fenders which can be openably mounted by means of such tightening devices as pins, bolts, etc. to a vehicle body, in the assembling line of vehicles.

2. Description of the Prior Art

In the assembling lines of vehicles, such exterior members as doors, fenders, a trunk and a hood are attached to a vehicle body through real parts matching. In this case, the exterior members are mounted to a vehicle body frame by means of such tightening devices as pins, bolts, etc. so that they can be opened and closed for the vehicle body frame. This aims at absorbing the dimensional errors and achieving smooth body lines. However dimensional errors will occur when attaching exterior members such as doors, etc. which are produced by a plate working press, to the vehicle body frame.

In the case of painting doors, fenders, etc. which are one of the examples of exterior members assembled as shown above, these doors and fenders are removed from the vehicle body frame, are handled as a single independent member, and are painted with the painting surface kept horizontally. After the paint is dried, these members are assembled again, thereby causing a vehicle body of which painting quality is excellent. This is because paint can be prevented from sagging down by painting with the exterior members kept horizontal.

In these assembling lines, in the case that doors, fenders, etc. are automatically disassembled and assembled, the automatic drawing out and insertion of pins, bolts, etc. and the holding of doors, fenders, etc. is necessary.

Hence, such an apparatus as shown in FIGS. 29(a) and (b) has been recently developed.

The apparatus shown in FIG. 29 is used for attaching doors to the vehicle body frame. In the case of removing the doors from the vehicle body frame, another apparatus having such a structure similar to the apparatus shown in FIG. 29 is used to carry out the removal work.

Namely, in the apparatus shown in FIG. 29, a door (not shown) is kept by a pair of claws 351 and 351 attached to a fixture 350, another claw 353 attached to the base plate 352 and a pair of vacuum pads 354 and 354 attached to the base late 352. The claws 351 and 351 supports a hinge portion installed at the vertical position of the door, respectively, and the claw 353 is inserted into the catch portion provided in the door. Besides, the vacuum pads 354 and 354 are for attracting the door body.

The setting angle of the fixture 350 is compensated by a position compensating mechanism 355 the position of the claw 353 is also compensated by another position compensating mechanism 356.

A pin (not shown) is inserted by action of a set of claws 357 and 357 provided on the fixture 350 into the door held by the claws 351 and 353 and the vacuum pads 354 as shown in the above. As a result, the door is set to the vehicle body frame.

Also, the apparatus does not include a mechanism for detecting the position of the pin and another mechanism for keeping the pin. Therefore, it is necessary for an operator to support the pin after a robot moves to the position taught in advance.

Hence, in the conventional apparatus, as a mechanism for keeping a door and a mechanism for drawing out and inserting a pin are arranged on a common robot, there is some limits in the travelling distance and the distance of compensation thereof. Therefore, in case that the positional deviation of the pin for the vehicle body frame or a different type of vehicle comes on the assembling line, the apparatus does not cope with drawing out and inserting the pin. Therefore, there is a problem that the conventional equipment is short of universality for attaching a door to and removing it from a vehicle body frame.

On the other hand, as a fender is assembled to a vehicle body frame with bolts through real parts matching, the mounting position does not become uniform, and it is impossible to easily position the holding members to hold the fender for the fender.

In addition, there is some gap in the screwing position of the bolts among the vehicle body frames. For example, even though the bolts are tried to be automatically tightened and loosened by using a nut runner, it is impossible to accurately position the nut runner for the bolts when the nut runner is attached to a robot which can make only simple repeating actions.

For this reason, the automatic mounting and dismounting of a fender has not yet been realized.

In the assembling lines of vehicles, a trunk, a hood and the like are attached to the vehicle body frame together with doors, etc. through real parts matching in advance. In this case, for example, the trunk is supported by hinges fixed to the vehicle body frame by for example bolts, so that the trunk can be opened and closed for the vehicle body frame. This aims at absorbing the dimensional errors and finishing to smooth body lines through the dimensional errors are apt to occur when assembling the trunk, the hood, etc. which are made and formed by a plate-working press, to the vehicle body frame.

When painting the trunk, the hood, and the like that have been assembled as shown above, the trunk, the hood, etc. are removed from the vehicle body frame together with the hinges thereof, and the painting thereof is conducted as being handled as a single independent member so that the painting of the inside of the vehicle body can be easily carried out since such obstacles as a trunk, a hood, etc. have been removed.

In such an assembling line as shown above, in the case that a trunk and the like are automatically disassembled and assembled, it will be a great point to automatically handle the trunk and to automatically loosen and tighten the bolts.

However, as the trunk is in a closed position for the vehicle body frame in the assembling line, any clearance into which a plurality of holding members to hold the trunk are inserted is not formed between the trunk and the vehicle body frame. Hence, it is necessary to keep the trunk in the opened position thereof for the vehicle body frame. But as shown in the above, as the trunk is assembled to the vehicle body frame through real parts matching, unevenness may occur in the mounting position thereof, and it is impossible to easily position the holding members for the trunk.

Also, more or less unevenness may remain in the screwing position of the bolts among vehicle body frames. For example, even though the bolts are tried to be automatically tightened and loosened by using a nut runner, it is impossible to accurately position the nut runner for the bolts when the nut runner is attached to a robot which can make only simple repeating actions.

For this reason, it has not been realized to mount and dismantle a fender in an automatic manner yet.

SUMMARY OF THE INVENTION

It is therefore one of the objects of the invention to provide an apparatus having high universality for a attaching and detaching a door for vehicle, which can cope with the case that the positional error of doors and pins is large and can cope with different types of vehicles, by separating a mechanism for drawing out and inserting the pins and a mechanism for holding a door.

In order to accomplish the first object of the invention, the first means adopted by the invention is, in the gist thereof, an apparatus for attaching and detaching a door which can be openably mounted to a vehicle body by means of pins, and is an apparatus for attaching and detaching a door for a vehicle, which is characterized in that a mechanism for drawing out and inserting pins for the vehicle body and the door thereof and a mechanism for holding the door are independently provided and both of which are so composed as to be individually driven.

It is the second object of the invention to provide an apparatus for attaching and detaching a door for a vehicle, which has such a function that the apparatus can securely draw out and insert the pin to the position of the pin and the door and can securely hold the door by interlocking the pin drawing out and inserting mechanism and the door holding mechanism, which are separated from each other as shown in the above.

In order to accomplish the second object of the invention, the second means adopted by the invention is, in the gist thereof, an apparatus for attaching and detaching a door which can be openably mounted to a vehicle body frame by means of pins, and is an apparatus for attaching and detaching a door for a vehicle, which incorporates a detection mechanism to detect the position of pins for the vehicle body, a mechanism for drawing out and inserting the pins for the vehicle body and the door, of which position is compensated on the basis of the position of the pins detected by the detection mechanism, and a mechanism for holding the door, of which position is compensated on the basis of the position of the pins detected by the detection mechanism.

It is the third object of the invention to provide a fender attaching and detaching apparatus for holding a fender, following the position of the fender attached to the vehicle body frame through real parts matching and for tightening and loosening the screw members according to the position of the screw members.

In order to achieve the third object of the invention, the third means adopted by the invention is, in the gist thereof, an apparatus for attaching and detaching a fender fixed to the vehicle body by means of screw members.

An attaching and detaching apparatus of a fender fixed to a vehicle body by screw members comprises a fender holding mechanism which consists of a fender holding member openably and closably arranged oppositely on the base plate and fender driving means movably installed with the fender holding member relatively for the base plate in the opening and closing direction of the fender holding member together, and which makes a closing action of the fender holding member by the corresponding driving means for the fender and holds the fender, following the position of the fender, a first screw position detection mechanism for detecting the position of the screw member, and a fender nut runner mechanism of which position is compensated by the fender position compensating mechanism according to the position of the screw member detected by the first screw position detection mechanism and which tightens and loosens the screw member.

In the fender attaching and detaching apparatus according to the third object of the invention, the fender holding member constituting the fender holding mechanism makes a closing action by the fender driving means on the base plate. So, the fender holding member moves along with the position of the fender and holds the fender.

The position of the screw members screwed in the vehicle body is detected by the first screw position detection mechanism, and accordingly the position of the nut runner for the fender is compensated according to the position of the screw member detected by this first screw position detection mechanism. Thereafter, the screw members are tightened and loosened by the nut runner mechanism for the fender.

Also, in the case of assembling the fender, the above procedure is reversed.

Furthermore, it is the fourth object of the invention to provide an apparatus for attaching and detaching a trunk or a hood, which opens the trunk or the hood assembled to the vehicle body frame through real parts matching, holds the trunk or the hood, follows the position of trunk or the hood, and tightens and loosens the screw members according to the position of the screw member.

In order to achieve the fourth object of the invention, the principal means adopted by the fourth invention is, in the gist thereof, an apparatus for attaching and detaching a trunk or a hood to be mounted by means of a hinge mechanism fixed to a vehicle body with screw members which comprises a trunk, etc. opening and closing mechanism for opening and closing the trunk or the hood for the vehicle body, a trunk, etc. holding mechanism which consists of trunk holding members openably and closably arranged oppositely on the base plate, and driving means for a trunk movably installed together with the corresponding trunk holding members relatively for the base plate in the opening and closing direction of the trunk holding members, and which holds the corresponding trunk or the corresponding hood following the position of the trunk or the hood opened by the trunk, etc. opening and closing mechanism, by making the closing action of the trunk, etc. holding members by means of the corresponding driving means for the trunk, etc., a second screw position detection mechanism for detecting the position of the screw member, an a nut runner mechanism for the trunk etc. of which position is compensated by the trunk, etc. position compensating mechanism according to the position of the screw member detected by the second screw position detection mechanism and which can tighten and loosen the screw members.

In a trunk or hood attaching and detaching apparatus according to the invention, the holding member constituting the holding mechanism for trunk, etc. is closed by the driving means for the trunk, etc. on the base plate as the trunk or bonnet is opened for the vehicle body by the opening and closing mechanism for the trunk, etc. So, the holding means for trunk, etc. moves, following the position of the trunk or the hood to cause the trunk or the bonnet to be held.

The position of the screw member screwed in the vehicle body is detected by the second screw position detection mechanism. At the same time, the position of the nut runner mechanism for the trunk, etc. is compensated according to the position of the screw member detected by the second screw position detection mechanism. Thereafter, the screw member is tightened and loosened by the nut runner mechanism for the trunk, etc.

Also, in the case of assembling the trunk or the hood, the above procedure is reversed.

BRIEF DESCRIPTION OF THE DRAWINGS

FIG. 1(a) is the side elevation view thereof and FIG. 1(b) is a plan view thereof, FIG. 3 shows the structure of the drawing out and inserting mechanism which constitutes the attaching and detaching apparatus for doors. FIG. 3(a) is the front elevation view thereof, FIG. 3(b) is the plan view of FIG. 3(a), FIG. 3(c) is the right side elevation view of FIG. 3(a), and FIG. 3(d) is the enlarged view of a portion shown by an arrow G in FIG. 3(c).

FIG. 4(a) is the front elevation view, FIG. 4(b) is the plan view in FIG. 4(a), and FIG. 4(c) is the left side elevation view in FIG. 4(a), FIG. 5 shows the main portions of the drawing out and inserting mechanism. FIG. 5(a) is the front elevation view, FIG. 5(c) is the plan view in FIG. 5(b), FIG. 6(a) is the front elevation view, FIG. 6(b) is the left side elevation view of FIG. 6(a), and FIG. 6(c) is the right elevation view of FIG. 6(a), FIG. 6(d) is the plan view of FIG. 6(a), FIG. 6(e) is the bottom view of FIG. 6(a), FIG. 6(f) is a view taken along with an arrow H—H' in FIG. 6(a), and FIG. 6(g) is a view taken along with an arrow I—I' in FIG. 6(a), FIGS. 7(a) and (b) are the circuit diagram of the drive system of the drawing out and inserting mechanism, respectively, FIG. 8(a) is a view corresponding to FIG. 6(f) and FIG. 8(b) is a view corresponding to FIG. 6(g), FIG. 9(a) is the plan view thereof, and FIG. 9(b) is a side sectional view thereof, FIG. 10(a) is the partially broken front elevation view, FIG. 10(b) is the left side elevation view in FIG. 10(b), FIG. 10(c) is the partially broken right side elevation view in FIG. 10(a)

FIGS. 11(a) and (b) are the exemplary constitutional view of principal portions pertaining to the example of the other embodiments, respectively, FIGS. 13(a) through (b) are the flow charts showing the procedure in the case of detaching the door from and attaching the same to the attaching and detaching apparatus for doors, respectively, FIG. 15(a) is the front elevation view, FIG. 15(b) is the plan view in FIG. 15(a), FIG. 15(c) is the left side elevation view in FIG. 15(a), FIG. 15(d) is the right side elevation view of FIG. 15(a), FIG. 16(a) is the front elevation view, FIG. 16(b) is the left side elevation view of FIG. 16(a), FIG. 17(a) is the front elevation view, FIG. 17(b) is the right side elevation view of FIG. 17(a), FIG. 17(c) is the plan view of FIG. 17(a), FIG. 18(a) is the side sectional view thereof, FIG. 18(b) is the side sectional view of the main portions with the exclusive nut mounted in the nut runner mechanism, FIG. 19(a) is the front elevation view, FIG. 19(b) is the left side elevation view of FIG. 19(a), FIG. 19(c) is the right side elevation view in FIG. 19(a), FIG. 19(d) is the front elevation view of the portion shown by an arrow K—K' in FIG. 19(b), FIG. 19(e) is the bottom view of the portion shown by an arrow L in FIG. 19(a), and FIG. 19(f) is the bottom view of the portion shown by another arrow M, FIG. 21(a) is the front elevation view, FIG. 21(b) is the left side elevation view of FIG. 21(a), FIG. 23 is the view for explaining the procedures in the case of detecting the position of the screw member for the socket by means of the detection mechanism which constitutes the attaching and detaching mechanism for fenders, FIGS. 24(a) and (b) are the flow chart showing the procedure in the case of removing the fender from and mounting the same in the attaching and detaching apparatus for fenders, respectively, FIG. 25(a) is the front elevation view, FIG. 25(b) is the plan view in FIG. 25(a), FIG. 25(c) is the left side elevation view in FIG. 25(a), and FIG. 25(d) is the right side elevation view in FIG. 25(a), FIG. 26(b) is the sectional view taken along with an arrow A—A' in FIG. 26(a), FIG. 26(c) is the side elevation view cut along with an arrow P—P', FIG. 26(d) is a plan view cut along with an arrow C—C' in FIG. 26(b), FIG. 29(a) is the all-out perspective view and FIG. 29(b) is an enlarged view of the portion shown by an arrow J in FIG. 29(a).

DETAILED DESCRIPTION OF THE PREFERRED EMBODIMENTS

While only certain embodiments of the present invention have been described, it will be apparent to those skilled in the art that various changes and modifications may be made therein without departing from the spirit and scope of the present invention.

The present invention provides for an apparatus for automatically attaching such exterior members as doors, fenders, a trunk and a hood for vehicles to the vehicle body and automatically detaching the same therefrom.

Such exterior members as doors, etc. are, respectively, detached from the vehicle body for painting, and they are attached to the vehicle body again after the painting is completed. As these exterior members are of their own particular profiles, they are attached to the vehicle body by respective particular attaching structures. Therefore, the attaching and detaching equipment must be originally designed and devised.

In the ensuing description, an embodiment of the door attaching and detaching apparatus is first disclosed. Next, an embodiment of the fender attaching and detaching apparatus is disclosed, and as the attaching and detaching apparatus for a trunk and a bonnet are of a common structure, they are arranged into one and are disclosed.

Door attaching and detaching apparatus

Figure 1A:
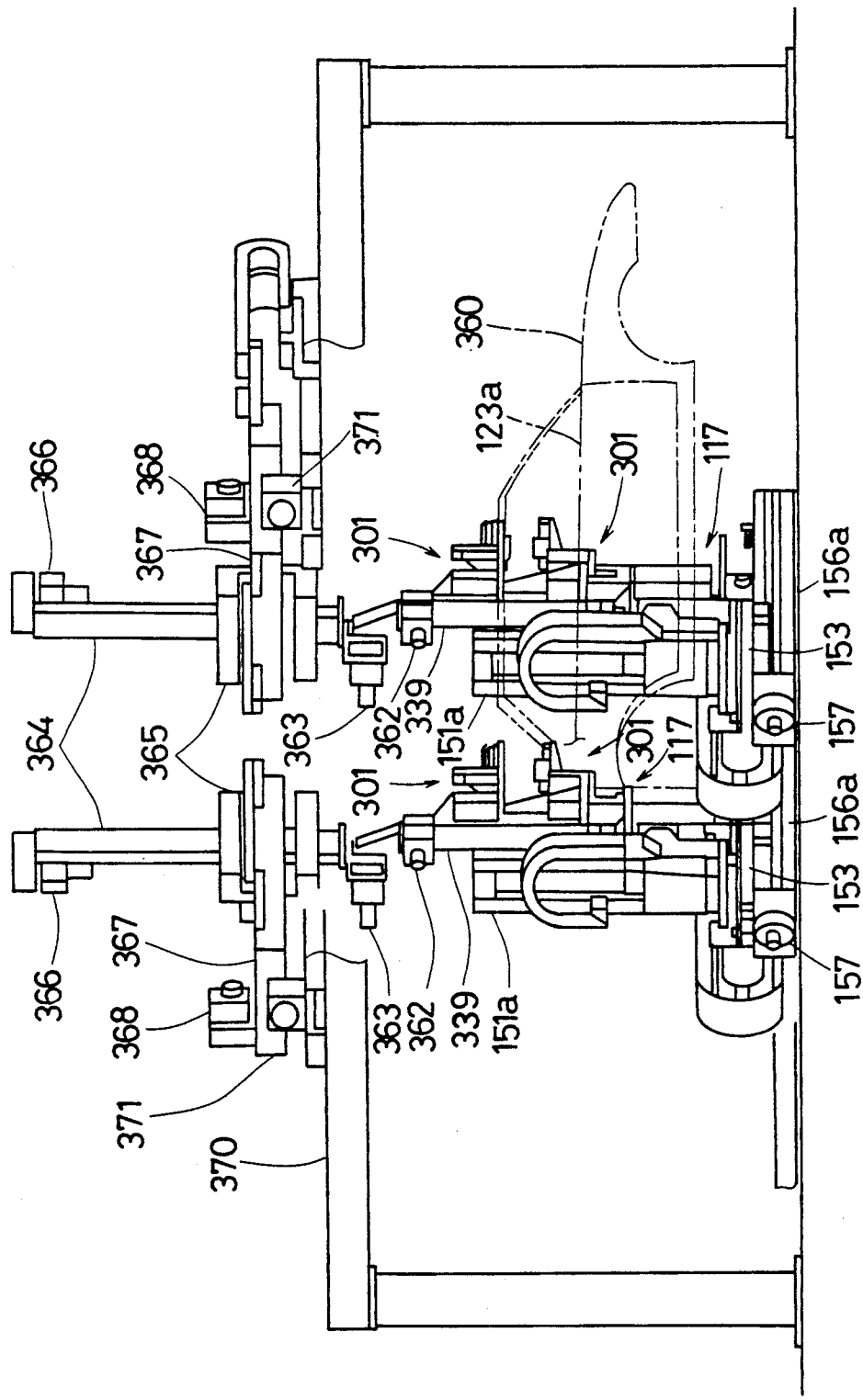
Figure 1:
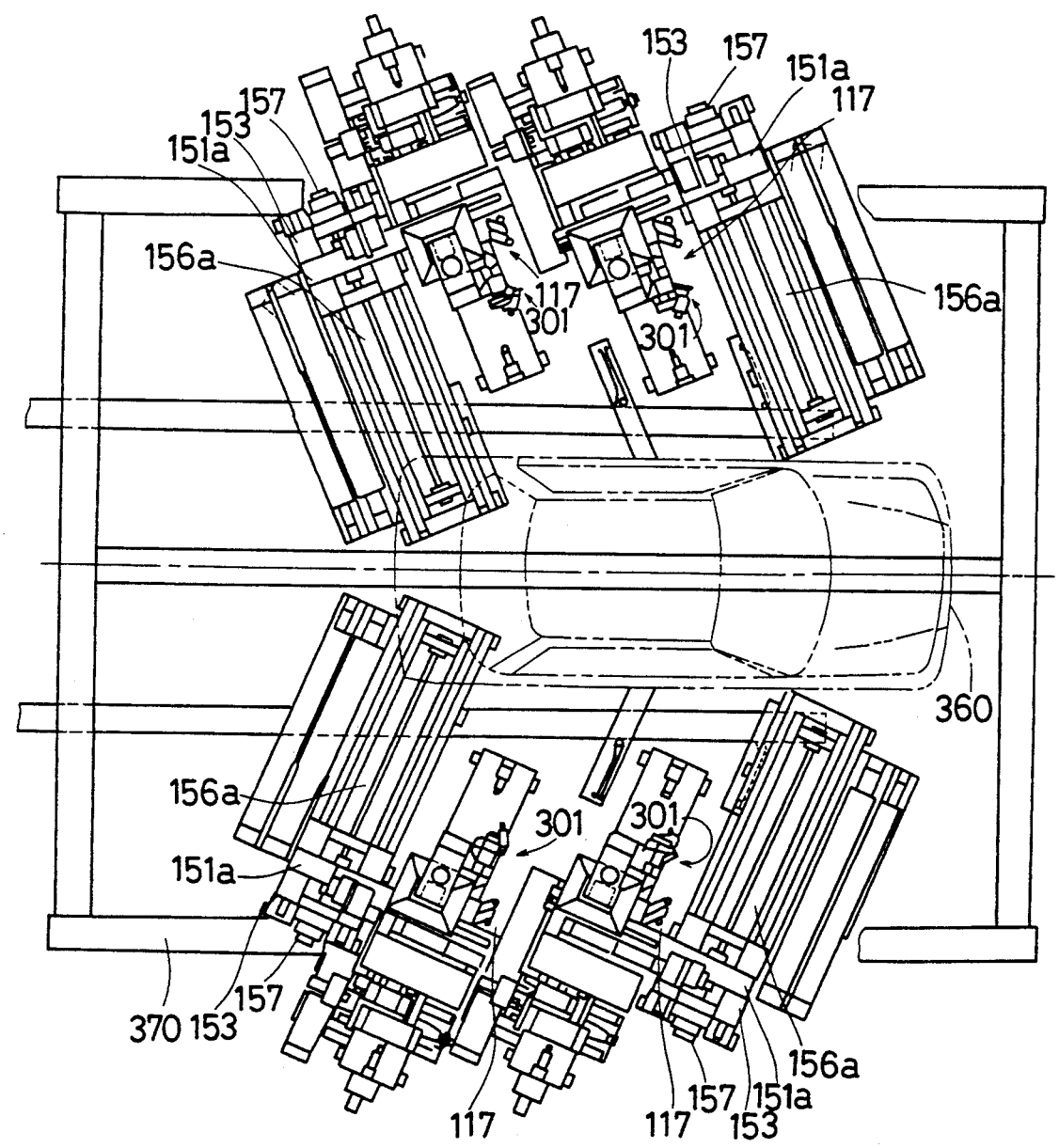
FIG. 1 shows the appearance of attaching and detaching apparatus for doors according to one of the preferred embodiments of the invention.
Figure 4:
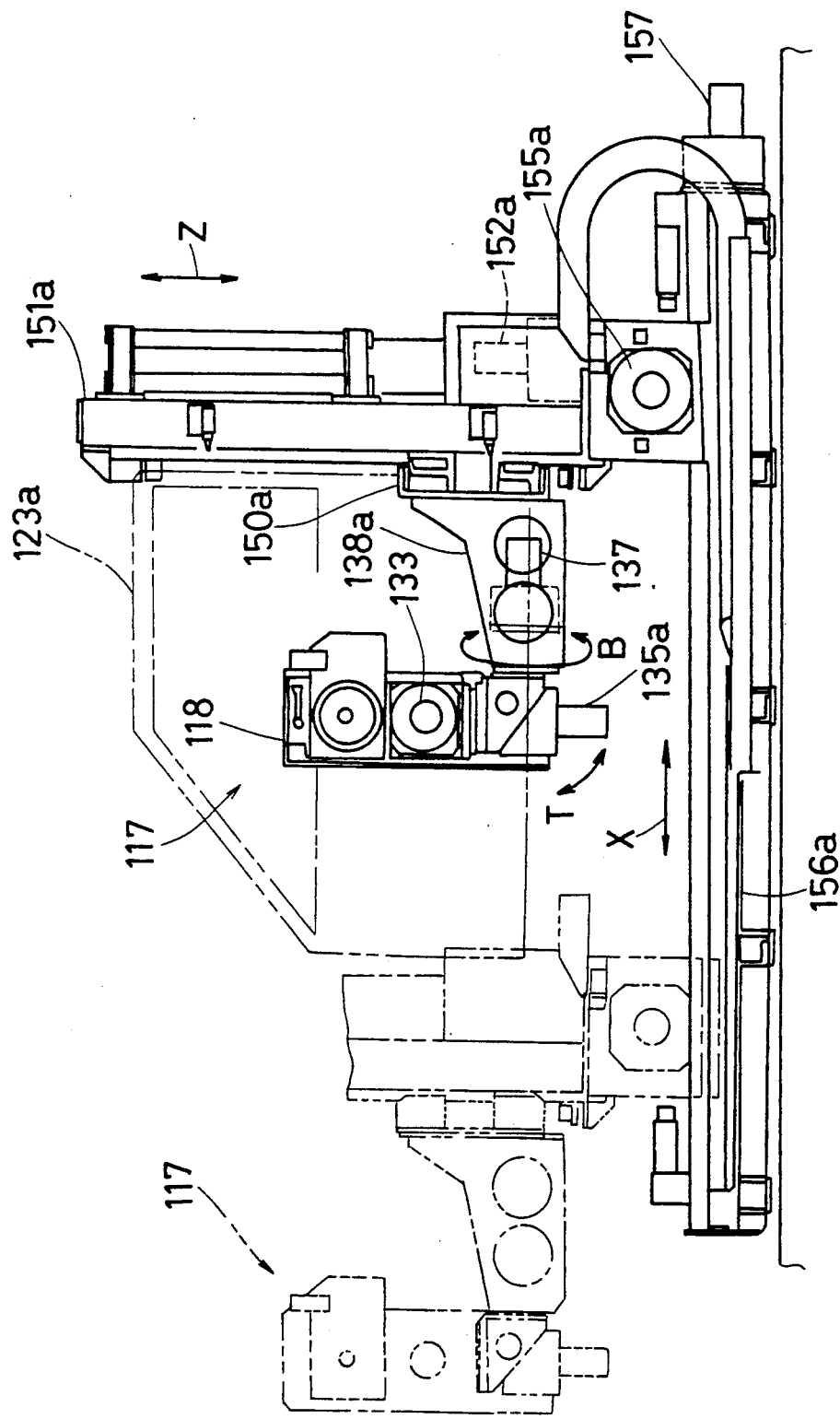
FIG. 4 shows the structure of the holding mechanism which constitutes the attaching and detaching apparatus for doors.
Figure 4:
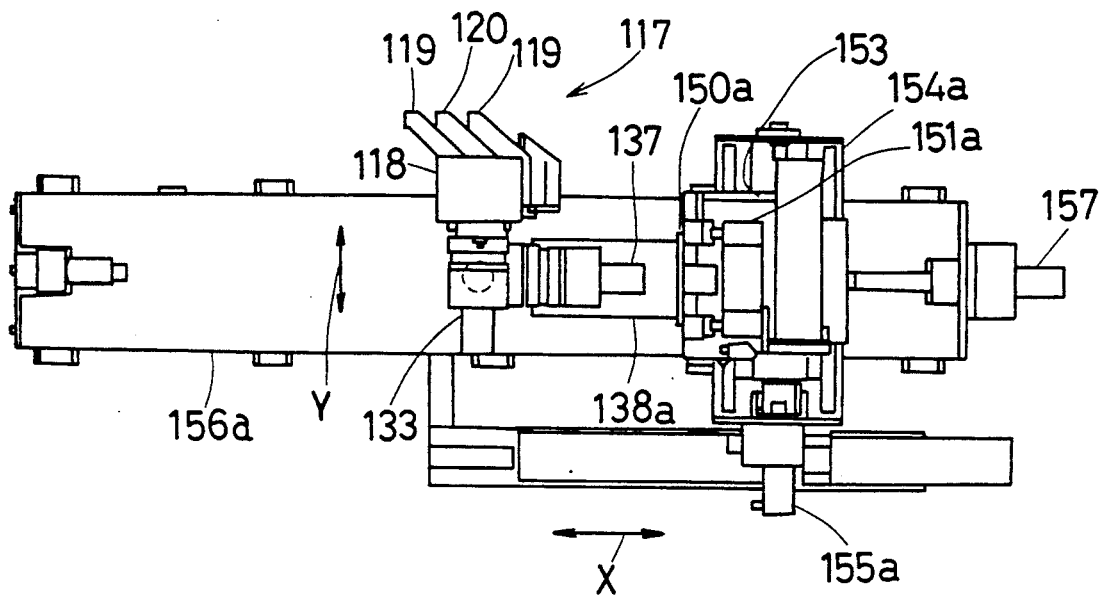
Figure 4:
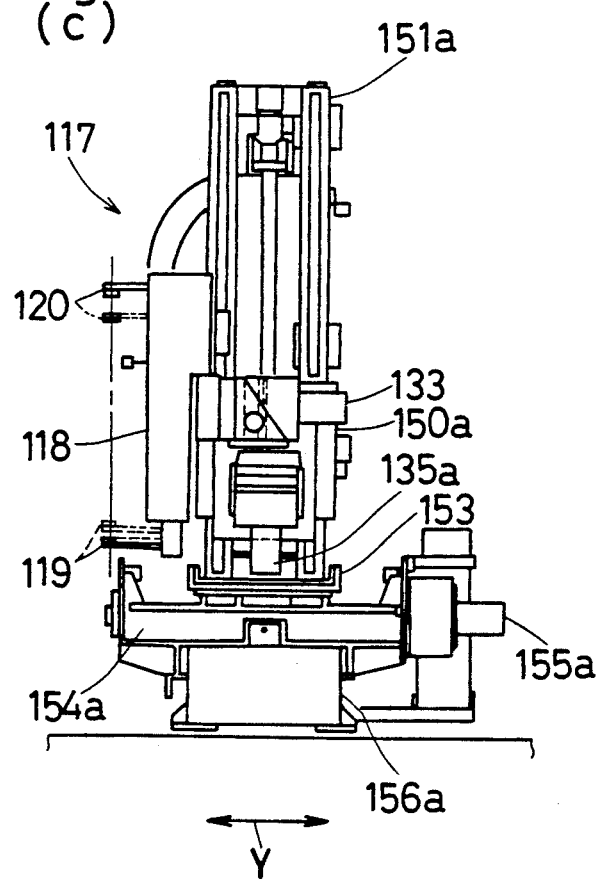

Firstly, as shown in FIG. 1, FIG. 3, and FIG. 4, the door attaching and detaching apparatus comprises a pin position detection mechanism 361 to detect the position of a pin 304 (FIG. 7) for the vehicle body frame 360, a pin drawing out and inserting apparatus 301 of which position is compensated according to the position of the pin 304 detected by the pin position detection mechanism 361 and draws out and inserts the pin 304 for the vehicle body frame 360 and the door 123a, and a door holding mechanism 117 of which position is compensated according to the position of the pin 304 detected by the pin position detection mechanism 361, is driven independently from the pin position detection mechanism 301 and can hold the door 123a.

In the equipment according to the embodiment, as two pins 304 by which the door 123a can be attached to be opened and closed to the vehicle body frame 360 are mounted in the vertical position, two pin position detection mechanisms 361 and two pin drawing out and inserting mechanisms 301 are arranged at the vertical position for a single door 123a, respectively. The pin position detection mechanisms 361 are integrally built in the drawing out and inserting mechanism 301. Furthermore, as four doors 123a are mounted for a single body frame 360, four sets of such equipments as door holding mechanism 117a are arranged.

Figure 5B:
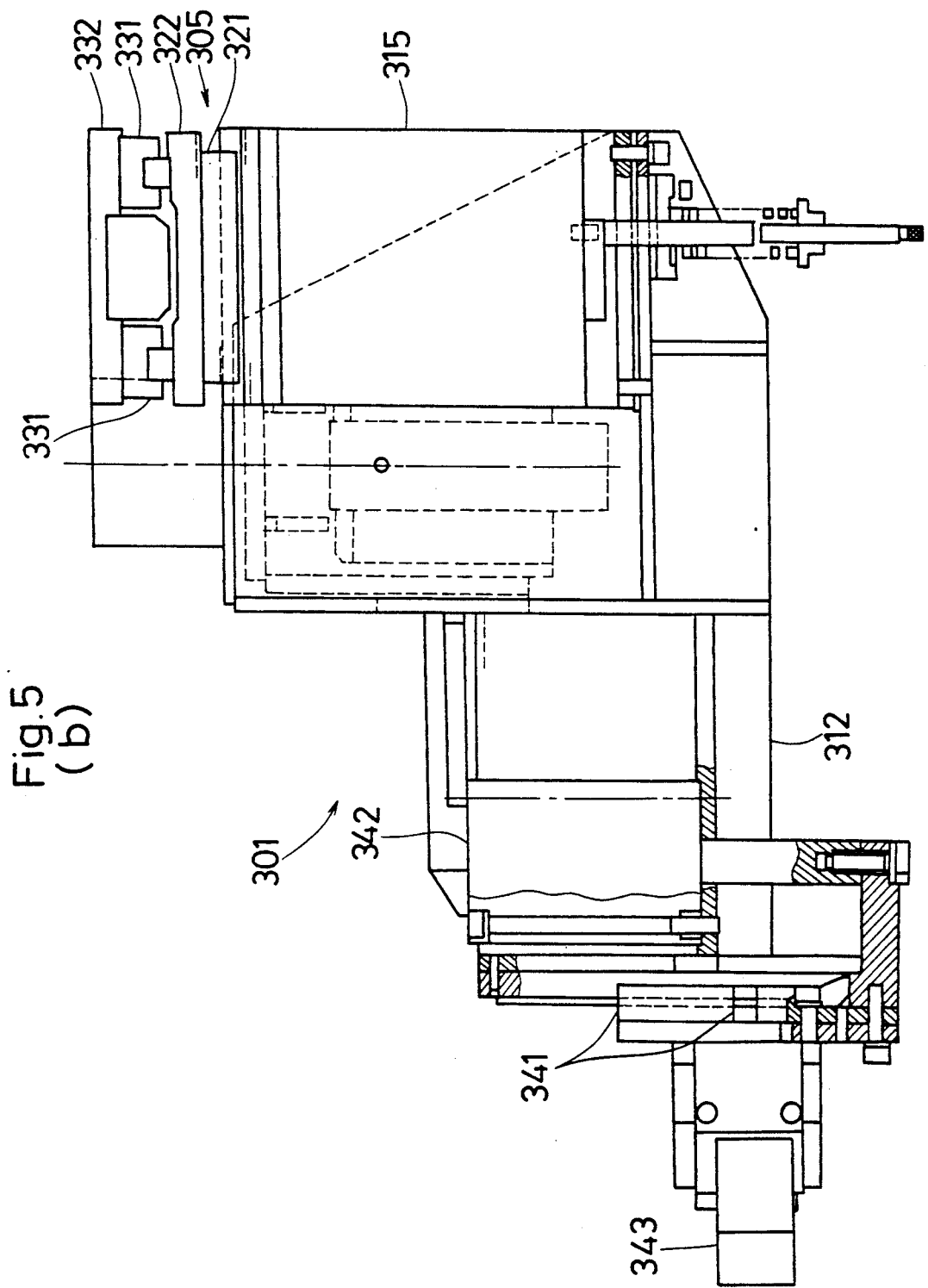
FIG. 5(b) is the left side elevation view in FIG. 5(a)
Figure 6:
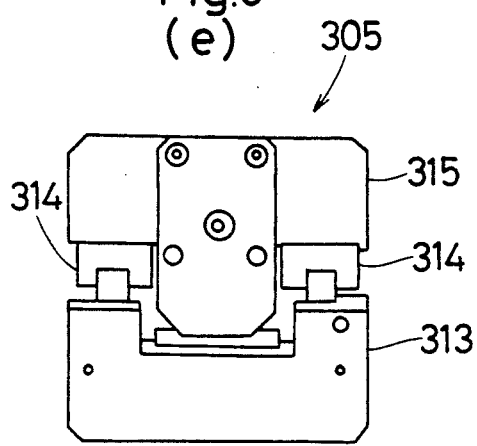
FIG. 6 shows the structure of the supporting mechanism which constitutes the drawing out and inserting mechanism.
Figure 6:
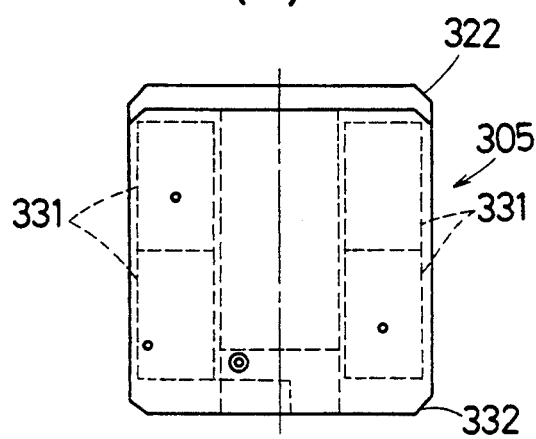
Figure 6:
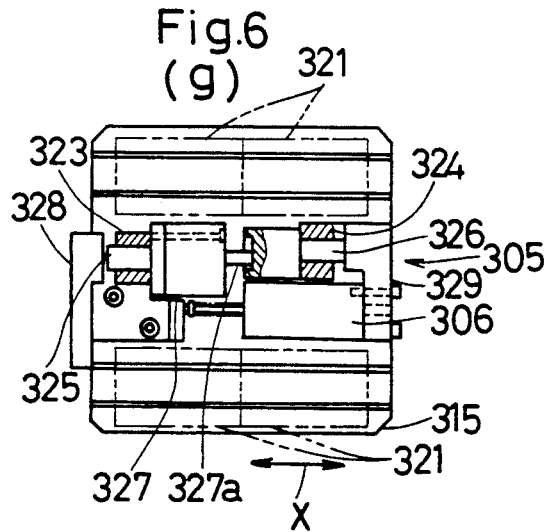
Figure 6:
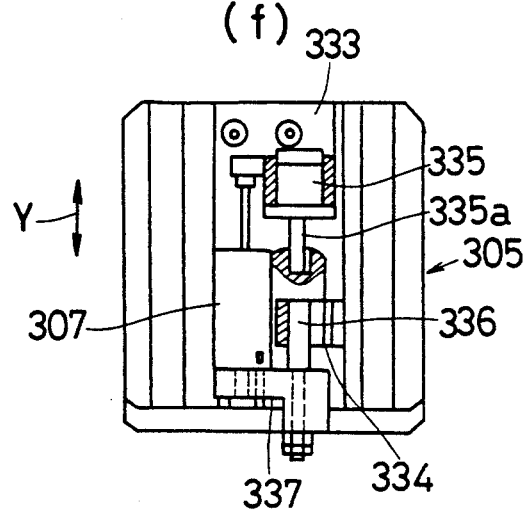

As shown in FIG. 5, FIG. 6, and FIG. 7, the pin drawing out and inserting mechanism 301 has a sensing claw 302 which has an opening 302a being opened like taper and can be inserted through the opening 302a into the shaft portion of the pin 304 inserted in the opening 303 (FIG. 7) and can be engaged with the pin 304, a floating device 305 (FIG. 6) which can shiftably support the sensing claw 302 in the X, Y and Z directions so that the sensing claw 302 can move, being led by the opening 302a adjacent to the shaft portion of the pin 304 when inserting the sensing claw 302 in the pin 304, potentiometers 306 and 307 (FIG. 6) which can detect the position of the pin 304 from the travelling distance of the sensing claw 302 when the sensing claw shifts, being led by the opening 302a adjacent to the shaft portion of the pin 304, a memory (in the operation section) in the control equipment (FIG. 2), which can memorize the position of the pin 304 detected by the potentiometers 306 and 307, a pin pushing claw 308 which can drawn out the pin 304 from a through-hole 303 by pushing one end of the pin 303 inserted into the through-hole 303 toward the axial direction, a pin holding claw 309 which is supported by the floating device 305, move together with the sensing claw 302 is accompanying with the inserting movement of the sensing claw 302 for the pin 304, be positioned for the axial center of the pin 304 and can support the pin 304 drawn out from the through hole 303 by action of the pin pushing claw 308, and a pin inserting claw 310 which is attitute-compensated and positioned together with the pin holding claw 309 according to the position of the pin 304 memorized in the memory and can insert the pin 304 in the through hole 303 by pushing the the other end of the pin 304 supported by the pin holding claw 309 toward the axial direction.

In this case, the pin position detection mechanism 361 comprises the sensing claws 302, the floating device 305 and the potentiometers 306 and 307, etc.

As the apparatus according to the above embodiment is provided with two pins 304 at both the upper and lower positions, the equipment is attitute-compensated and positioned according to the position of the pins 304 detected by the pin position detection mechanism 361 when drawing out the pins 304 and 304. This mechanism is described in details later.

The ensuing description explains the constitutional elements of the above mechanism.

Figure 9:
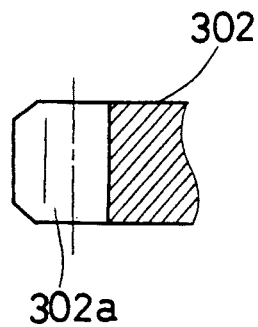
FIG. 9 shows the structure of another embodiment of the position detection member which constitutes the above drawing out and inserting mechanism.
Figure 9:
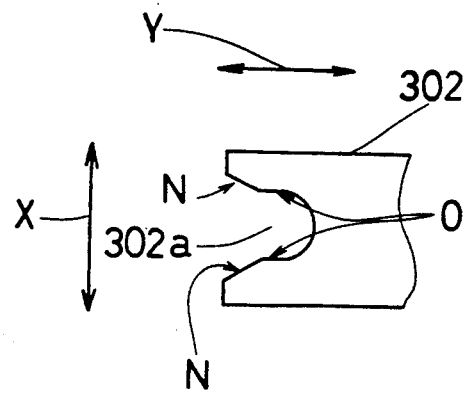

As shown in FIG. 5(c), the sensing claw 302 is driven and caused to slide in the Y-direction of a pneumatic cylinder 311, and the opening portion 302a of the sensing claw 302 consists, as shown in FIG. 9, of tapered portions (N portions) and parallel portions (O portions) coming after the tapered portions in the Y direction. By virtue of this shape, unnecessary force does not operate on the sensing claw 302 in the X direction when the sensing claw 302 moves in the Y direction after the sensing claw 302 is positioned for the X direction, being led by the tapered portions of the opening 302a in contact with the shaft portion of the pin 304 when the sensing claw 302 is inserted in the shaft portion of the pin 304.

In the floating device 305 (FIG. 5(c)), the sensing claw 302 and the pneumatic cylinder 311 are supported by the frame 312 which is attached to the base 313 (FIG. 5(a)). The base 313 is so supported by slide bearings 314 that the base 313 can slide in the Z direction for the base 315. As shown in FIG. 6(b), the base 313 is provided with brackets 316 and 317 into which shafts 318 and 319 are inserted slidably in the Z direction, respectively. The shafts 318 and 319 are elastically energy-charged in the opposite direction of the Z direction by a coil spring 320 at all times, and the upper end portion of the shaft 318 and the lower end portion of the shaft 319 are in contact with the upper and the lower portions of the base 315, respectively.

Therefore, the base 313 is elastically supported at the neutral position in the Z direction for the base 315 by means of the spring 320 at all times.

Namely, supposed that the base 313 has moved, for instance, downwards, in FIG. 6(a), the shaft 318 moves downwards together with the base 313 to cause the spring 320 to be compressed. At this time, the movement of the shaft 319 is controlled by the base 315, and the shaft 319 keeps its current position. On the other hand, in the case that the base 313 has moved upwards, the above movement is reversed. Through the above movements, the base 313 is elastically held at the neutral position for the base 315 at all times. And even in the case that the floating device 305 moves at a high speed, the base 313 will never sway in the Z direction for the base 315 by virtue of the initial force of the spring 320.

The base 315 is supported slidably in the X direction for the base 322 by means of the slide bearing 321. Brackets 323 and 324 (FIG. 6(g)) are attached to the upper surface of the base 315. Shafts 325 and 326 are inserted into the brackets 323 and 324 so that they can freely slide in the X direction. A pneumatic cylinder 327 of which piston rod 327a is brought into contact with one end portion of the shaft 326 is attached to one end portion of the shaft 325. The other end portions of the shafts 325 and 326 are brought into contact with the stoppers 328 and 329 attached to both sides of the base 322, respectively.

The pneumatic cylinder 327 makes almost the same actions as those of the spring 320 and is for holding the base 315 at the neutral position in the X direction for the base 322. However, by using the pneumatic cylinder 327 instead of the spring 320, it is possible to freely change the setting of the level of the holding force from 0 (zero) to an adequate figure according to the air pressure.

Figure 8:
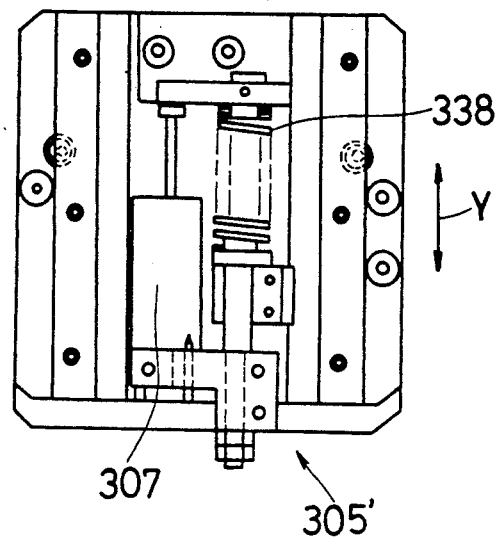
FIG. 8 shows another example of the embodiments of the supporting mechanism.
Figure 8:
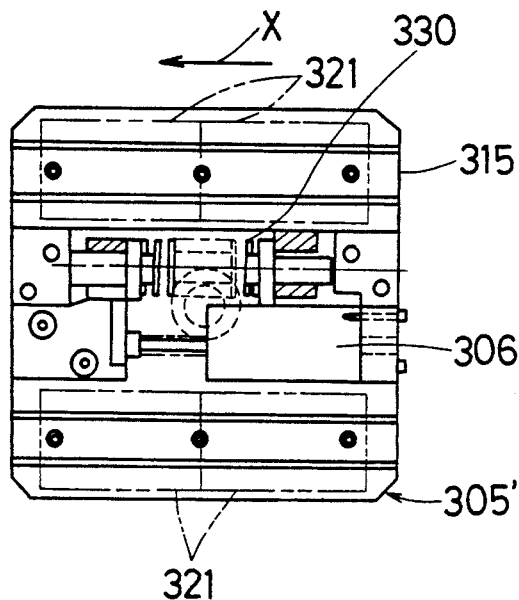

Therefore, in this case, it is also possible to use a spring 330 instead of the pneumatic cylinder 327 (FIG. 8(b)).

The travelling distance of the base in the X direction for the base 322 is detected by the potentiometer 306 (FIG. 6(g)).

The base 322 is so supported by the slide bearing 331 that it can freely slide in the Y direction for the base 322. Brackets 333 and 334 (FIG. 6(f)) are attached to the upper surface of the base 322. The body of a pneumatic cylinder 335 is inserted into the bracket 333, and the piston rod 335a of the pneumatic cylinder is brought into contact with the shaft 336 which is slidably inserted in the bracket 334 in the Y direction. Furthermore, the other end of the shaft 336 is brought into contact with the stopper 337 attached to the side portion of the base 332.

The pneumatic cylinder 335 is for holding the base 322 at the position of the stroke end for the base 332 by action similar to the case of the pneumatic cylinder 327, and it is possible to use a spring 338 instead of the pneumatic cylinder 335 (FIG. 8(a)).

The travelling distance of the base 322 for the base 332 in the Y direction is detected by the potentiometer 307.

The base 332 is attached to the upper and the lower positions of the arm 339 (FIG. 1 and FIG. 3), and the arm 339 is attached to a rotary shaft, both of which are intercrossed with each other. The arm 339 is driven and caused to sway in the B direction by a motor 362 and is driven and caused to sway in the T direction by another motor 363. Thus, the bases 332 are so composed that they can correspond to the inclination of the pins 304 and 304.

In this case, it is possible to provide the arm 339 with a rotary shaft in the U direction (i.e, the horizontal direction). Consequently, the pin drawing out and inserting mechanism 301 can be placed in a narrow clearance between the vehicle body frame 360 and the door 123a, thereby causing the teaching work to be further easily carried out.

Furthermore, the arm 339 is attached to the arm 364 by way of the rotary shaft, and the arm 364 is driven and caused to slide on the base 365 in the Z direction by a motor 336. The base 365 is driven and caused to slide on the arm 367 in the Y direction by another motor 368. The arm 367 is mounted at the base 369 and the base 369 is driven and caused to slide on the frame 370 in the X direction by a motor 371.

The arm 339 is positioned at the appointed position taught in advance by driving each of the motors 362, 363, 366, 368, and 371.

Here, the procedure for detecting the position of the pins 304 by using the sensing claw 302 supported by the floating device 305 is explained below;

First by operating the arm 339 in the Y direction the sensing claw 302 is forcedly pushed in the shaft portion of the pin 304, the sensing claw 302 moves in the X direction, being led by the opening portion 302a in contact with the shaft portion of the pin 304. At this time, the travelling distance is detected by the potentiometer 306. And the arm 339 is controlled through feedback according to the deviation detected thereby, and the position of the arm 339 is compensated for the position of the pin 304. Also, the position compensating amount for the Y direction is detected by the potentiometer 307.

In this case, if pressure of a high value is given to the pneumatic cylinders 327 and 335 at all times, the pin 304 and the arm 339 may be distorted by being pushed by the sensing claws 302 to prevent an accurate detection. For this reason, the pressure of the pneumatic cylinder 327 is roughly 0 (zero) in the X direction. And it is better that the pressure of the pneumatic cylinder 335 is set to a comparatively low value. Consequently, the force operating on the pin 304 and the arm 339 may become a comparatively low value only in the Y direction, thereby causing errors of the detection amount due to deflection to be nearly excluded.

Also, in order to more accurately obtain the detection amount for the Y direction by considering influences due to deflection of the arms 339, etc., the arm 339 is shifted in the Y direction so that the potentiometer can show an appointed value. At this time, the travelling distance of the arm 339 becomes the value obtained by adding the amount of deflection of the arm 339, etc. to the travelling distance of the potentiometer 307 itself. After the position of this time is taught, an operator shifts down the arm 339 and again moves the arm 339 to the position where the sensing claw 302 is brought into soft contact with the shaft portion of the pin 304. The operator teaches the travelling distance of the arm 339 of this time. As the travelling distance taught by that the operator moves the arm 339 as shown in the above includes the amount of deflection, it is possible to grasp the amount of deflection of the arm 339, etc., on sensing the pins 304, from the amount of action of respective potentiometers according to the firstly taught value and the later taught value. If the position compensation is carried out according to this value, the position of the pin 304 in the Y direction can be accurately detected when making the movement thereof again.

As shown in FIG. 5 and FIG. 7, the pin pushing claw 308 is supported by the frame 312 and is driven and caused to slide in the Z direction by the pneumatic cylinder 340.

As the pin holding claw 309 and the pin inserting claw 310 are so supported by the slide bearings 341 that they can freely slide in the Z direction for the frame 312 and is driven and caused to slide by the pneumatic cylinder 342. The pin holding claw 309 is further driven and closed to slide in the Y direction by the pneumatic cylinder 343.

Figure 7A:
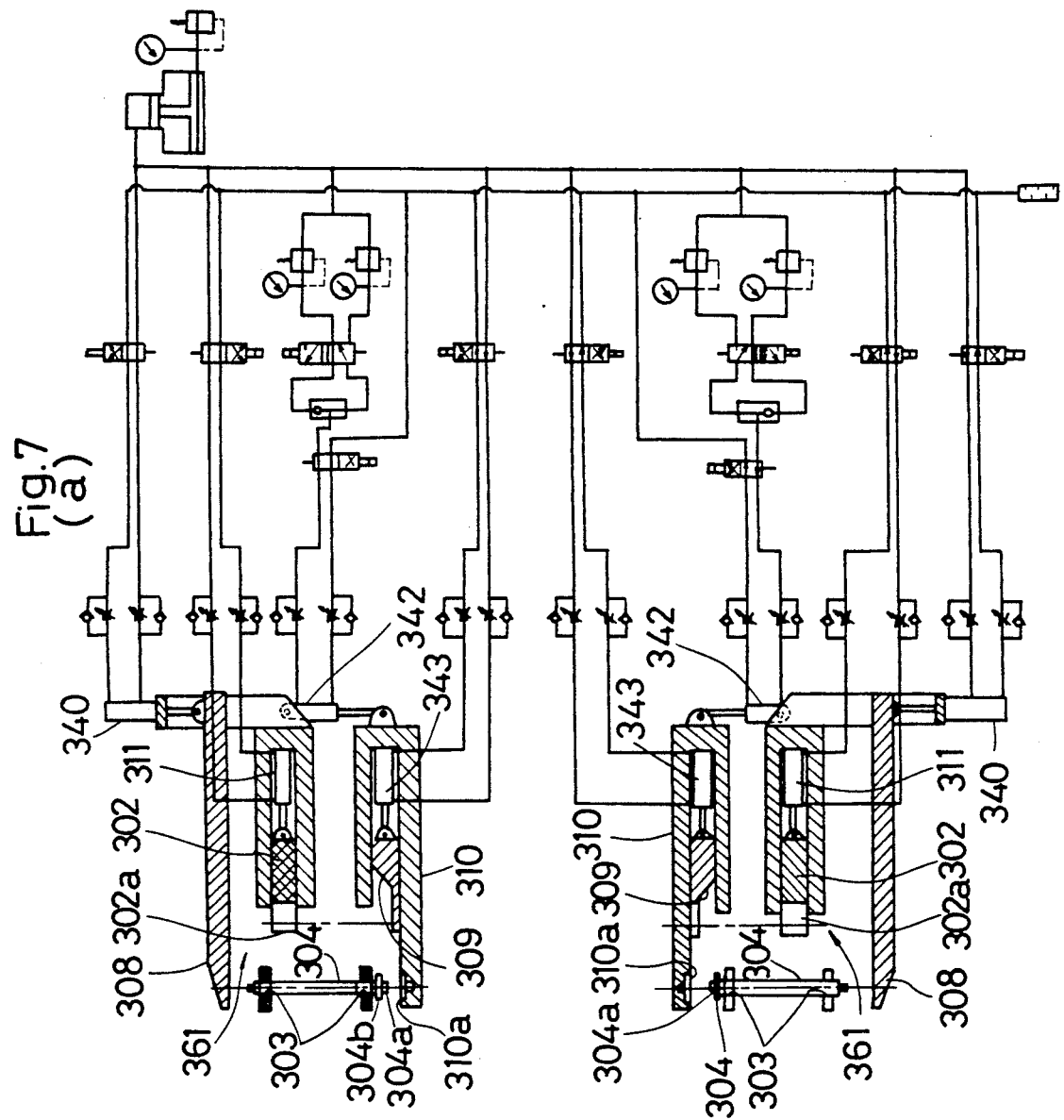

In the equipment according to this embodiment, an engaging hole (See FIG. 7(a)) is prepared at the tip end of the pin inserting claw 310 and the engaging hole 310a is engageable with the tapered portion 304a which is formed at the end portion of the pin 304. And when the tapered portion 304a of the pin 304 is engaged with the engaging hole 310a of the pin inserting claw 310, the flange portion 304b formed at the end portion of the pin 304 is held by the pin holding claw 309, thereby causing the pin 304 drawn out of the through hole 303 to be held.

Namely, this embodiment is so composed that the pin can be held by mutual cooperation between the pin holding claw 309 and the pin inserting claw 310.

Also, by so composing that the pin 304 can be held by a set of the holding members which are driven for opening and closing by an actuator instead of the pin holding claw 309, machining for the tapered portion 304a of the pin 304, the engaging hole 310a of the pin inserting claw 310, etc. can be omitted.

When the pin holding claw 309 and the sensing claw 302 are driven and caused to slide by respective pneumatic cylinders 343 and 311, the pin holding claw 309, the sensing claw 302 and the engaging hole 310a of the pin inserting claw 310 are so composed that each axial center thereof can be aligned with each other.

The pin drawing out and inserting mechanism 301 according to this embodiment is so composed as shown above.

Figure 10:
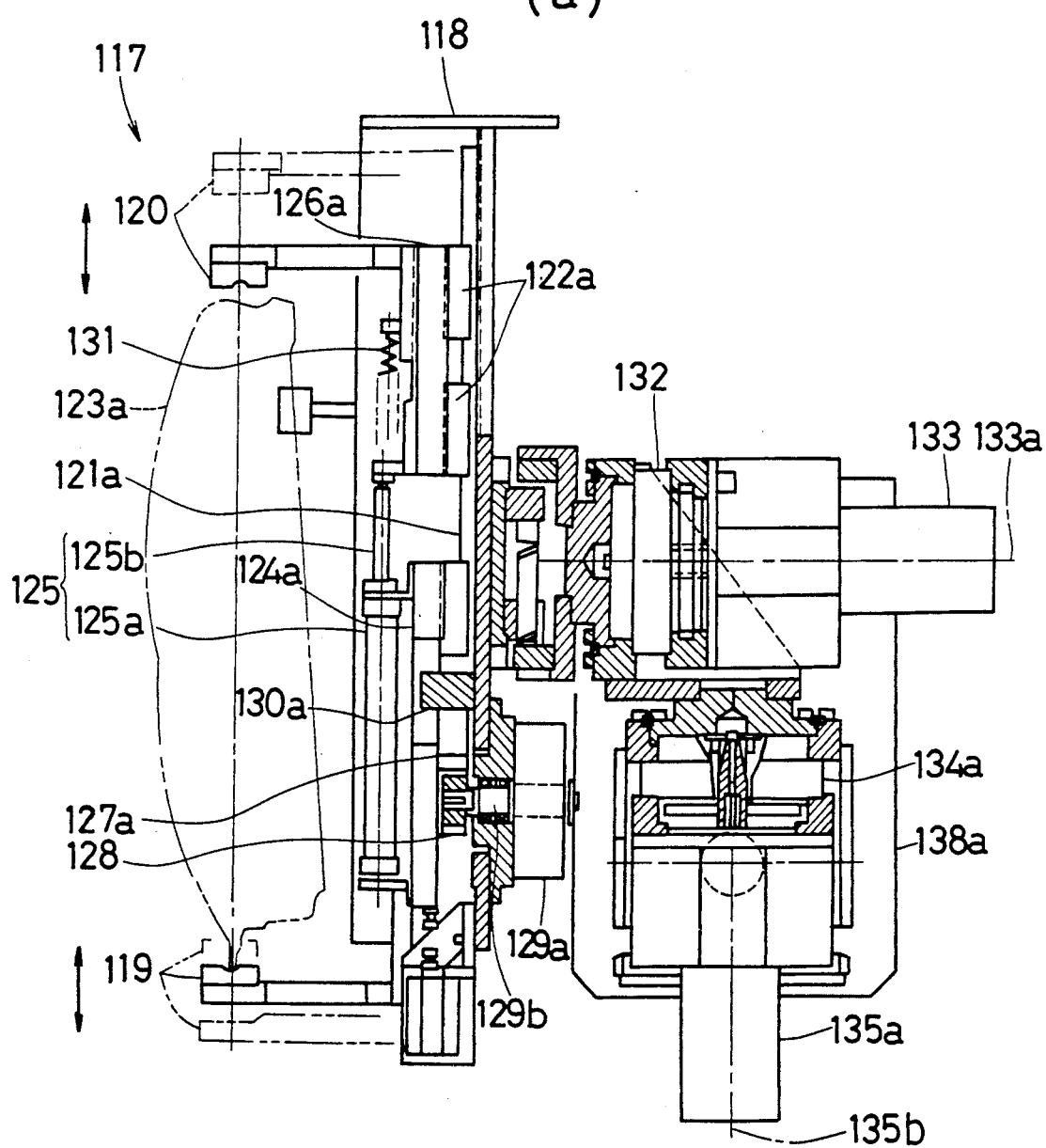
FIG. 10 shows the principal portions of the holding mechanism which constitutes the attaching and detaching apparatus.
Figure 10:
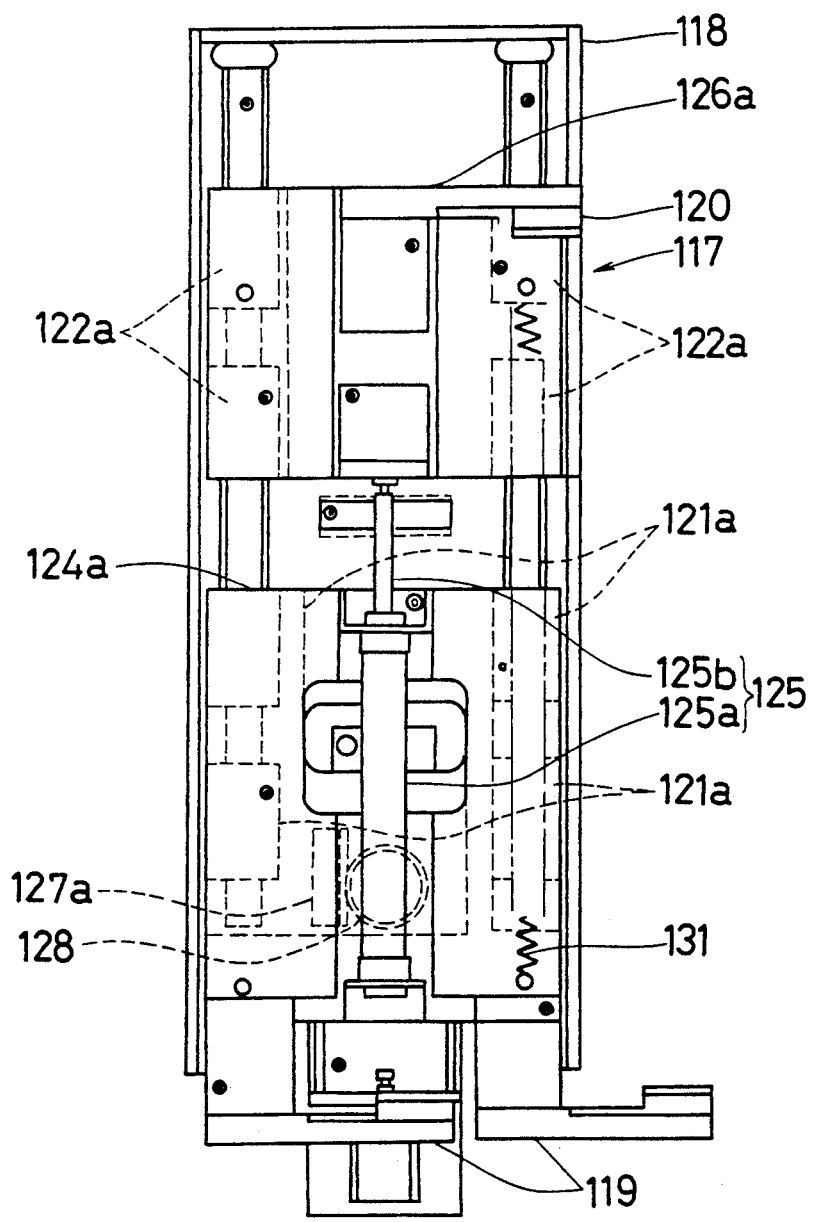

As shown in FIG. 4 and FIGS. 10(a), (b) and (c), the holding claws 119, 119 and 120 are oppositely arranged on the frame 118 in the door holding mechanism 117. The holding claws 119 and 119 are mounted at the lower part of the base 124a, and the base 124a is so supported by the slide bearings 121a that the base 124a can slide in the vertical direction.

The holding claw 120 is mounted at the upper end portion of the base 126a and the base 126a is so supported by the slide bearings 122a that the base 126a can slide vertically on the frame 118.

The holding claws 119, 119 and 120 are for holding the door 123a when detecting and attaching the door 123a which has been assembled to the vehicle body frame 360 (FIG. 1) through the real parts matching in the assembling line for vehicles.

The body 125a of the pneumatic cylinder 125 is mounted at the base 124a, and the piston rod 125b of the pneumatic cylinder 125 is fixed at the base 126a.

Therefore, the pneumatic cylinder 125 and the holding claw 119 and 120 freely travels in the opening and closing direction (vertical direction) of the holding claws 119 and 120 relatively for the frame 118.

The base 124a is provided with a rack 127a, and a gear 128 engageable with the rack 127a is fixed at the output shaft 129b of the brake 129a attached to the frame 118.

The brake 129a is for holding the relative position of the holding claws 119 and 120 for the door 123a by operating the brake 129a after the door 123a is held by closing the holding claws 119 and 120 by means of the pneumatic cylinder 125.

In FIGS. 10(a) and (b), the holding claws 119 and 120 are elastically energy-charged toward a stopper 130a in the closing direction at all times by means of the coil spring 131. Even in the case the air pressure in the pneumatic cylinder 125 is lowered due to a certain reason while the door holding mechanism 117 is in action, the holding condition for the door 123a can be maintained.

Furthermore, in the door holding mechanism 117 according to this embodiment, the frame 118 is connected to the motor 133 through reduction gears 132 and is driven and rotated by the motor 133 on the plane intercrossed with the right angle with the axial center 133a of the motor 133. The frame 118, the reduction gears 132 and the motor 133 are connected to another motor 135a through reduction gears 134a. Then, the frame 118 is driven and rotated by the motor 135a on the plane intercrossed with the right angle with the axial center 135b of the motor 135a.

Furthermore, as shown in FIG. 10(C), the frame 118, the reduction gears 132, 134a, the motors 133 and 135a are connected to still another motor 137 by way of reduction gears 136a. The frame 118 is driven and rotated by the motor 137 on the plane intercrossed with the right angle with the axial center 137a of the motor 137.

Therefore, the door holding mechanism 117 can cope with the inclination of the door 123a by driving the motors 133, 135a and 137.

The frame 118, the reduction gears 132, 134a and 136s and the motor 133, 135a and 137 are supported by the base 150a (FIG. 4) through the bracket 138a.

The base 150a is driven and caused to slide in the Z direction by the motor 152a on the arm 151a. The arm 151a is mounted at the base 153, and the base 153 is driven and caused to slide on the arm 154a in the Y direction by the motor 155a. Still further, the arm 154a is driven and caused to slide on the base plate 156a in the X direction by the motor 157.

The door holding mechanism 117 can be positioned at the appointed position taught in advance by driving each of the motors 133, 135a, 137, 152a, 155a and 157.

Then, in the above embodiment, it has been explained as example that the holding claws 119 and 120 are driven for opening and closing by the pneumatic cylinder 125. However, it is possible that the equipment is so composed as for the holding claws 119 and 120 to be driven for opening and closing by a motor having a brake instead of the pneumatic cylinder 125.

The example of this case is shown in FIGS. 11(a) and (b).

In the door holding mechanism 139a shown in FIG. 11(a), the holding claws 119 and 120 are slidably supported by the shaft 140a, and the motor 141a having a brake is slidably supported in the opening and closing direction of the holding claws 119 and 120. And a gear 142a attached to the output shaft of the motor 141a having a brake is engageable with the rack 119a and 120a installed on the holding claws 119 and 120, respectively.

In the door holding mechanism 143a shown in FIG. 11(b), the holding claws 119 and 120 are slidably supported by the shaft 140a, and the motor 141a having a brake is mounted on the other holding claw 119. And the gear 142a attached to the output shaft of the motor 141a having a brake is engageable with the racks 119a and 120a installed on the other holding claws 119 and 120.

In the door holding mechanism 143a shown in FIG. 11(b), the holding claws 119 and 120 are slidably supported by the axis 140a, and the motor 141a with brake is mounted on one holding claw 229. Then, the gear 142a attached to the output shaft of the motor 141a with brake is engaged with the rack 120a provided on the other holding claw 120.

As the motor 141a having a brake is driven and rotated on the door holding mechanism 139a and 143a, respectively, the motor 141a having a brake moves in the closing direction of the holding claws 119 and 120 in accompanying with the closing movement of the holding claws 119 and 120. And the door 123a can be held by the holding claws 119 and 120 which can move, following the position of the door 123a.

Figure 12:
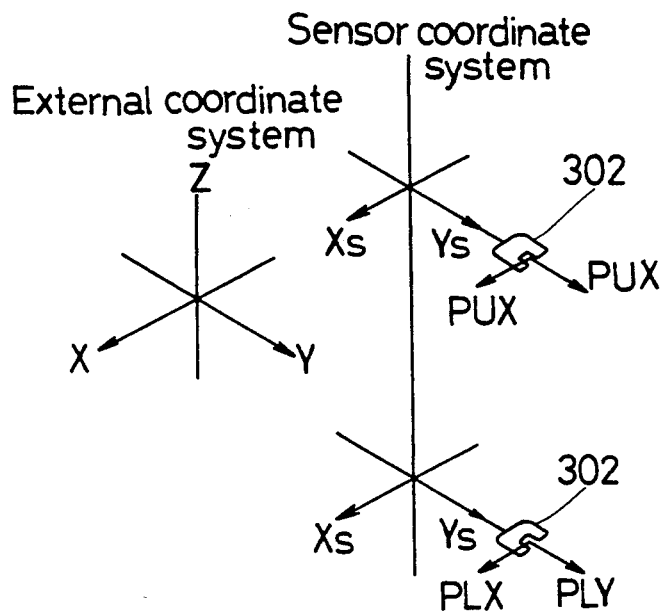
FIGS. 12(a) through 12(e) are the views for explaining the procedure in the case of compensating the position of the drawing out and inserting mechanism and the holding mechanism on the basis of the position of the pins detected by the detection mechanism which constitutes the attaching and detaching equipment for doors.
Figure 12:
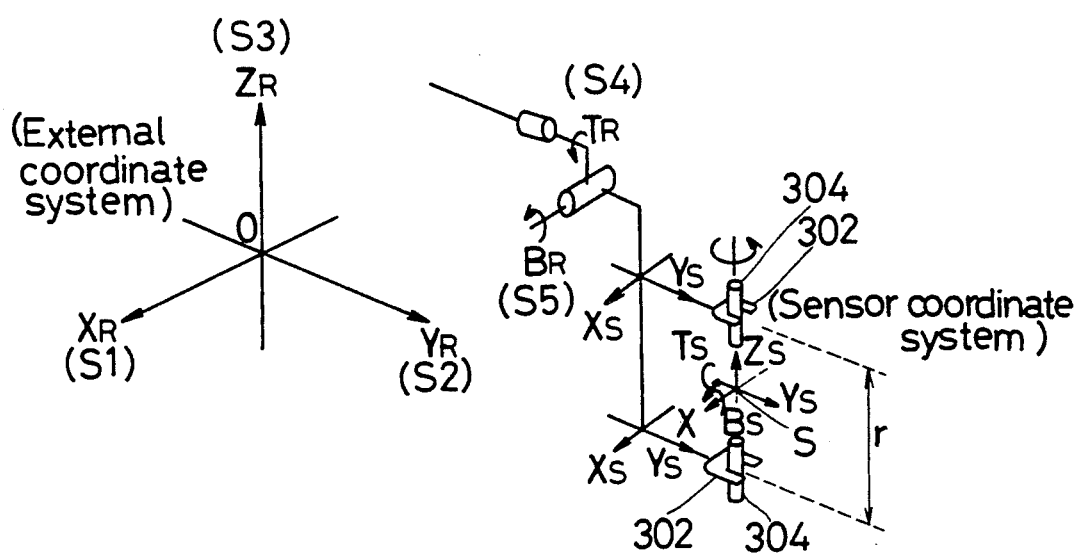
Figure 12:
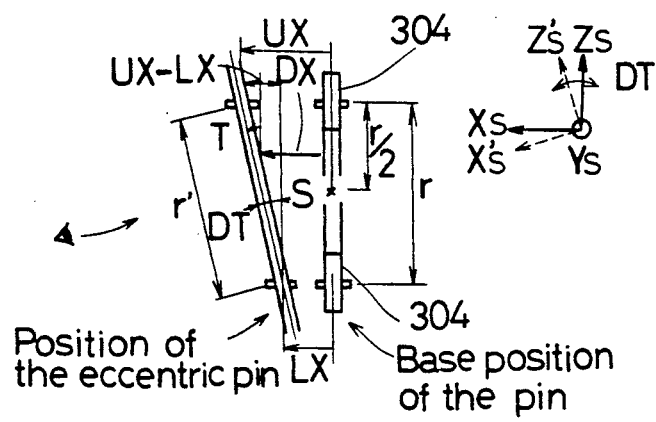
Figure 12:
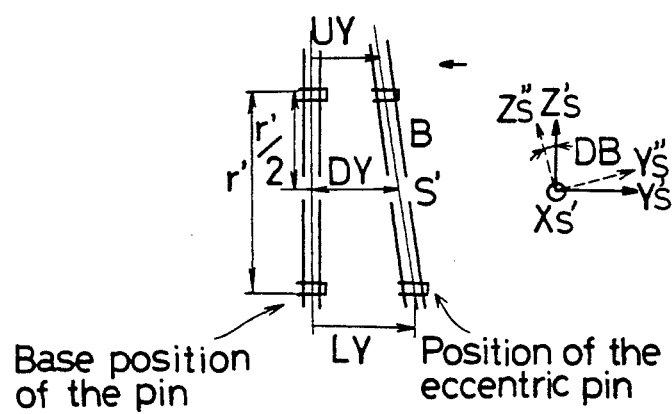
Figure 12:
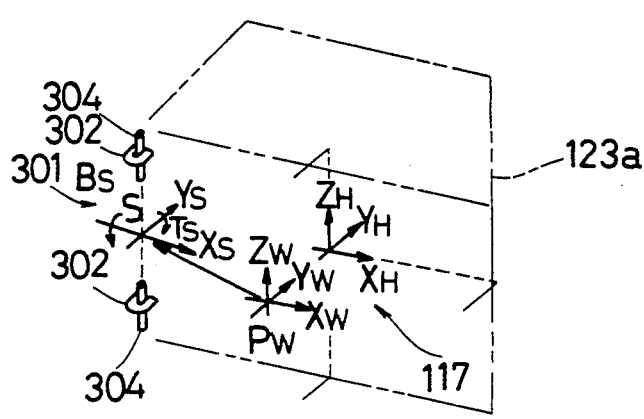

Subsequently, according to FIG. 2 and FIG. 12, the ensuing description explains the procedure for the case of compensating the position of the pin drawing out and inserting mechanism 301 and the door holding mechanism 117 on the basis of the position of the pins 304 and 304 detected by the pin position detection mechanism 361 and 361, using two pin position detection mechanisms 361 which has been so compensated as shown above.

Figure 2:
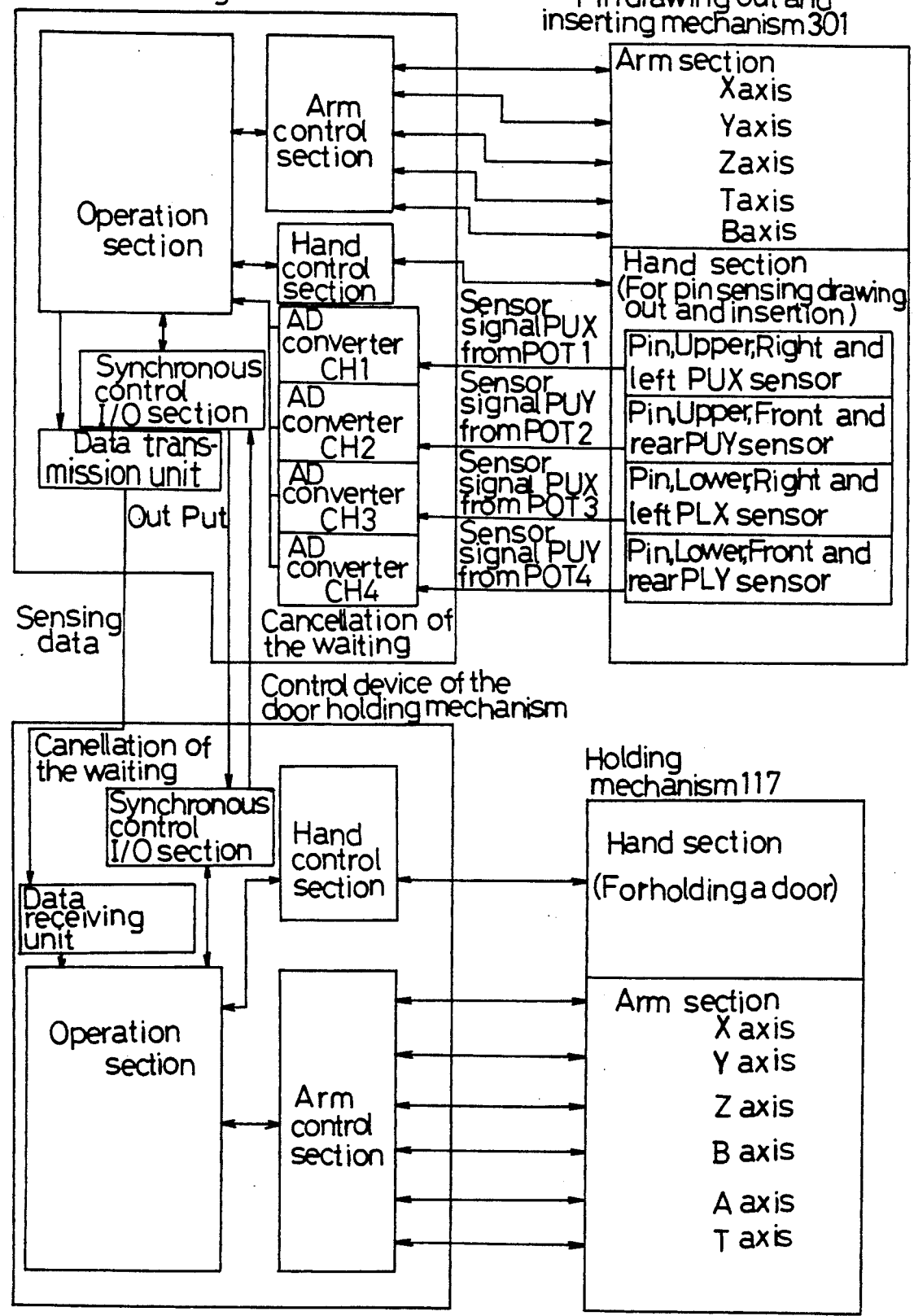
FIG. 2 is a block diagram showing the control system of the attaching and detaching apparatus for doors.

In FIG. 2, each arm control section is for controlling the operating shaft of each arm of the pin drawing out and inserting mechanism 301 and the door holding mechanism 117, and each hand control section is for controlling the sensing claws 302, the pin pushing claws 308, the pin holding claws 309, the pin inserting claws 310 and the pin holding claws 119 and 120, all of which are attached to each of the tip end of the pin drawing out and inserting mechanism 301 and the door holding mechanism 117.

Sensor signals from the potentiometers 306 and 307 of the detection mechanism 361 built in the pin drawing out and inserting mechanism 301 are inputted in an AD converter which can output the sensor signals as digital signal to the operation section. Each operation section processes the detected data shown in the equations of calculation described later and executes the calculation for compensating the position of the pin drawing out and inserting mechanism 301 and the door holding mechanism 117.

The data transmission unit is for transmitting the information pertaining to the position data of the pins 304 and 304 detected by the pin position detection mechanism 361 to the control device of the door holding mechanism 117, and the data receiving unit is receiving the data for compensation (information pertaining to the position data) on the basis of the position data of the pins 304 and 304 which is transmitted from the control device of the pin drawing out and inserting mechanism 301. For instance, an RS232 communication interface, etc. is used as transmission and receiving units.

The synchronous control input and output section is for inputting and outputting the synchronous signals in accompanying with completion of movements from the mating device between the control device of the pin drawing out and inserting mechanism 301 and that of the door holding mechanism 117. These input and output signals are taught in advance in the action programs of the pin drawing out and inserting mechanism 301 and the door holding mechanism 117.

The position of the pin drawing out and inserting mechanism 301 and the door holding mechanism 117 is compensated in compliance with, for instance, the following procedure.

In the potentiometers 306 and 307, it is supposed that the maximum elongation dimension of respective detection rods is 20 mm and that the potentiometer 306 to detect the travelling distance pertaining to the X direction of the sensing claw 302 engageable with the pin 304 located upwards is POT1. The number of the pulses generated with the detection rod of the potentiometer 306 elongated is supposed to be 10 pulses and the number of pulses generated with the detection rod contracted is supposed to be 990 pulses.

It is supposed that the potentiometer 307 to detect the travelling distance pertaining to the Y direction of the above sensing claw 302 located upwards in POT2, another potentiometer 306 to detect the travelling distance pertaining to the X direction of the sensing claw 302 engageable with the pin 304 located downwards in POT3, and the potentiometer 307 to detect the travelling distance pertaining to the Y direction of the sensing claw 302 located downwards in POT4. The number of pulses generated with each detection rod of POT2, POT3 and POT4 elongated is supposed to be 10 pulses and the number of pulses generated with each detection rod of POT2, POT3 and POT4 contracted is supposed to be 990 pulses. Also, in this case, the elongation and contraction direction of the detection rods of POT2, POT3 and POT4 is opposite to that of the POT1.

At first (See FIG. 12(a)), in the case that the sensing claw 302 located upwards is displaced in the positive (+) X direction, the detection rod of the POT1 is contracted to cause the number of the generating pulses to be increased.

In this case, the amount of displacement PUX (mm) is expressed by $PUX$ (mm) = ($PUX$ (Pulses) $-e_{pux}$)/$d_{pux}$.

Here, $d_{pux}$=49.0 (Pulses/mm) and $e_{pux}$=10 (Pulses), and they are given as parameters in advance.

In the case that the sensing claw 302 located upwards is displaced in the positive (+) Y direction, the detection rod of the POT2 is elongated and the number of generating pulses is decreased.

The amount of displacement of this case PUY (mm) is expressed by $PUY$ (mm) = ($P_{uy}$ (Pulses) $-e_{puy}$)/$d_{puy}$.

Here, $d_{puy}$=−49.0 (Pulses/mm) and $e_{pux}$=990 (Pulses), and they are given as parameters in advance.

In the case that the sensing claw 302 located downwards is displaced in the positive (+) X direction, the detection rod of the POT3 is elongated and the number of generating pulses is decreased.

The amount of displacement of this case PLX (mm) is expressed by $PLX$ (mm) = ($P_{LX}$ (Pulses) $-e_{PLX}$)/$d_{PLX}$.

Here, $d_{PLX}$=−49.0 (Pulses/mm) and $e_{PLX}$=990 (Pulses), and they are given as parameters in advance.

In the case that the sensing claw 302 located downwards is displaced in the positive (+) Y direction, the detection rod of the POT4 is elongated and the number of generating pulses is decreased.

The amount of displacement of this case PLY (mm) is expressed by $PLY$ (mm) = ($P_{LY}$ (Pulses) $-e_{PLY}$)/$d_{PLY}$.

Here, $d_{PLY}$=−49.0 1 (Pulses/mm) and $e_{PLY}$=990 (Pulses), and they are given as parameters in advance.

Next, the procedure of calculation of the positional displacement of the pins 304 and 304 is explained with reference to FIGS. 12(b), (c) and (d).

In this case, it is supposed that the axial centers of the pins 304 and 304 are on the same axial line and there is no displacement in the structure between the pins 304 and 304. Therefore, the pins 304 and 304 are inclined in the same direction with the same angle on the same axial line.

Firstly, S is set as base point on the work, and coordinates of Xs, Ys and Zs are defined in the travelling direction of the sensing claw 302, using this S point as origin;

On the plane Zs—Zs, $$D_x = \frac{UX + LX}{2}$$

$$DT = \tan^{-1} \frac{UX - LX}{r}$$

On the plan Ys - Z's, $$D_y = \frac{UY + LY}{2}$$

-continued $$DB = -\tan^{-1}\left(\frac{UY - LY}{r'}\right)$$

Here,
r=appointed number,
$r' = \sqrt{r^2 + (UX-LX)^2}$, UX=PUX−PUX0,
LX=PLX−PLX0, UY=PUY−PUY0, LY=−PLY−PLY0, and PUX0, PLX0, PUY0 and PLY0 are the base value data measured in advance.

Here it is supposed that the parallel travelling distance Dz (not detected in this embodiment) in the Zs direction is "0" and the degree DA of the rotary angle around the shaft Zs" (not necessary to detect because the pin 304 is of a circular shape) is "0".

From the above description, on the coordinate system Xs, Ys and Zs of the sensor, the parallel travelling distance is (Dx, Dy, Dz)s, and the rotary travelling distance is (DT, DB, DA)s.

The position compensation is controlled for each of the axes $X_R$, $Y_R$, $B_R$, and $T_R$ of the pin drawing out and inserting mechanism 301, thereby causing the position to be compensated according to the value of DT and DB so that the base point for the work can be shifted from S to S' and the work attitude can be shifted in the B and T directions.

The conversion of this case depends upon the following equation for compensation calculation. Supposed that the coordinate values of $X_R$, $Y_R$, and $Z_R$ of the origin S (the intermediate point between the upper sensing claw 302 and the lower sensing claw 302) are (x, y, z) and the attitude matrix of the sensor coordinate axes Xs, Ys and Zs for the coordinate ($X_R$, $Y_R$, $Z_R$) of the pin drawing out and inserting mechanism 301 is | H. The position compensation is carried out by:

$$\begin{pmatrix} x' \\ y' \\ z' \end{pmatrix} = \begin{pmatrix} x \\ y \\ z \end{pmatrix} + \begin{pmatrix} D_x \\ D_y \\ 0 \end{pmatrix}$$

$$|H' = |H \cdot \begin{pmatrix} 1 & 0 & 0 \\ 0 & \cos DB & -\sin DB \\ 0 & \sin DB & \cos DB \end{pmatrix} \begin{pmatrix} \cos DT & 0 & \sin DT \\ 0 & 1 & 0 \\ -\sin DT & 0 & \cos DT \end{pmatrix}$$

Now, $\begin{pmatrix} x' \\ y' \\ z' \end{pmatrix}$ : Position of the sensor coordinate origin after the compensation

|H: Attitude matrix of the sensor coordinate axis after compensation is completed $\begin{pmatrix} D_x \\ D_y \\ 0 \end{pmatrix}$ = |b: Position compensation vector $$\begin{pmatrix} 1 & 0 & 0 \\ 0 & \cos DB & -\sin DB \\ 0 & \sin DB & \cos DB \end{pmatrix} \begin{pmatrix} \cos DT & 0 & \sin DT \\ 0 & 1 & 0 \\ -\sin DT & 0 & \cos DT \end{pmatrix} =$$

C: Attitude compensation matrix

On the other hand, the door holding mechanism 117 receives the amount of deviation of pins 304 through the control device of the pin drawing out and inserting mechanism 301 from the pin position detection mechanism 361 and compensates the pin holding mechanism 117 itself as well as the pin drawing out and inserting mechanism 301 (Refer to FIG. 12(e)).

The amount of deviation of the pins 304 transferred from the control device of the pin drawing out and inserting mechanism 301 is that at the center "S" between the pins but is not the amount of deviation at the holding point of the door holding mechanism 117. Therefore, the compensation calculation is made, supposed that the work base point for the door holding mechanism 117 is located at the point "S" on the pin drawing out and inserting mechanism 301 even in the door holding mechanism 117.

On the assumption,

① it is supposed that the XY direction along which the pin drawing out and inserting mechanism 301 can travel and the $X_H$, $Y_H$, and $Z_H$ directions of the work attitude of the door holding mechanism 117 have been taught to be parallel.

② It is supposed that all from the pin center "S" point to the wrist top $P_H$ of the door holding mechanism 117 has been taught always to be in an appointed position relationship.

According to the assumption, the position vector $P_H$ S by the wrist coordinates $X_W$, $Y_W$, $Z_W$ of the door holding mechanism 117 from the wrist top $P_H$ of the door holding mechanism 117 to the pin center "S" point is regarded as base point of the work on the calculation of the door holding mechanism and is registered as parameters in advance.

And by using (rotary deviation in the $T_S$ and $B_S$ directions) and (parallel deviation of the pin center in the $X_S$ and $Y_S$ directions) which are detected by the pin drawing out and inserting mechanism 361, the door holding mechanism 117 compensates the "S" point as base point of the work and compensates $X_H$, $Y_H$ and $Z_H$ as work attitude.

The compensation calculation of this case is carried out by an equation similar to that of the pin drawing out and inserting mechanism 301.

The attaching and detaching equipment according to this embodiment is so composed as shown in the above description.

Subsequently, the ensuing description explains the procedure for removing a door 123a from a vehicle body frame and mounting the door 123a to, for example, a parts carrier (not illustrated) for painting, by using the attaching and detaching equipment shown in the above. (Refer to FIGS. 13(a) and (b)).

S1, S2, . . . in these figures show respective action steps.

Also, a module in these figures means a set of the points on which teaching of actions of respective mechanisms is carried out and includes a series of actions. And in respective modules, it is possible to specify whether or not the position of respective mechanisms themselves is compensated by the sensing data.

Moreover, those shown with arrows of a dashed line between the flow charts of each mechanism means delivery and receiving of signals to secure synchronization between mutual mechanisms.

As in the action programs shown in the above the subsequent action is started by delivery and receiving of action completion signal of each mechanism, it is possible to prevent to inference between mutual mechanisms and to enhance the reliability of the work. Also, as shown in each of the modules in the above action programs, as it is possible to appoint the beginning half portions as "Without compensation" and the ending half portion as "With compensation", a series of actions can be defined in a single action program.

Firstly, when removing a door 123a from the vehicle body frame 360 (refer to FIG. 13(a)), the pin drawing out and inserting mechanism 301 and the door holding mechanism 117 are reset at their original position, respectively, for the vehicle body frame 360 transferred to an appointed position on the assembly (line S1, S2).

Thereafter, as the motors 366, 368 and 371 are driven, the pin position detection mechanism 361 begins to move to an appointed position taught in advance aiming at the pins 304 and 304 on the vehicle body frame 360 together with the pin drawing out and inserting mechanism 301 (S3), and approaches the door 123a and the vehicle body frame 360 (S4).

In the above step S3, as the pin drawing out and inserting mechanism 301 begins to move, a waiting cancellation signal (T1) is outputted to the door holding mechanism 117 and on receiving this cancellation signal (T1) the door holding mechanism 117 begins to move to the position of the door 123a by driving the motor 152a, 155a and 157 (S5) and is positioned at an appointed position taught in advance in the vicinity of the door 123a (S6).

Then, another waiting cancellation signal (T2) is outputted from the door holding mechanism 117 to the pin position detection mechanism 361 built in the pin drawing out and inserting mechanism 301, thereby causing the amount of deviation pertaining to the X and Y directions of the pins 304 and 304 to be detected by shifting each sensing claw 302 equipped in two sets of the pin position detection mechanism 361 in the Y direction (S7).

Namely, the sensing claws 302 are caused to slide in the Y direction by the pneumatic cylinder 311. So, the sensing claw 302 moves in the X direction, being led by the opening 302a adjacent to the shaft portion of the pins 304. At this time, the travelling distance of the sensing claw 302 in the X direction is detected by the potentiometer 306 and the travelling distance thereof pertaining to the Y direction is also detected by the potentiometer 307. And the travelling distance of the sensing claws 302 are operated and processed, thereby causing the accurate position of the pins 304 to be calculated and to be memorized in the memory in the control device.

So, in the step S8, the position of the pin position detection mechanism 361 and the pin drawing out and inserting mechanism 301 is compensated by driving the motors 362, 363, etc. according to the amount of the positional deviation pertaining to the X and Y directions of the pins 304 and 304 detected in the step S7.

The detection data (T3) of the amount of the positional deviation of the pins 304 and 304 detected in the step S7 is outputted to the door holding mechanism 117 and at the same time a signal (T4) for cancelling the waiting status of the door holding mechanism 117 is outputted, too.

So, the position of the door holding mechanism 117 is compensated on the basis of the detection data by driving the motor 133, 135a and 137 (S9), thereby causing the door 123a to be held by the door holding mechanism 117 (S10).

Namely, as the brake 129a is released and the pneumatic direction 125 is operated in the direction of contraction, the holding claws 119 and 120 are supported by slide bearings 121a and 122a, respectively, and moves in the closing direction. As either one of the holding claws 119 and 120 is brought into contact with the lower end portion or the upper end portion of the door 123a and the action comes to a stop, only the holding claw 119 or 120 which is not in contact with the door 123a yet further moves in the closing direction.

As the other holding claw 119 or 120 is brought into contact with the lower end portion or the upper end portion of the door 123a, the door 123a enters the condition held by the holding claws 119 and 120. Namely, by making the closing action of the holding claws 119 and 120 by the pneumatic cylinder 125, the pneumatic cylinder also moves in the closing direction in accompanying with the closing action of the holding claws 119 and 120. And the door 123a is held by the holding claws 119 and 120 at the position following the door 123a.

Thereafter, the relative position of the holding claws 119 and 120 for the door 123a is held by actuating the brake 129a.

Therefore, in the door holding mechanism 117, any complicated control is not needed. It is possible to remarkably simply hold the door 123a, following the corresponding door 123a, without accurate positioning and position compensation of the doors 123a and the holding claw 119 or 120.

As the door 123a is held as shown in the above, a signal ($T_5$) for cancelling the waiting status is outputted to the pin drawing out and inserting mechanism 301.

So, in the step S11, the pins 304 and 304 are drawn out by the pin drawing out and inserting mechanism 301.

Namely, as the sensing claw 302 slides in the Y direction by the pneumatic cylinder 311, the pin pushing claw 308, the pin holding claw 309 and the pin inserting claw 310 are positioned for the shaft center of the pins 304 together with the sensing claw 302, in accompanying with the inserting movement of the sensing claw 302 for the pins 304.

Thereafter, one end portion of the pins 304 which has been inserted in the through hole 303 is pushed toward the axial center direction and the pins 304 ar drawn out from the through hole 303 since the pin pushing claw 308 is driven and caused to slide downwards by the pneumatic cylinder 340. And the pins 304 are held as the tapered portion 304a of the other end portion of the pins 304 is engaged with the engaging hole 310a of the pin inserting claw 310 and is driven and caused to slide forwards by the pneumatic cylinder 343.

Also, in the case that the pins 304 are inserted in the through hole 303 again, the other end portion of the pin 304 is pushed in the axial center direction by the pin inserting claw 310 as the pin 304 which is held by means of the pin holding claw 309 and the pin inserting claw 310 is driven and caused to slide upwards by the pneumatic cylinder 342. Consequently, the pin 304 is inserted in the through hole 303 again.

Namely, according to this embodiment, even though there is more or less unevenness in the position of insertion of the pin 304, the pin 304 can be inserted securely and simply, following the position of the pin 304.

As the pins 304 and 304 are thus drawn out and inserted by the pin drawing out and inserting mechanism 301, a signal ($T_6$) for cancelling the waiting status is outputted to the door holding mechanism 117 and by driving the motors 152a, 155a and 157, the door holding mechanism 117 can remove the door 123a (S12) and escape to the original position with the door 123a held (S13).

Simultaneously, a signal ($T_7$) for cancelling the waiting status is outputted to the pin drawing out and inserting mechanism 301, and the pin drawing out and inserting mechanism 301 also escapes to the original position (S14) with the pins 304 and 304 held by driving the motors 366, 368 and 371.

Figure 13B:
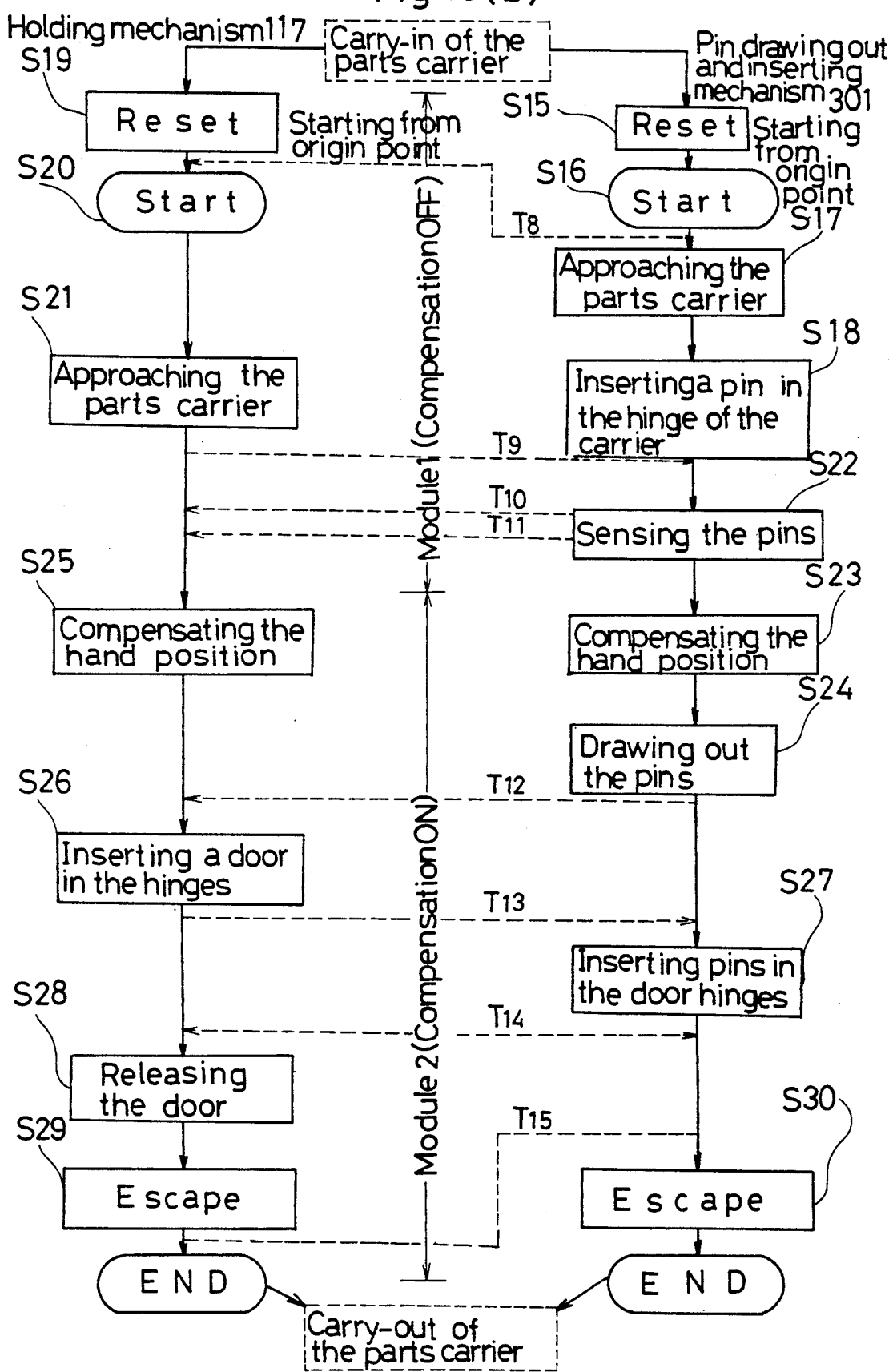

Subsequently, the ensuing description explains the procedure for mounting the door 123a at the parts carrier for painting (with reference to FIG. 13(b)). In this case, the detailed actions of each mechanism are carried out by nearly reversed procedure of the removing procedure of the door 123a in the above.

The outline of the procedure is such that firstly the parts carrier is transferred at an appointed position on the assembly line.

Then, the pin drawing out and inserting mechanism 301 begins to move toward the parts carrier with the pins 304 and 304 held (S15 and S16). And as the pin drawing out and inserting mechanism 301 is positioned at an appointed position in the vicinity of the parts carrier (S17), the pins 304 and 304 are inserted into the through hole of the parts carrier at the appointed position taught in advance (S18).

As the pin drawing out and inserting mechanism 301 begins to move in the step S16, a signal ($T_8$) for cancelling the waiting status of the door holding mechanism 117 is outputted to the door holding mechanism 117.

So, the door holding mechanism 117 starts to move toward the appointed position in the vicinity of the parts carrier from the original position (S19 and S20) and is positioned at the appointed position in the vicinity of the parts carrier (S21).

Then, a signal ($T_9$) for cancelling the waiting status is outputted to the pin drawing out and inserting mechanism 301, and the amount of the positional deviation of the pins 304 and 304 pertaining to the X and Y directions thereof is detected by the pin position detection mechanism 361 (S22). And the position attitude of the pin drawing out and inserting mechanism 301 is compensated on the basis of the data of the amount of the positional deviation (S23). Again the pins 304 and 304 are drawn out from the parts carrier (S24).

The detection data ($T_{10}$) relating to the amount of positional deviation of the pins 304 and 304 detected in the step S22 is outputted to the door holding mechanism 117 together with a signal ($T_{11}$) for cancelling the waiting status, thereby causing the attitude of the door holding mechanism 117 also to be compensated according to this detection data (S25).

Furthermore, as the pins 304 and 304 are drawn out from the parts carrier by the pin drawing out and inserting mechanism 301 in the step S24, a signal ($T_{12}$) for cancelling the waiting status is outputted again to the door holding mechanism 117 to cause the door 123a to be inserted in the hinge portion of the parts carrier (S26).

So, a signal ($T_{13}$) for cancelling the waiting status is outputted from the door handling mechanism 117 to the pin drawing out and inserting mechanism 301, thereby causing the pins 304 and 304 to be inserted in the door 123a and the hinge portion of the parts carrier by means of the pin drawing out and inserting mechanism 301 (S27).

Then, a signal ($T_{14}$) for cancelling the waiting status is outputted to the door holding mechanism 117, thereby causing the holding of the door 123a to be released (S28) and causing the door holding mechanism 117 to escape to the original position (S29). Simultaneously, a signal ($T_{15}$) for cancelling the waiting status is outputted to the pin drawing out and inserting mechanism 301, and the pin drawing out and inserting mechanism 301 also releases the holding of pins 304 and 304 and escapes to the original position (S30).

Thus, the door 123a is drawn out after it is attached to the parts carrier.

As the door attaching and detaching equipment according to this embodiment is so composed as shown in the above description, this equipment can match in the case that the positional deviation of doors and pins are large and can cope with different types of vehicles by separating the pin drawing out and inserting mechanism and the door holding mechanism each other. Therefore, the universality of the door attaching and detaching equipment becomes very high.

As the pin drawing out and inserting mechanism 301 and the door holding mechanism 117 can move, following the position of the pins 304 and the door 123a, they can sufficiently cope with the case that positioning of the vehicle body frame 360 is comparatively rough.

Moreover, as the attitude of the pin drawing out and inserting mechanism 301 and the door holding mechanism 117 is compensated according to the position of the pins 304 and 304 detected by the pin position detection mechanism 361, it is possible to securely draw out and insert the corresponding pins 304 and 304, following the position and attitude of the corresponding pins 304 and 304 and the door 123a, and it is possible to attach and detach the door 123a with the door 123a securely held.

Fender attaching and detaching apparatus

Figure 19:
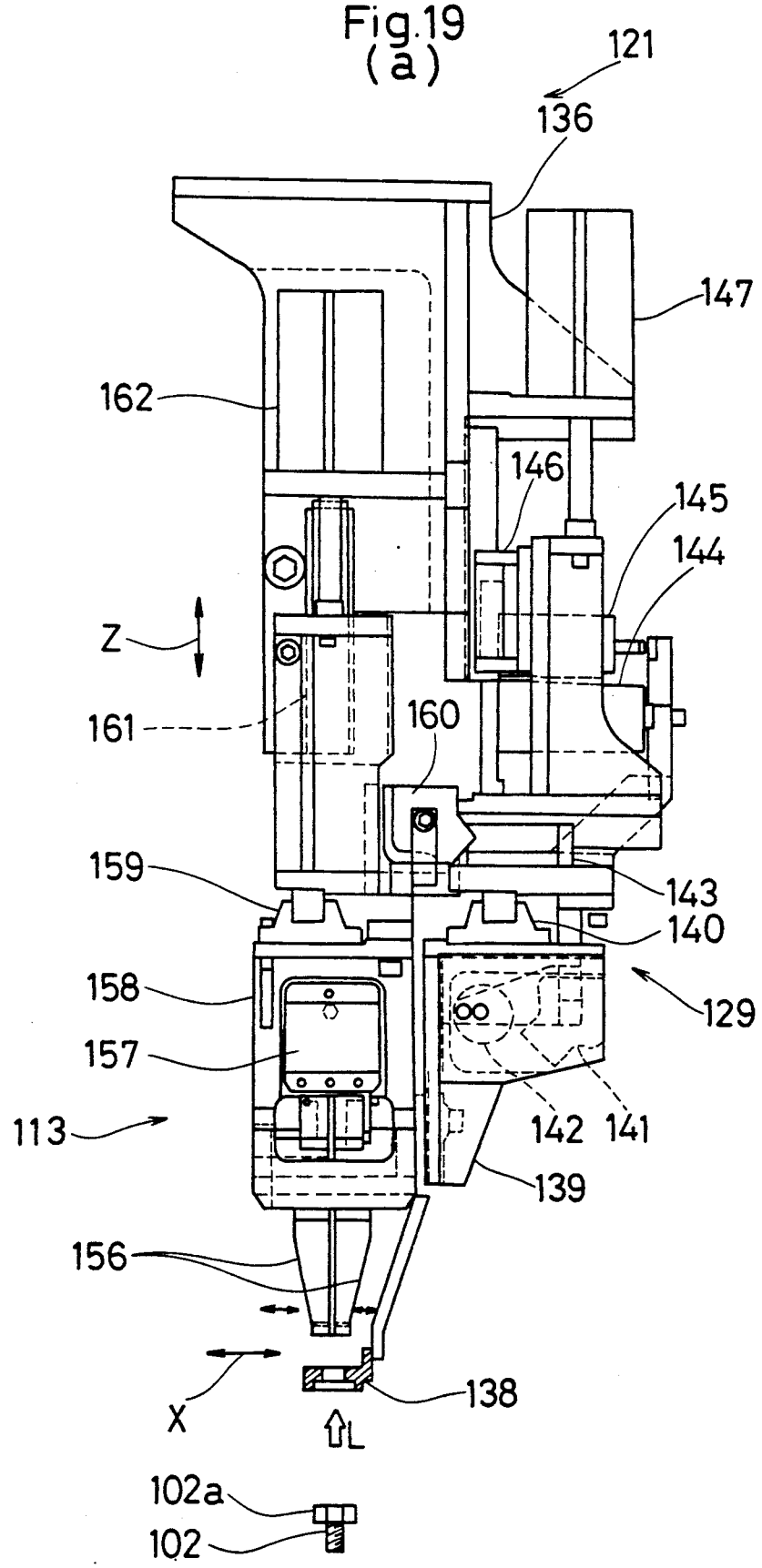
FIG. 19 shows the structure of the principal portions of the nut runner mechanism.
Figure 19:
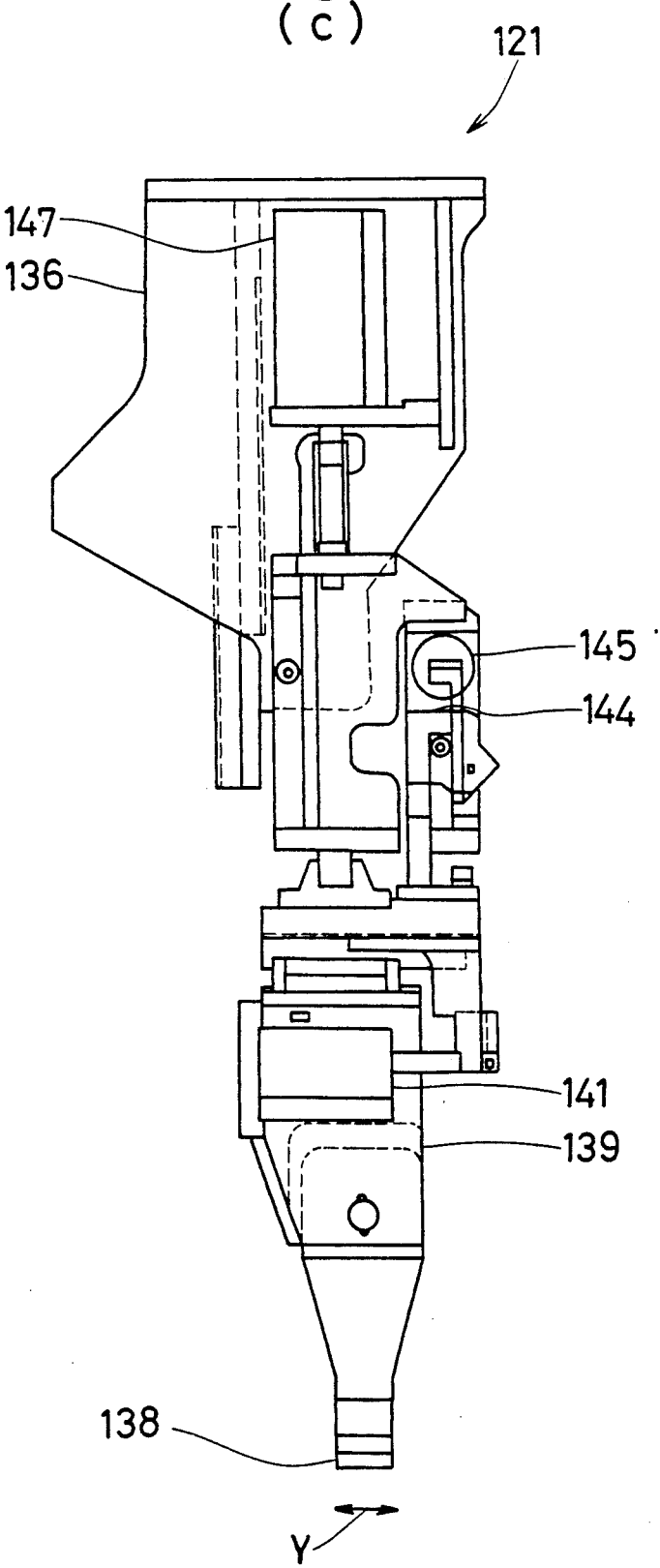
Figure 19:
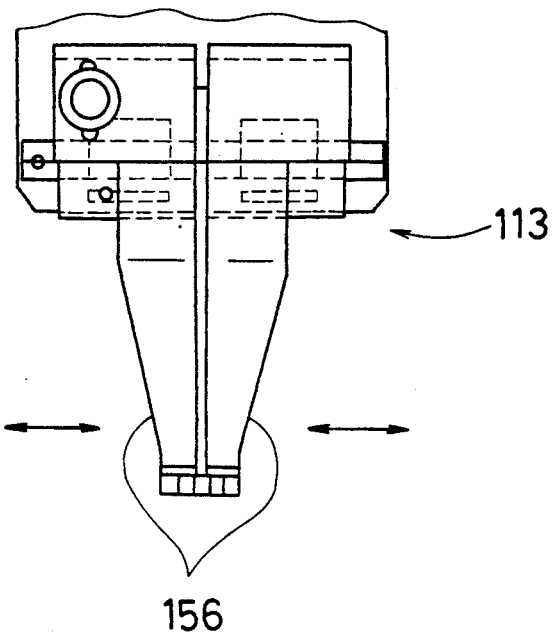
Figure 19:
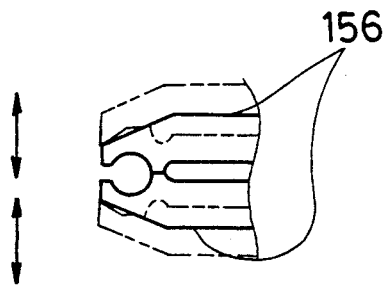
Figure 19:
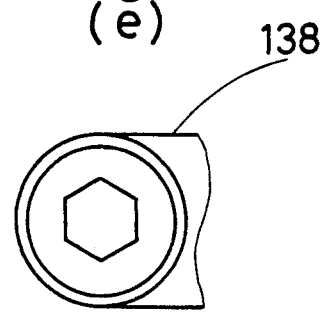

As shown in FIG. 14, FIG. 15, FIG. 17, FIG. 19 and FIG. 21, the fender attaching and detaching apparatus according to this embodiment comprises a fender holding mechanism 5a (FIG. 14 and FIG. 15) for holding a fender 1e, following the position of the fender 1e attached to a vehicle body frame 2 through real parts matching, first screw position detection mechanism 129 (FIG. 19(a)) for detecting the position of bolts 102 by which the fender 1e is attached to the vehicle body frame 2, and a nut runner 121 (FIG. 14, FIG. 15, FIG. 17 and FIG. 19) of which position is compensated by the fender position compensating mechanism 130 (FIG. 14 and FIG. 21) according to the position of the bolt 102 detected by the screw position detection mechanism 129 and which are used for tightening and loosening the bolts 102.

Figure 14:
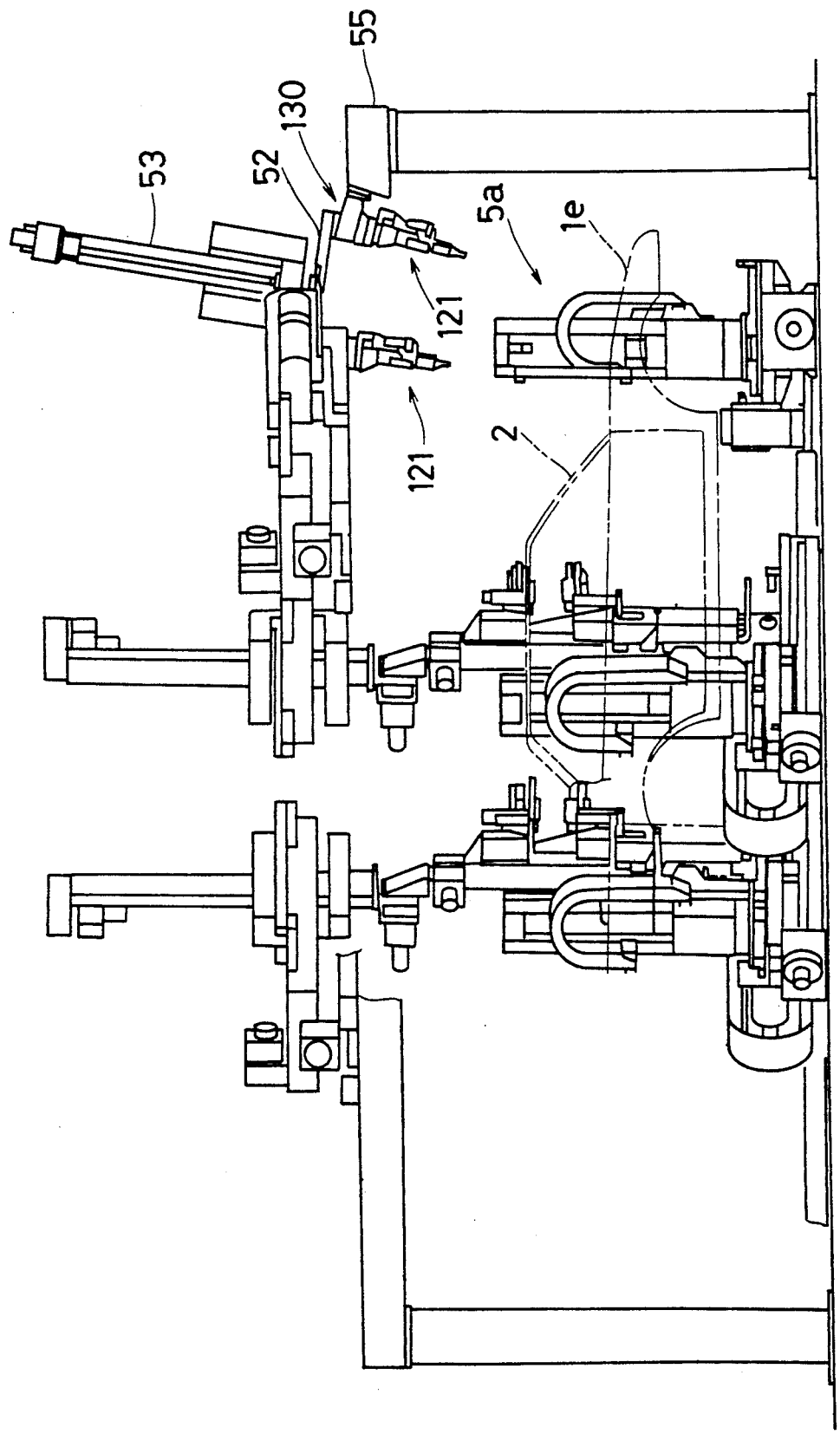
FIG. 14 is a side elevation view showing the composition of an attaching and detaching apparatus for fenders pertaining to one of the embodiments of the invention.
Figure 15:
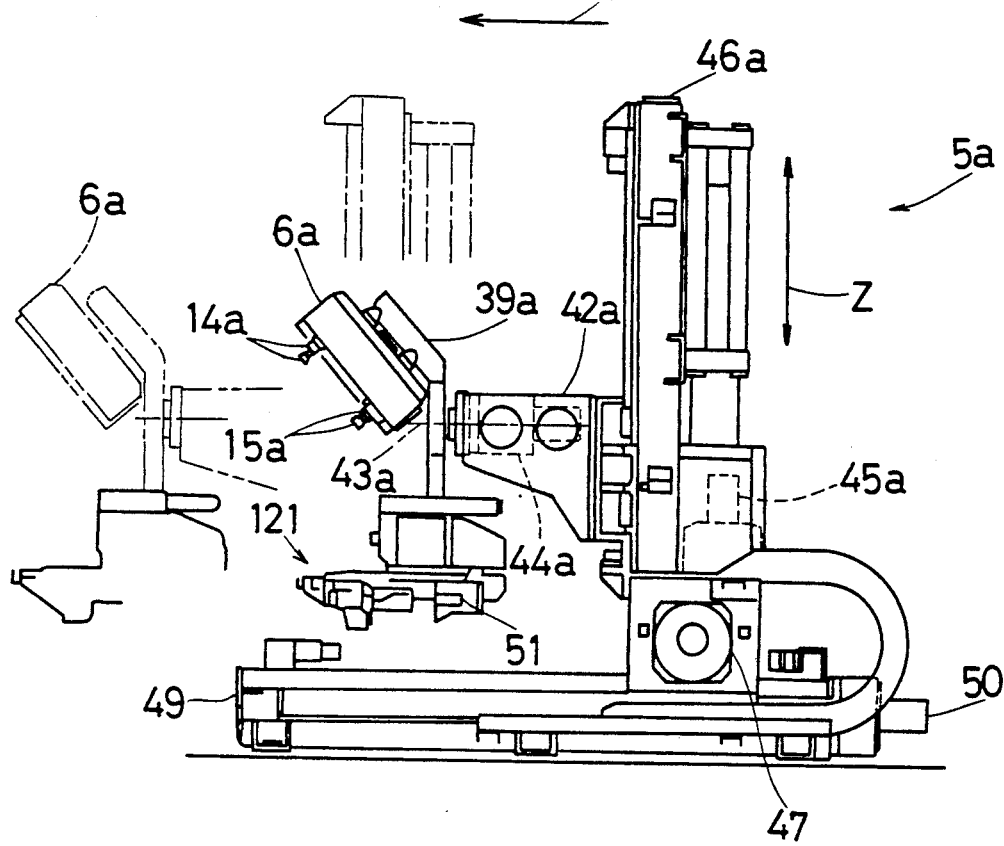
FIG. 15 shows the holding mechanism of a fender, which constitutes the attaching and detaching apparatus for fenders.
Figure 15:
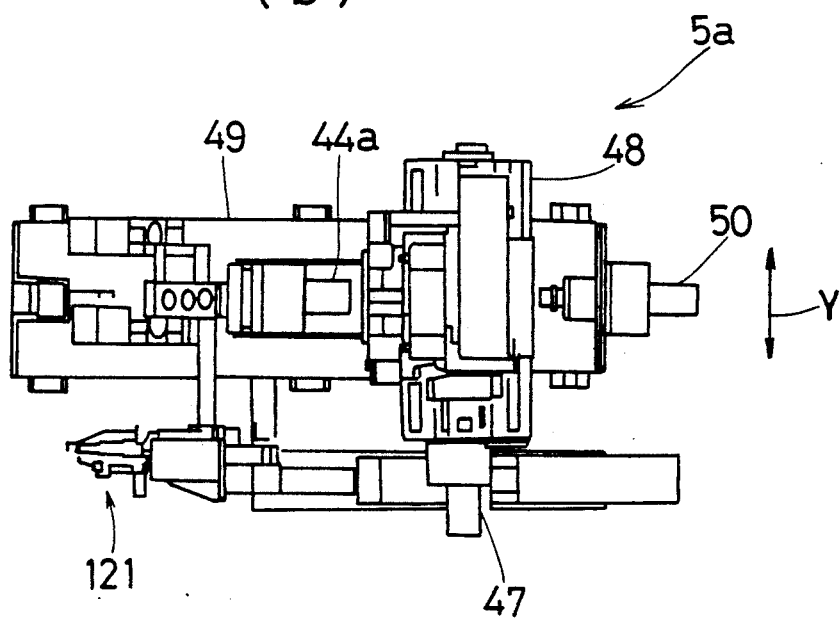
Figure 16:
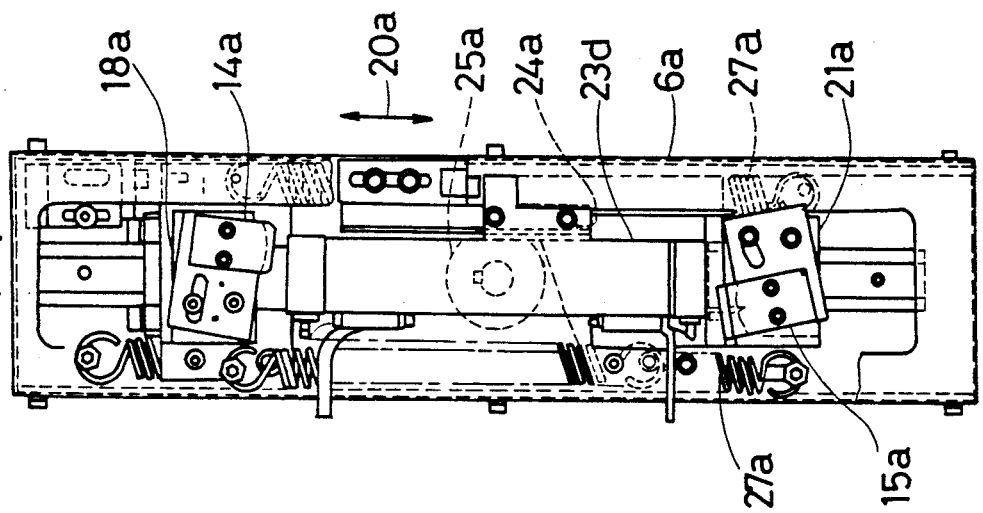
FIG. 16 shows the structure of the principal portions of the holding mechanism.
Figure 16:
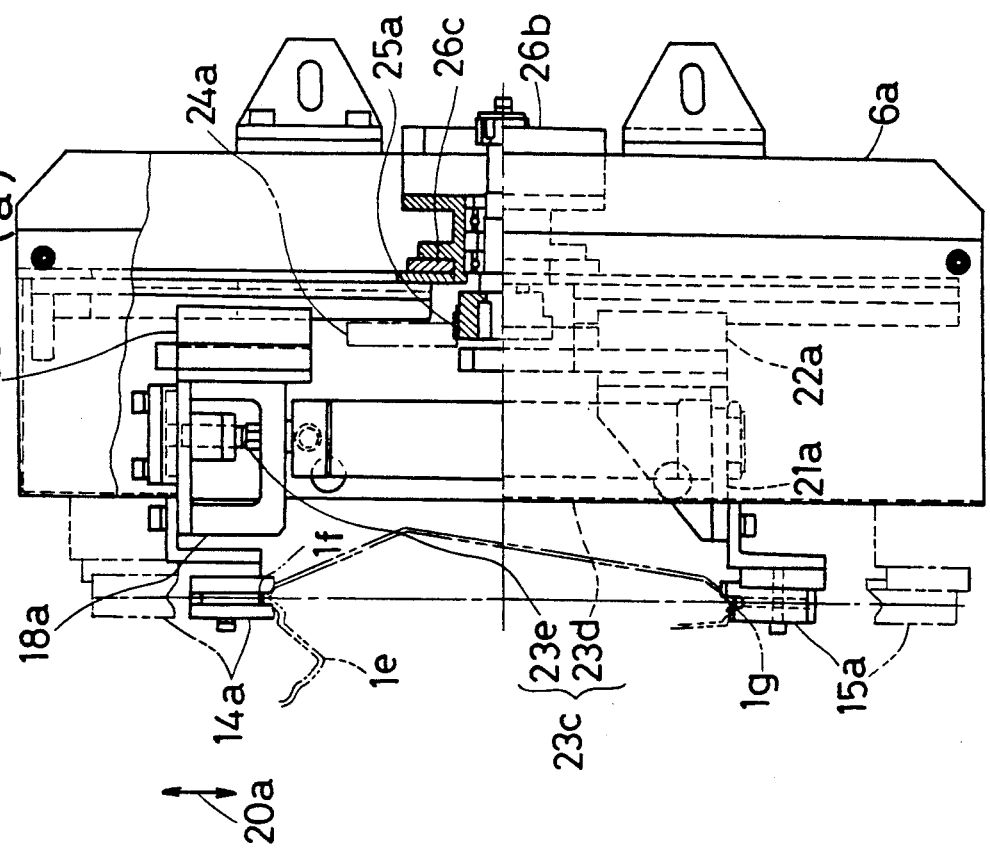
Figure 17:
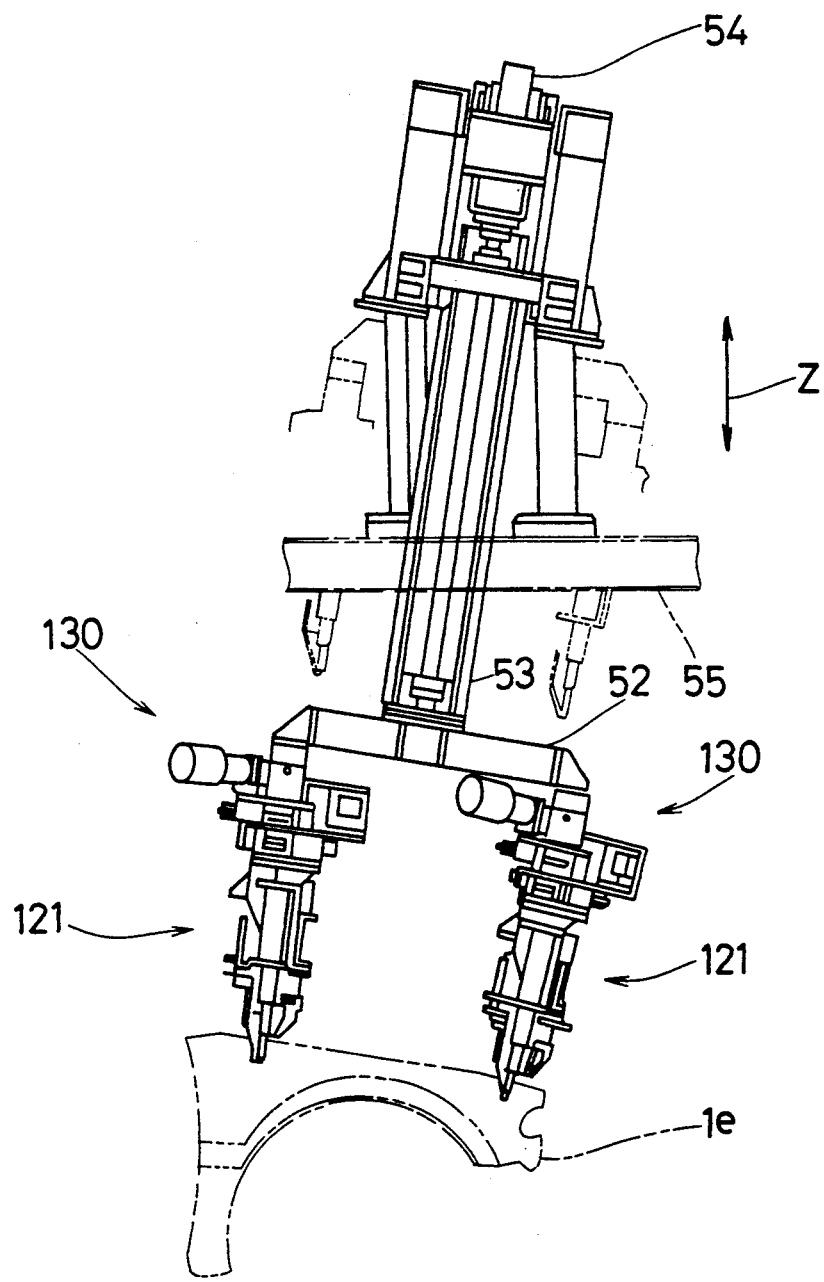
FIG. 17 shows the nut runner mechanism which constitutes the attaching and detaching apparatus for fenders.
Figure 17:
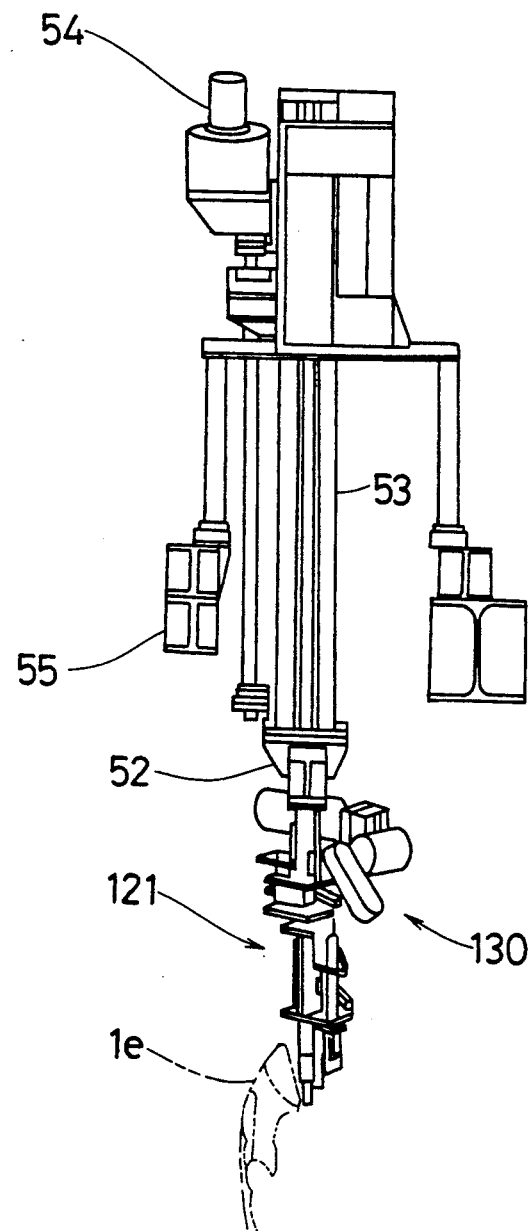
Figure 17:
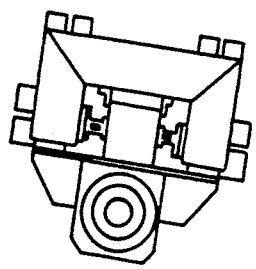

As shown in FIG. 14, FIG. 15 and FIG. 16, holding claws 14a and 15a (fender holding members) for holding the fender 1e at the frame 6a (base plate) are oppositely arranged in the fender holding mechanism 5a.

The upper portion 1f and the lower end portion 1g of the fender 1e are held by the holding claws 14a and 15a (Refer to FIG. 16).

The holding claw 14a is attached to the base 18a which is slidably supported by slide bearings 19a in the direction of an arrow 20a on the frame 6a. The holding claw 15a is attached to the base 21a which is slidably supported by slide bearings 22a in the direction of an arrow 20a on the frame 6a. The body 23d of a cylinder 23c (Fender driving means) is mounted on the base 21a, and the piston rod 23e of the corresponding cylinder 23a is fixed on the base 18a.

Therefore, the cylinder 23c and the holding claws 14a and 15a can freely move in the opening and closing direction (the direction of an arrow 20a) relatively for the frame 6a.

A rack 24a is attached to the base 21a. A gear 25a engageable with the corresponding rack 24a is fixed to the output shaft 26c of the brake 26b attached to the frame 6a.

By actuating the brake 26b after the upper end portion 1f and the lower end portion 1g of the fender are held by making the closing action of the holding claws 14a and 15a by means of the cylinder 23c, the relative position of the holding claws 14a and 15b for the fender 1e is maintained.

In FIG. 16, the holding claws 14a and 15a are elastically energy-charged mutually in the closing direction by means of the corresponding coil spring 27a. Even in the case that the pressure in the cylinder 23c is lowered due to a certain reason while the fender holding mechanism 5a is in operation, the holding state of the fender 1e can be maintained.

The frame 6a is attached to one end portion of the base 39a (Refer to FIG. 15), and the corresponding base 39a is rotatably supported for the base 42a centering around the shaft center 43a. The base 39a is driven and caused to rotate by a motor 44a. The base 42a is driven and caused to slide on the arm 46a in the Z direction by a motor 45a. The arm 46a is driven and caused to slide on the arm 48 in the Y direction by a motor 47. Furthermore, the arm 48 is driven and caused to slide on the base 49 in the X direction by a motor 50.

A nut runner 121 which is described in detail later is arranged at the other end portion of the base 39a. The corresponding nut runner 121 is for automatically tightening and loosening the bolts by which the fender 1e is fixed at the vehicle body frame from the side thereof, and the nut runner 121 is driven and caused to slide in the X direction.

The first screw position detection mechanism 129 and the fender position compensating mechanism 130 are attached to the nut runner 121 in this preferred embodiment (However, as a nut runner 121 arranged on the base 39a is provided with a drive shaft to slide the base 39a in the Y and Z directions, the fender position compensating mechanism 130 can be omitted).

Therefore, as shown in FIG. 17, FIG. 19, FIG. 20, FIG. 21 and FIG. 22, the nut runner 121 comprises a drive mechanism 111 for engaging a socket with the head portion 102a of the bolt 102, and driving and rotating the socket 122, a first screw position detection mechanism 129 for detecting the position of the bolts 102 screwed in the vehicle body frame 2 (Refer to FIG. 14), memory means 112 for memorizing the position of the bolts 102 detected by the first screw position detection mechanism 129, a fender position compensating mechanism 130 for moving the socket in accordance with the position of the bolts 102 memorized by the memory means 112, a holding mechanism 113 for holding the bolts 102 separated from the vehicle body frame 2 by rotating the socket 122 of which position is compensated by the fender position compensating mechanism 130.

In the case of such a structure that the fender 1e can be removed only by loosening the bolt 102 but not separating from the vehicle body frame 2, the memory means 112 and the holding mechanism 113 can be omitted.

Figure 20:
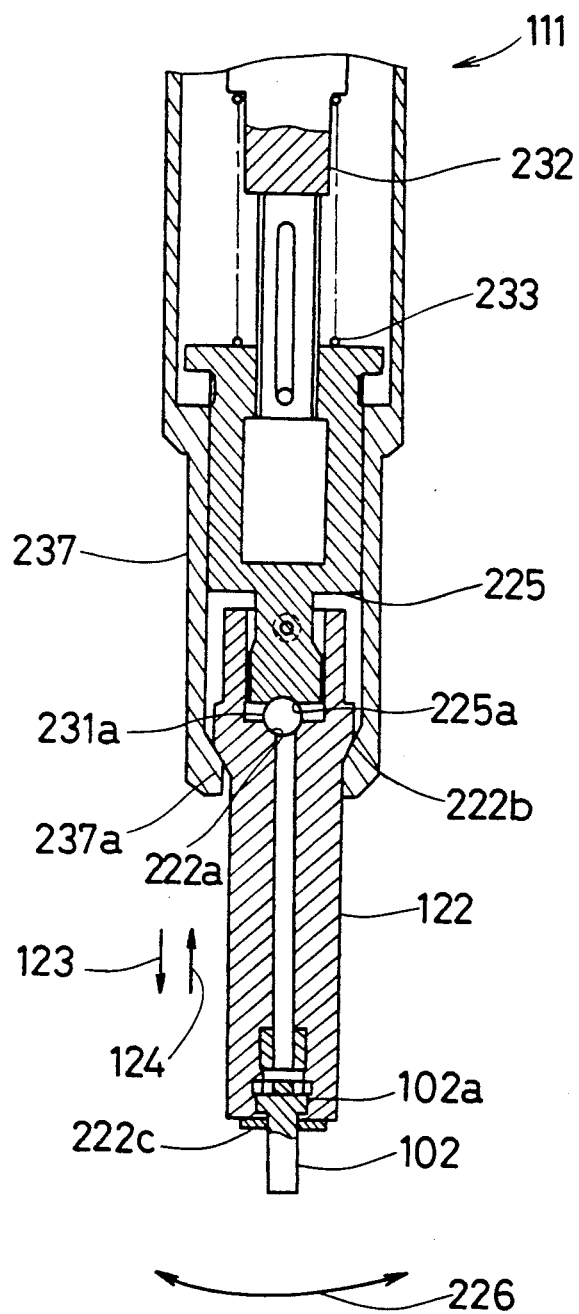
FIG. 20 is the side sectional view showing the supporting mechanism of a socket which constitutes the nut runner mechanism.
Figure 21:
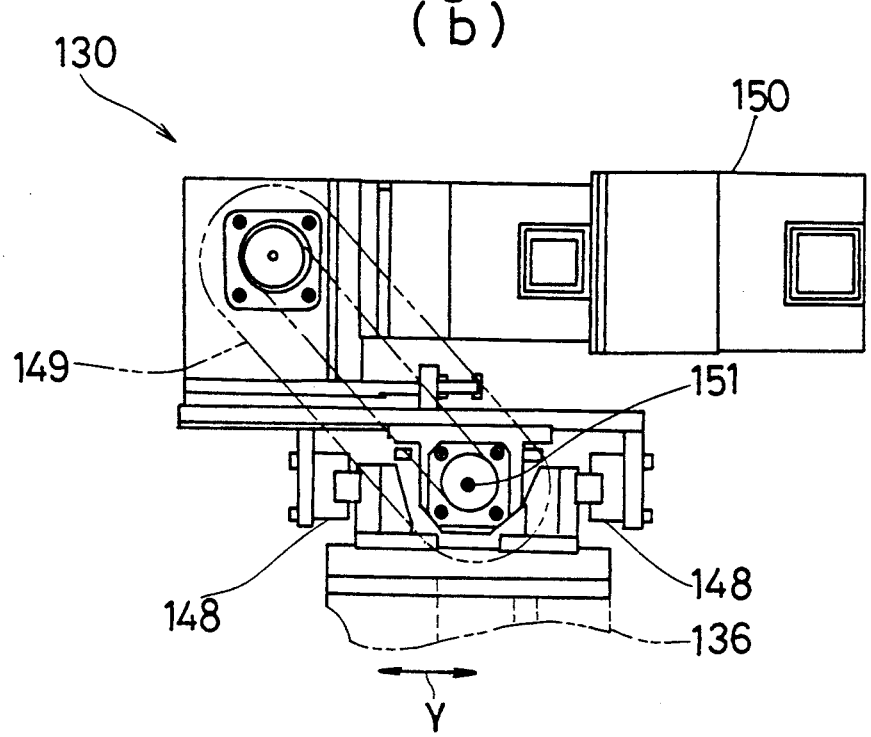
FIG. 21 shows the structure of the position compensating mechanism which constitutes the attaching and detaching apparatus for fenders.

In the drive mechanism 111, each end portion of the rear end portion of the socket 122 and the leading edge portion of the drive shaft 225 is furnished with spherical seats 222a and 225a, respectively, as shown in FIG. 19 and FIG. 20, a steel ball 231a intervenes between these spherical seats 222a and 225a. The outer circumferential face at the leading edge portion of the drive shaft 225 is formed to be square-like and is idly inserted in the hole formed to be square-like similar to the drive shaft 225 at the rear end portion of the socket 122. In this case, an adequate clearance is secured between the outer circumferential face of the leading edge portion of the drive shaft 225 and the inner circumferential face of a hole at the rear end portion of the socket 122 so that the socket 122 can swing in the direction of an arrow 226, centering around the steel ball 231a.

At the leading edge portion of the socket 122, a tapered face 222c is formed so that when the socket 122 is brought into contact with the head portion 102a of the bolt 102 the head 102a can be easily engaged with the socket 122.

The drive shaft 225 is inserted for the leading edge portion of the transmission shaft 232 slidably but non-rotatably in the direction of arrows 123 and 124, and the drive shaft 225 is elastically energy-charged in the direction of an arrow 123 together with the socket 122 by means of the coil spring 233.

The transmission shaft 232 is connected to a pneumatic motor 135 by means of reduction gears 134 and is normally or reversely rotated by the pneumatic motor 135.

On the outer circumferential face of the socket 122 is formed a male tapered portion 222b reducing its dimensions toward the direction of an arrow 123, and the male tapered portion 222b can be inserted in a female tapered portion 237a which is formed on the inner face of the leading edge portion of the socket guide 237 supported by the bracket 136. The socket 122 is elastically energy-charged in the direction of 123 by the coil spring 233 through the drive shaft 225 and they are so composed that the axial center of the socket 122 can be aligned with the axial center of the drive shaft 225 when the male tapered portion 222b of the socket 122 is inserted in the female tapered portion 237a of the socket guide 237.

Therefore, when the socket 122 supported by the above composition is pushed in the direction of an arrow 124 and the engagement between the male tapered portion 222b of the socket 122 and the female tapered portion 237a of the socket guide is cancelled, the corresponding socket 122 can swing in the direction of an arrow 226 centering around the steel ball 231a for the drive shaft 225 but is caused not to rotate. As a result, even if the head portion 102a of the bolt 102 is eccentric to the axial center of the socket 122, the socket 122 is guided by the tapered face 222c engaged with the head portion 102a and moves along with the bolt 102. Then, the socket 122 can be securely engaged with the head portion 102a of the bolt 102.

Namely, in the case that positioning of the socket 122 for the bolt 102 is comparatively rough, the socket 122 can be securely engaged with the bolt 102, thereby causing the bolt 102 to be tightened and loosened.

On the other hand, when the pushing of the socket 122 in the direction of an arrow 124 is cancelled after the tightening and loosening work of the bolt 102 is completed by the socket 122, the socket 122 is elastically energy-charged in the direction of an arrow 123 and the male tapered portion 222b of the corresponding socket 122 is inserted in and engaged with the female tapered portion 237a of the socket guide 237, thereby causing the socket 122 to move so that the axial center thereof can be aligned with the axial center of the drive shaft 225.

Also, in the above embodiment, it is possible to omit the steel ball 231a if such a structure that spherical gear is provided at the rear end portion of the socket 122 and at the leading edge portion of the drive shaft 225 and can be engaged with each other, respectively, is adopted.

In the first screw position detection mechanism 129, an annular detection member 138 is supported by the bracket 139, and the corresponding detection member 138 is idly inserted by the bolt 102 and moves in the X and Y directions in the plane with roughly right angle for the axial center of the corresponding bolt 102, thereby causing the position of the bolt 102 for the socket 122 to be detected.

Namely, the bracket 139 is slidably supported in the direction of an arrow Y by a slide bearing 140 and is driven and caused to slide by a pneumatic cylinder 141. At this time, the travelling distance of the detection member 138 in the Y direction is detected by the potentiometer 142. Furthermore, the bracket 139 is slidably supported in the X direction by the slide bearing 143 together with another slide bearing 140 and is driven and caused to slide by the pneumatic cylinder 144. At this time, the travelling distance of the detection member in the X direction is detected by the potentiometer 145.

The detection members 138, the bracket 139, the slide bearings 140 and 143, the pneumatic cylinders 141 and 144, and the potentiometers 142 and 145 are slidably supported in the Z direction for the bracket 136 by the slide bearing 146, and they are driven and caused to slide by the pneumatic cylinder 147.

The memory means 112 comprises a memory in the control device 114 (Refer to FIG. 22) for controlling the corresponding nut runner 121.

In the fender position compensation mechanism 130 (Refer to FIG. 21), the drive mechanism 111 supported by the bracket 136, the socket 122, the first screw position detection mechanism 129, etc. are slidably supported in the X direction by the slide bearing 148 and is driven and caused to slide by a ball screw 151 driven by the motor 150 by way of a belt 149.

Furthermore, the slide bearing 146, the bracket 136, the motor 150, the belt 149, the ball screw 151, etc. are slidably supported in the Y direction by a slide bearing 152 and they are driven and caused to slide by means of a ball screw 155 driven and rotated by the motor 154 by way of a belt 153.

Successively, the ensuing description explains the procedure in the case of detecting, for example, the position of the head 102a of the bolt 102 for the socket 122 by the first screw position detection mechanism and compensating the position of the socket 122 by moving the socket 122 of the position compensation mechanism 130 (Refer to FIG. 23).

Also, in connection with the potentiometers 142 and 145, it is supposed that the elongation and contraction dimension of the detection rod is 0 through 20 mm, the resistance is 0 (zero) $\Omega$, the voltage is 0 (zero) V, and the number of generating pulses is 0(zero) pulse when elongated and the resistance is 1 k$\Omega$, the voltage is 5 V, and the number of generating pulses is 1,000 pulses when contacted.

Firstly, as the detection member 138 moves in the left direction on the axis X in FIG. 19(a), the potentiometer 145 is contracted, and the amount of deviation BX (mm) is expressed by;

$$BX \text{ (mm)} = [BX \text{ (Pulses)} - eBX]/dBX.$$

Where dBX=50.0 (pulses/mm) and eBX=0 (zero) (pulses).

As the detection member 138 moves in the left direction on the axis Y in FIG. 19(c), the potentiometer 142 is elongated, and the amount of deviation BY (mm) is expressed by;

$$BY \text{ (mm)} = [BY \text{ (Pulses)} - eBY]/dBY.$$

Where dBY=−50.0 (pulses/mm) and eBY=1,000 (pulses).

In the case that the amount of deviation of the corresponding detection member 138 on the X axis in the left direction is "BXO" and the amount of the same on the Y axis in the downward direction is "BYO" when the center of the head 102a of the bolt 102 is located at the center of the detection member 138 (also the above BXO and BYO are given in advance as parameter), the amount DX of compensation of the fender position compensation mechanism 130 for the bolt 102 in the X (+) direction is given by;

$$DX \text{ (mm)} = BXO - BX.$$

The amount of compensation toward the Y (+) direction is given by;

$$DY \text{(mm)} = BYO - BY.$$

Therefore, the motor 150 is driven and caused to rotate according to the value of the above DX, thereby causing the socket 122 to be compensated in the direction of the X axis. Also, the motor 154 is driven and caused to rotate according to the value of the above DY, thereby causing the position of the socket 122 to be compensated in the direction of the Y axis.

As shown in FIG. 19, the holding mechanism 113 is furnished with a pair of holding claws 156 and 156 for holding a bolt 102 which is loosened after being engaged with the socket and which is about to be separated from the vehicle body frame 2. The holding claws 156 and 156 are driven and caused to be opened and closed by the actuator 157 downwards of the socket 122.

The holding claws 156 and the actuator 157 are supported by the bracket 158 and the bracket 158 is slidably supported in the Y direction (forward and backward direction) by the slide bearing 159 and is driven and caused to slide by the pneumatic cylinder 160.

Furthermore, the bracket 158 is slidably supported in the Z direction (vertical direction) by the slide bearing 161 together with the slide bearing 159, etc. And the bracket 158 is driven and caused to slide by the pneumatic cylinder 162 fixed to the bracket 136.

In this embodiment, two sets of a nut runner mechanism 121, first screw position detection mechanism 129 and a fender position compensation mechanism 130, etc., which have been so composed as shown in the above, are arranged (Refer to FIG. 17) and are mounted on the base 52. The base 52 is supported on the arm 53 and is driven and caused to slide in the Z direction on the frame 55 by the motor 54.

Also, in this embodiment, the nut runners 121 and 121 are mounted on the common base by way of the fender position compensation mechanism 130 and 130. However, it may be possible that the nut runners 121 and 121 can be caused to slide independently by providing two sets of the corresponding bases 52.

The fender attaching and detaching apparatus according to this embodiment is so composed as shown above.

Successively, the ensuing description explains the procedure for detaching a fender 1e from the vehicle body frame 2 and attaching the fender, for example, at a parts carrier (not illustrated) for painting, by using the fender attaching and detaching equipment (FIGS. 24(a) and (b)).

In the case that the fender 1e is detached from the vehicle body frame 2 (Refer to FIG. 24(a)), the fender holding mechanism 5a and the nut runners 121 are positioned at the appointed position taught in advance, by driving the motors 44a, 45a, 47, 50 and 54, for the vehicle body frame 2 transferred to the appointed position on the assembly line.

At this time, the nut runners 121 equipped in the fender holding mechanism 5a are caused to move further in the X direction by the cylinder 51 (FIG. 15).

Thereafter, the fixing bolts 102 (two bolts for the upper side and one bolt for the side portion in this embodiment) by which the fender 1e is supported for the vehicle body frame 2 are automatically loosened by the nut runners 121 and are held by the fender holding mechanism 5a.

Firstly, the detection member 138 is driven and caused further to move (in the direction of Z axis) by means of the pneumatic cylinder 147 (FIG. 190) equipped in each of the nut runners 121 (total: three units), and the detection member 138 is driven and caused to move up to the position downwards of the socket 122 and corresponding to the upper portion of the head 102a of the bolt 102 by means of the pneumatic cylinder 144.

Moreover, the detection member 138 is driven and caused to move to such a position that the head portion 102a can be idly inserted by the pneumatic cylinder 147, and the detection member 138 is caused to move in the X and Y directions by the pneumatic cylinders 141 and 144. The travelling distance of the detection member 138 until it is brought into contact with the side face of the head 102a is detected by the potentiometers 142 and 145, respectively, thereby causing the amount of the position compensation of the bolt 102 for the socket 122 to be detected.

As the detecting amount of the position compensation of the bolt 102 is completed through the above procedure, the position of the bolt 102 is calculated together with the amount of the position compensation, and these values are memorized in the memory 112. Also, the detection member 138 escapes from the head portion 102a of the bolt 102 by driving the pneumatic cylinders 144 and 147.

At this time, the accurate mounting position of the fender 1e for the bolts 102 is also calculated.

The motors 150 and 154 (FIG. 21) are driven and caused to rotate in accordance with the amount of the position compensation of the socket 122 for the head portion 102a of the bolt 102 detected by the potentiometers 142 and 145, thereby causing the position of the socket 122 for the head portion 102a of the bolt 102 to be compensated.

The position of the fender holding mechanism 5a is compensated by driving the motor 44a, 45a, and 47.

Thereafter, respective sockets 122 are caused to move further by the motors 50 and 54 and are placed and inserted in the head portion 102a. At this time, even in the case that the positioning is comparatively rough, the socket 122 can move along with the head portion 102a of the bolt 102 and can be securely inserted in the head portion 102a. At the same time, the fender holding mechanism 5a is positioned for the attaching position of the fender 1e.

Successively, in connection with the fender holding mechanism 5a (FIG. 16), the holding claws 14a and 15a are supported by respective slide bearings 19a and 22a and move toward the closing direction by releasing the brake and operating the cylinder 23c in the direction of contraction. As either one of the holding claws 14a or 15a is brought into contact with the upper end portion 1f or the lower end portion 1g of the fender 1e and the action comes to a stop, only the holding claw 14a or 15a which has not been in contact with the fender 1e yet is caused to move further in the closing direction.

As the holding claw 14a or 15a is brought into contact with the upper end portion 1f or the lower end portion 1g of the fender 1e, the fender 1e becomes held by the holding claws 14a and 15a. Namely, by making the closing action of the holding claws 14a and 15a by means of the cylinder 23c, the corresponding cylinder 23c moves in the closing direction in accompanying with the closing action of the holding claws 14a and 15a, and the fender 1e is held by the holding claws 14a and 15a at the position following the fender 1e. Thereafter, the relative position of the holding claws 14a and 15a for the fender 1e is retained by actuating the brake 26b.

Continuously, the socket 122 is driven and caused to rotate by the pneumatic motor 135 of each of the nut runners 121, thereby causing the loosening action of each bolt 102 which fixes the fender 1e at the upper portion thereof and at the side thereof to be executed.

When the bolt 102 is loosened and can be separated according to the procedure shown in the above, the holding claw 156 is driven and caused to move by the pneumatic cylinder 162, by which the holding claw 156 is driven and caused to move up to the position where the screw portion of the bolt 102 can be held. After that, the holding claw 156 is closed by the actuator 157, thereby causing the bolt 102 to be held by the holding claw 156.

Respective nut runner 121s returns to the appointed origin position with the bolt 102 held by the holding claw 156.

At the same time, the fender holding mechanism 5a which holds the fender 1e escapes together with the nut runner 121.

Thereafter, the vehicle body frame 2 is taken out.

In the case that the fender 1e is attached to the vehicle body frame 2 again, the bolt 102 can be accurately screwed in the original position again since the original position of the bolt 102 is memorized in the memory means 112.

The bolt 102 which is separatable is held by the holding claw 156 until the bolt 102 is screwed in again, an operator is freed from any troublesomeness for managing this bolt 102.

Figure 24B:
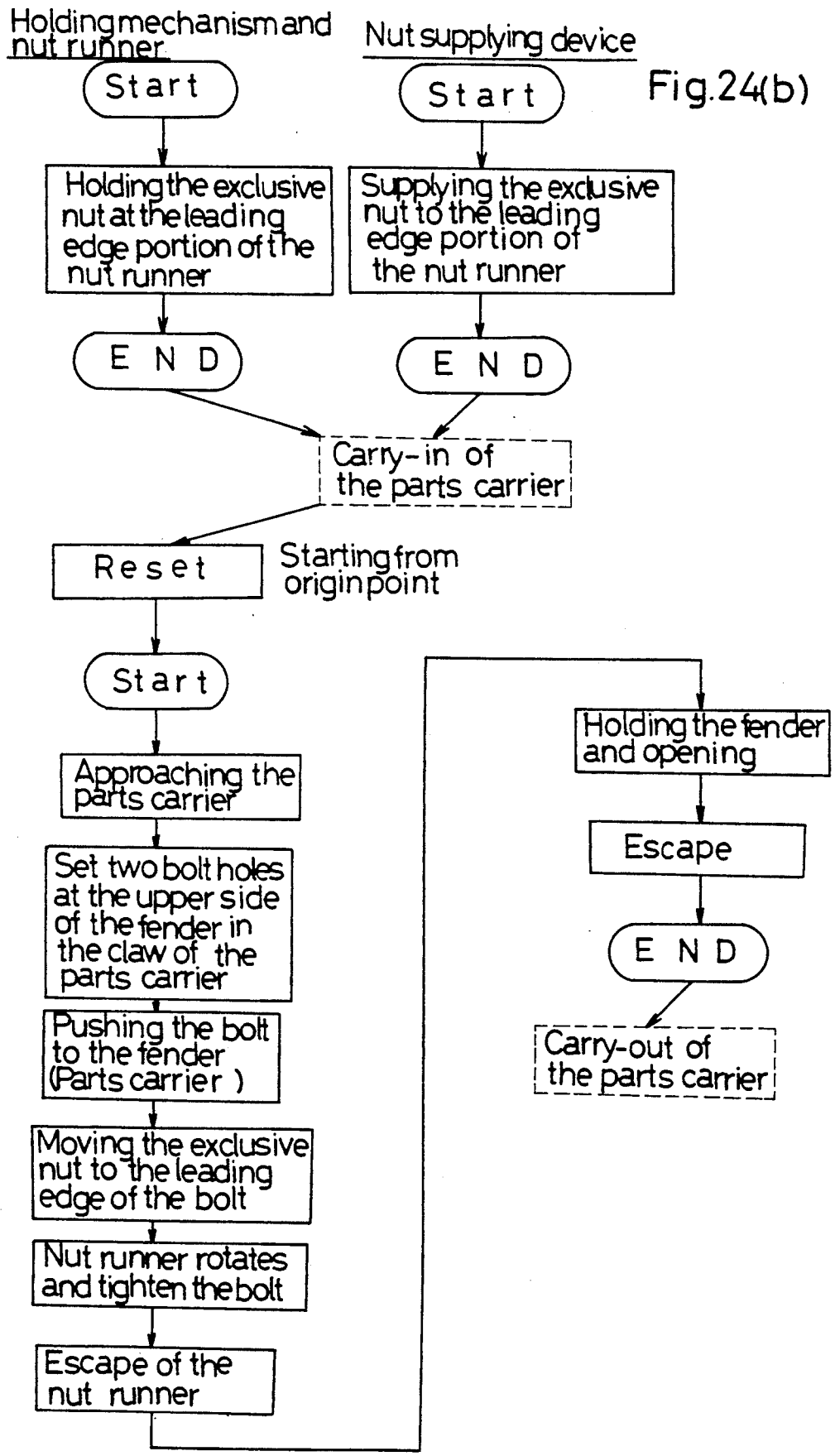

Successively, the following description explains the outline of the procedure for mounting the fender 1e at the parts carrier for painting, with reference to FIG. 24(b).

Figure 18:
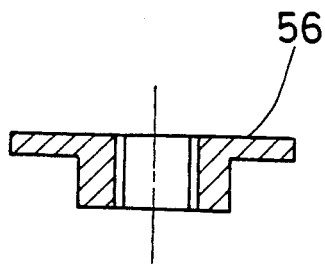
FIG. 18 shows an exclusive nut applicable to the nut runner mechanism.
Figure 18:
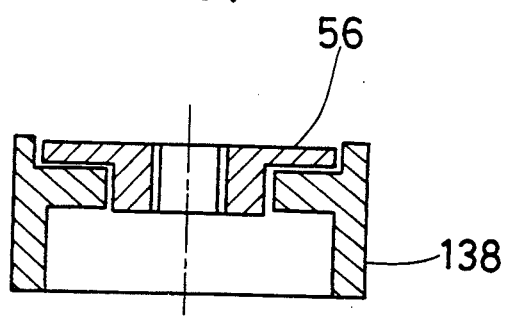

For the outline of the procedure, an exclusive nut 56 (FIG. 18) is supplied to the detection member 138 of the nut runner 121 of the fender holding mechanism 5a by a nuts supplying device (not illustrated) consisting of an already-known parts feeder or the like.

Any female screw portion for mounting the fender 1e and fixing it with the bolt 102 is not provided in the parts carrier according to this embodiment. For this reason, it is necessary to mount the fender 1e on the parts carrier with the exclusive nut 56 supported by the nut runner 121. In this case, even in the case that the positioning of the parts carrier is comparatively rough, it is possible to securely screw the bolt 102 in the exclusive nut 56 only by furnishing the parts carrier with a through hole, in which the exclusive nut is inserted, provided with comparatively large dimensions. This is because the exclusive nut is held by the detection member 138 of the nut runner 121 as the fender 1e and the bolt 102 by which the fender 1e is fixed are supported by the fender holding mechanism 5a with the positional relationship on mounting.

For the through hole for insertion of the bolt, which is provided at the upper portion of the fender 1e, as an inserting claw to be inserted in the through hole is provided at the parts carrier, only the fender holding mechanism 5a is used on mounting the fender 1e on the parts carrier.

Successively, the parts carrier is taken in an appointed position on the assembly line.

So, as the motors 44a, 45a, 47 and 50 are driven to cause the fender 1e to approach the parts carrier, thereby causing the engaging claw of the parts carrier to be inserted in the through hole for insertion of the bolt.

After that, the bolt 102 which fixed the corresponding fender 1e from the side thereof is pushed toward the fender 1e and the parts carrier and is screwed in the exclusive nut 56 which has moved to the position opposite to the corresponding bolt 102.

Since mounting the fender 1e at the parts carrier is completed as shown in the above, the nut runner 121 arranged in the fender holding mechanism 5a escapes, and at the same time the holding condition of the fender 1e is cancelled.

The fender holding mechanism 5a returns to the origin position, and the parts carrier is taken out.

Therefore, in this embodiment, the fender 1e attached to the vehicle body frame 2 through real parts matching is held following the position of the corresponding fender 1e, and the corresponding bolt 102 can be automatically tightened and loosened in compliance with the position of the bolt 102.

In other words, it is not necessary to accurately locate the vehicle body frame 2.

Trunk or bonnet attaching and detaching apparatus

Next, the ensuing description describes an apparatus for automatically attaching a trunk or a hood to a vehicle body frame and detaching it therefrom. This description deals with only the case of a trunk for simplification. It is the same as the case of a hood.

Figure 27:
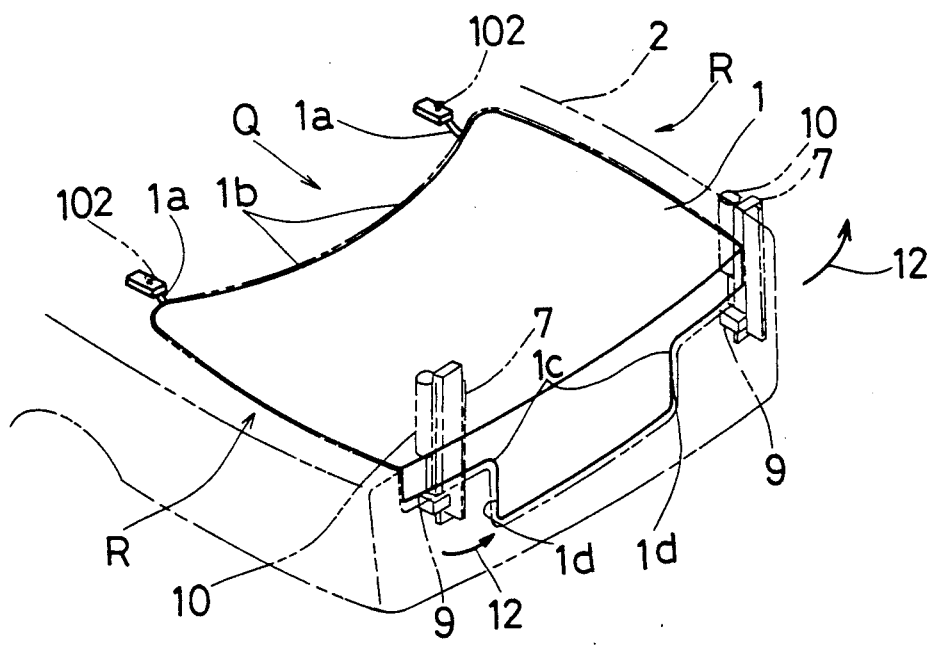
FIG. 27 is an perspective view of the principal portions showing the mounted condition of the trunk, which can be attached and detached by the attaching and detaching apparatus for trunks, on the vehicle body frame, FIGS. 28(a) and (b) are flow charts showing the procedure for removing and mounting the trunk by the attaching and detaching apparatus for trunks, respectively.

As, for instance, a trunk 1 attached to a vehicle body frame 2 in advance through real parts matching in the assembling line of vehicles is in the closed condition thereof (Refer to FIG. 25(a) and FIG. 27), any clearance in which a plurality of holding members are inserted can not be formed between the corresponding trunk and the vehicle body frame. ("Q" and "R" portions in FIG. 27). Hence, in the case of holding the trunk 1, it is necessary to make the trunk 1 open for the vehicle body frame 2.

For this reason, the trunk or bonnet attaching and detaching apparatus according to this embodiment, as shown in FIG. 25, FIG. 26, FIG. 19, and FIG. 21, comprises a trunk opening and closing mechanism 4 (FIG. 25 and FIG. 26) for opening and closing the corresponding trunk 1 for the vehicle body frame 2, a trunk holding mechanism 5 (FIG. 25 and FIG. 26) for holding the corresponding trunk 1, following the position of the trunk 1 which is in the open condition thereof by the trunk opening and closing mechanism 4, a second screw position detection mechanism 129 (FIG. 19) for detecting the position of the bolt 102, and a trunk nut runner 121 (FIG. 25 and FIG. 19) of which position is compensated by the trunk position compensating mechanism 130 (FIG. 25 and FIG. 21) in compliance with the position of the bolt 102 detected by the second screw position detection mechanism 129 and which is for tightening and loosening the bolt 102.

Also, in this case, the detection mechanism 129, the position compensating mechanism 130 and the nut runner 121, etc. may be the same type as shown in the fender attaching and detaching apparatus.

Figure 26A:
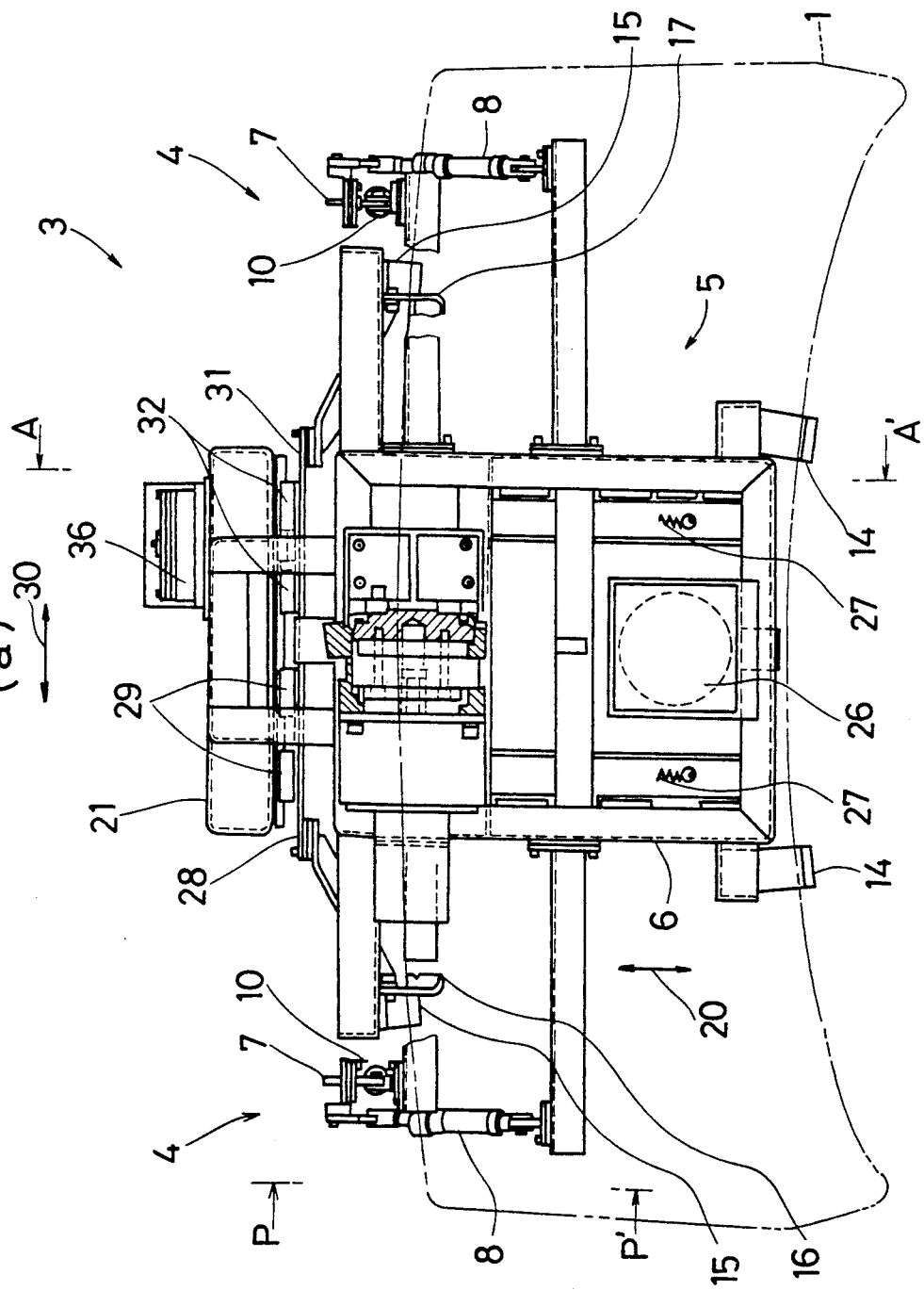
FIG. 26(a) is the front elevational view.

As shown in FIGS. 26(a), (c), and (d), in the trunk opening and closing mechanism 4, a set of arms 7 and 7 are swingably supported at both sides of the frame 6 which constitutes the trunk holding mechanism 5 described in detail later, thereby causing the arms 7 and 7 to be driven and caused to swing by cylinders 8 and 8, respectively. Opening and closing claws 9 are arranged at the free end of the arm 7 slidably in the lengthwise direction, and the opening and closing claws 9 are driven and caused to slide by the cylinder 10.

The opening and closing claws 9 are inserted in the clearance formed between the lower end portion of the trunk 1, which is in the closed condition thereof, and the vehicle body frame 2 and is for opening the trunk 1 (Refer to FIG. 27). Before opening the trunk 1, the opening and closing claws 9 are caused to swing by 90° counterclockwise in FIG. 26(c) and is positioned together with the frame 6, the arm 7, cylinders 8 and 10, etc. (Refer to FIG. 25(a). The arm 7 is driven and caused to swing from the position shown with two-dashed line to the position shown with a solid line by contraction of the cylinder 8 and the opening and closing claws 9 are inserted in the clearance formed between the lower end portion of the trunk 1 and the vehicle body frame 2. Thereafter, the opening and closing claws 9 are brought into contact with the lower end portion of the trunk 1 by contraction of the cylinder 10. The frame 6 is driven and caused to swing in the direction shown with an arrow 12 in FIG. 27 by means of a motor 11 with reduction gears, there causing the trunk 1 to be opened for the vehicle body frame 2.

Also, the motor 11 is attached to the leading edge portion of the arm 13.

The arm 13 is driven and caused to slide in the Z direction on the base 39 by the motor 38, and the base 39 is driven and caused to slide in the Y direction on the arm 41. The arm 41 is further supported by the base 42 and is driven and caused to slide in the X direction on the base 44 by the motor 43.

When opening the trunk 1, the arm 13 is driven and caused to move by respective motors 38 and 40 on the locus taught in advance so that the swinging locus of the opening and closing claws 9 centering around the motor 11 can be aligned with the swinging locus of the trunk 1 centering around the hinge 1a.

This embodiment is so composed that the trunk 1 can be opened by about 20°.

Figure 26:
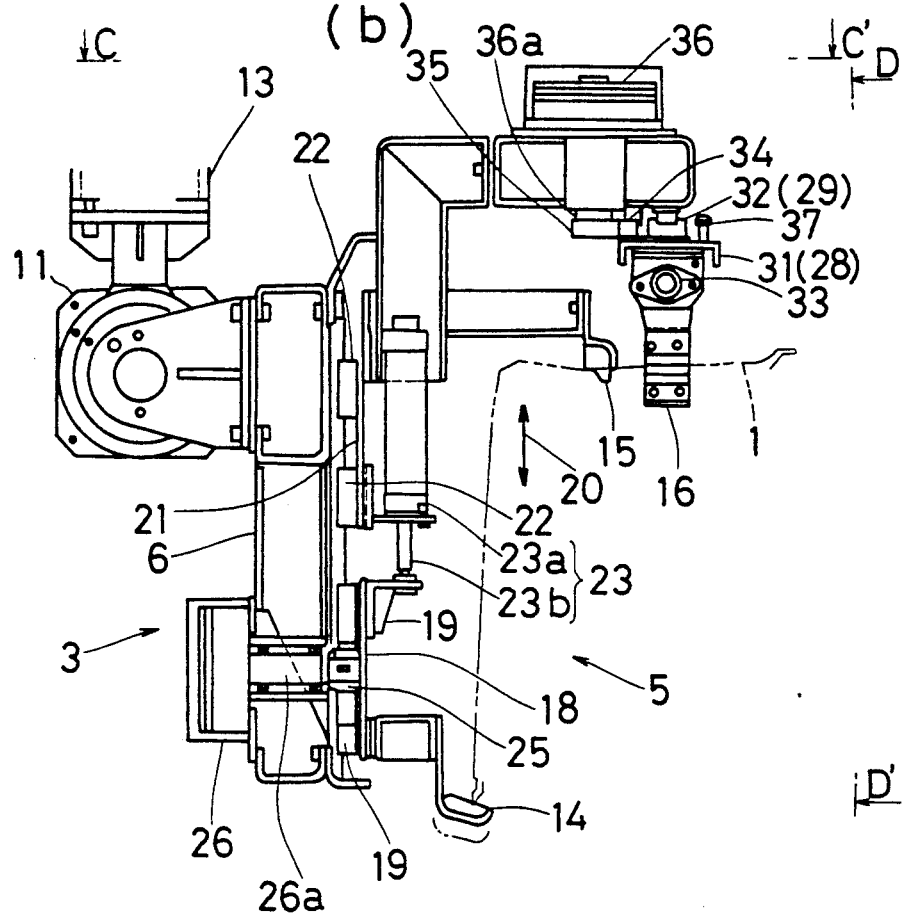
FIG. 26 shows the structure of the opening and closing mechanism and the holding mechanism under such a condition that the trunk opened by the opening and closing mechanism is held by the holding mechanism which constitute the attaching and detaching apparatus for the trunks.
Figure 26:
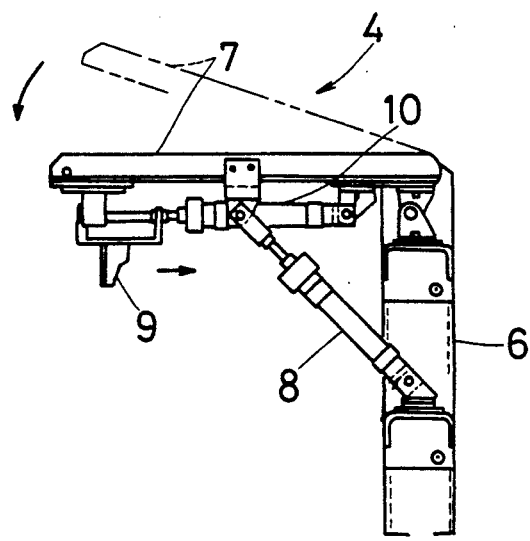
Figure 26:
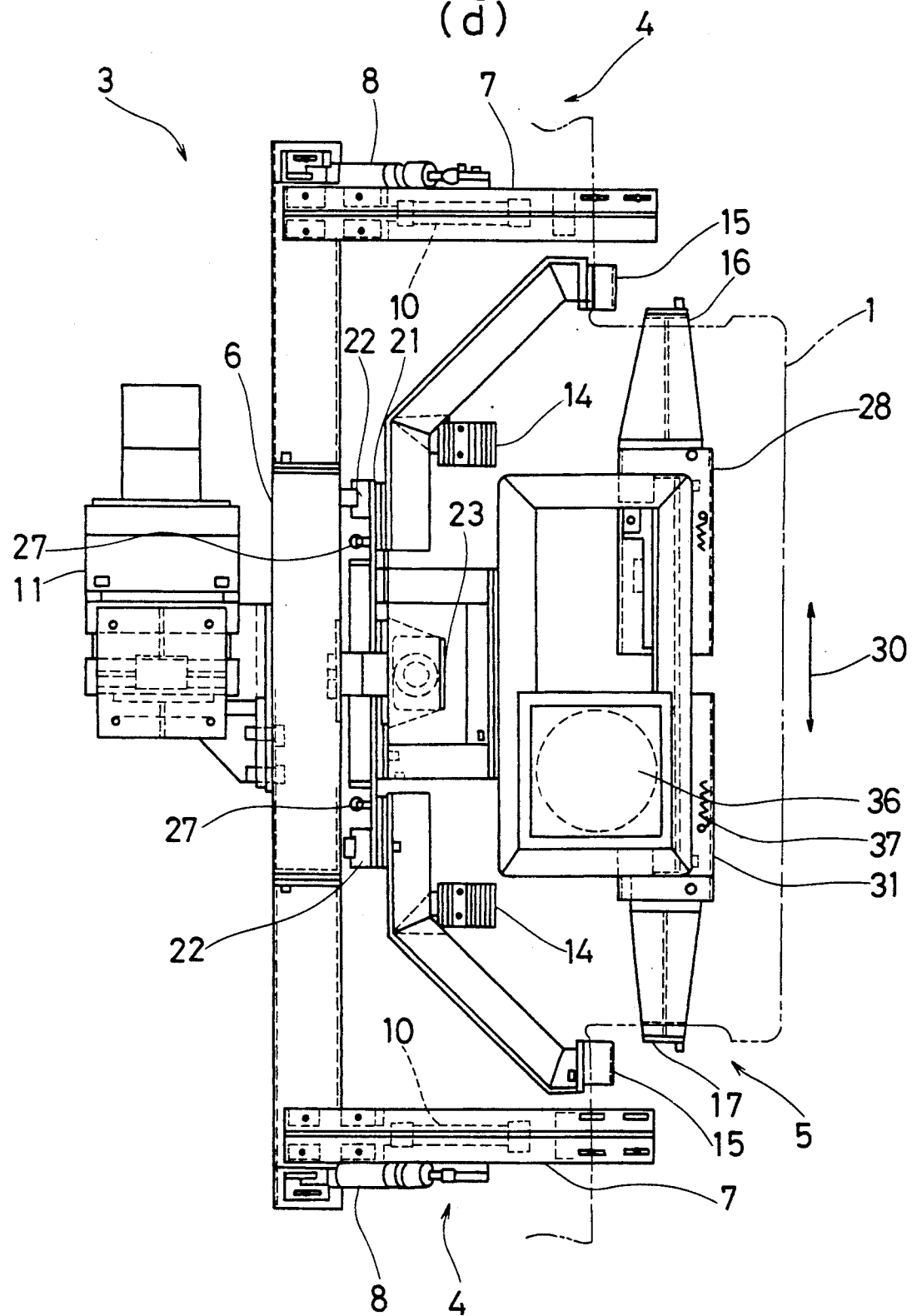
Figure 26E:
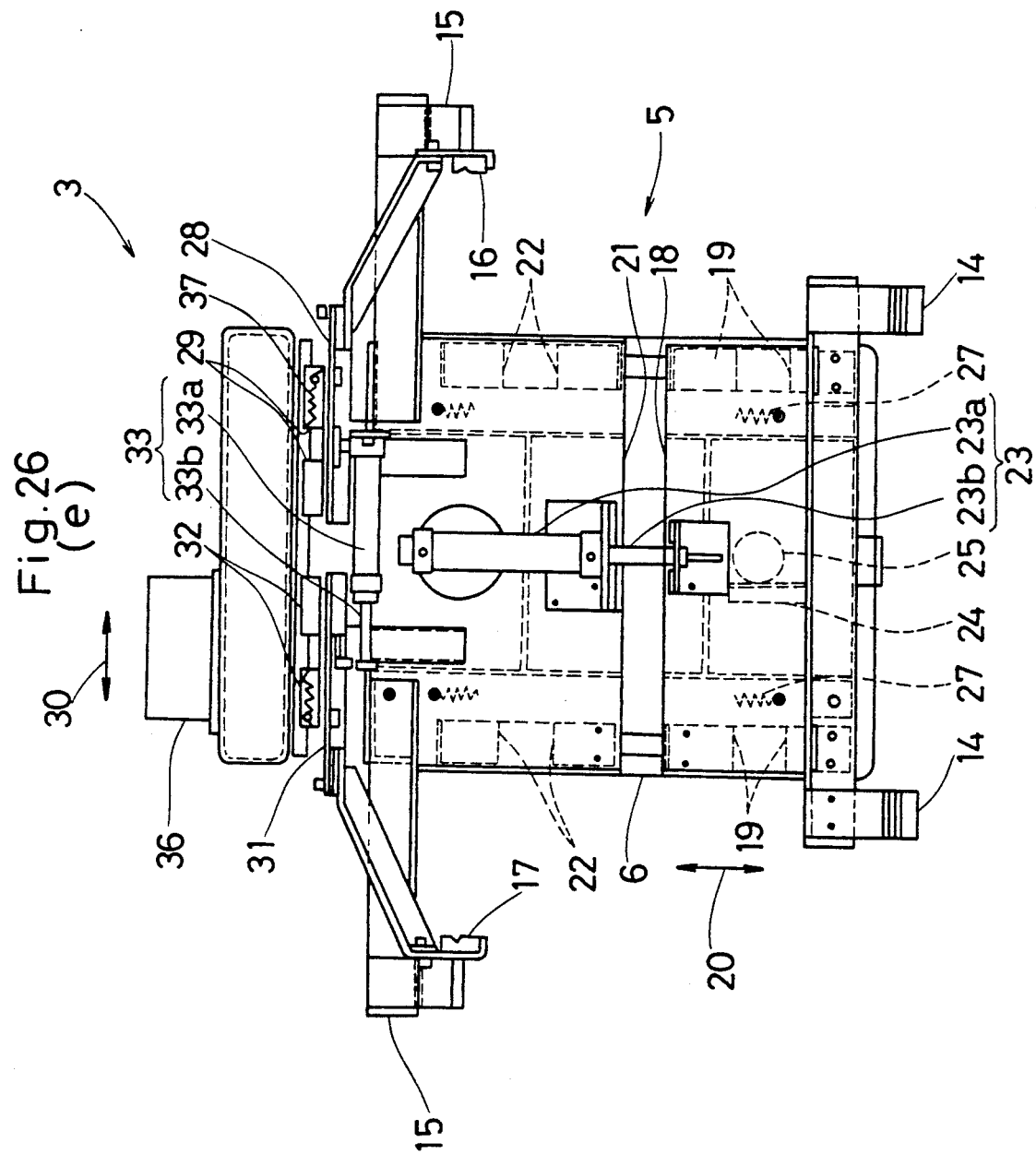
FIG. 26(e) is a side elevation view cut along with an arrow D—D' in FIG. 26(b)

As shown in FIG. 26, in the trunk holding mechanism 5, the holding claws 14, 15 and 16, 17 are arranged oppositely for the frame 6 (base plate), respectively.

The front end portion 1b and the rear end portion 1c of the trunk 1 opened by the appointed angle by the trunk opening and closing mechanism 4 are held by the holding claws 14 and 15, and the side portions 1d and 1d of the trunk 1 are held by the holding claws 16 and 17 (Refer to FIG. 27).

The holding claw 14 is mounted at both side potions at the lower part of the base 18 which is slidably supported in the direction of an arrow 20 on the frame 6 by the slide bearing 19. The holding claw 15 is mounted at both side portions of the upper part of the base 21 which is slidably supported in the direction of an arrow 20 on the frame 6 by the slide bearing 22. The body 23a of the cylinder 23 (the trunk drive means) is mounted on the base 21, and the piston rod 23b of the corresponding cylinder 23 is fixed at the base 18.

Therefore, the cylinder 23 and the holding claws 14 and 15 can freely move in the opening and closing direction (the direction of an arrow 20) of the corresponding holding claws 14 and 15 respectively to the frame 6.

The base 18 is provided with a rack 24, and a gear 25 which is engageable with the corresponding rack 24 is fixed at the output shaft 26a of the brake 26 attached to the frame 6.

The brake 26 is for holding the relative position of the holding claws 14 and 15 for the trunk 1 by actuating the brake 26 after the front end portion 1b and the rear end portion 1c of the trunk 1 are held by making the closing action of the holding claws 14 and 15 by means of the cylinder 23.

In FIG. 26, the holding claws 14 and 15 are elastically energy-charged in the closing direction at all times by means of the coil springs 27. Even in the case that the pressure in the cylinder 23 is lowered due to a certain reason while the corresponding trunk holding mechanism 5 is in operation, the holding condition thereof for the trunk 1 can be maintained.

The holding claw 16 is mounted at the base 28, and the corresponding base 28 is slidably supported in the direction of an arrow 30 on the base 21 by the slide bearing 29. The holding claw 17 is mounted at the base 31, and the corresponding base 31 is slidably supported in the direction of an arrow 30 on the base 21 by the slide bearing 32.

The body 33a (trunk drive means) of the cylinder 33 is mounted on the base 28, and the piston rod 33b of the corresponding cylinder 33 is fixed to the base 31.

Therefore, the cylinder 33 and the holding claws 16 and 17 can freely move in the opening and closing direction (the direction of an arrow 30) relatively for the frame 6 and the base 21.

A rack 34 is mounted at the base 31, and the gear 35 which is engageable with the corresponding rack 34 is fixed to the output shaft 36a of the brake 36 attached to the base 21.

The brake 36 is for holding the relative position of the holding claws 16 and 17 for the trunk 1 by actuating the brake 36 after the slide portions 1d and 1d of the trunk 1 are held by making the closing action of the holding claws 16 and 17 by means of the cylinder 33.

In FIG. 26, the holding claws 16 and 17 are elastically energy-charged in the closing direction at all times by means of the coil springs 37. Even in the case that the pressure in the cylinder 33 is lowered due to a certain reason while the corresponding trunk holding mechanism 5 is in operation, the holding condition thereof for the trunk 1 can be maintained.

Also, in the corresponding trunk holding mechanism 5, the holding claws 16 and 17 are oppositely arranged on the base 21 as described above. Therefore, positioning of the holding claws 16 and 17 in the direction of an arrow 20 for the trunk 1 can be automatically carried out since the trunk is held by the holding claws 14 and 15.

The point that the second screw position detection mechanism 129 and the trunk position compensating mechanism 130 are built in the nut runner 121 for the trunk is the same as that of the fender attaching and detaching apparatus.

Figure 22:
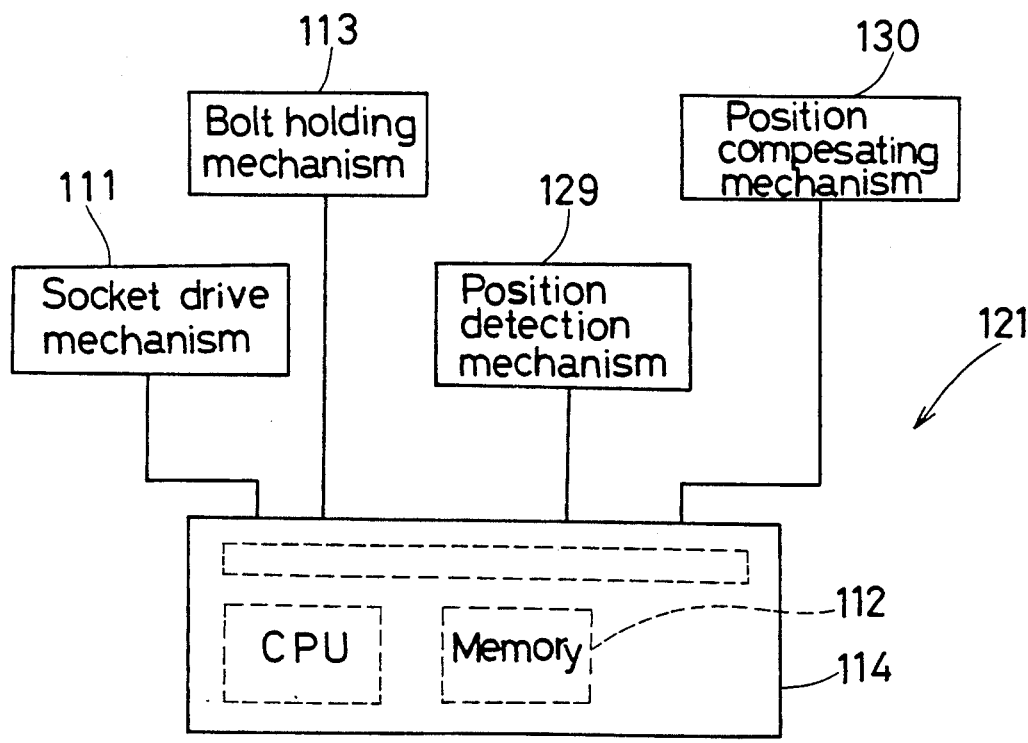
FIG. 22 is a block diagram of the control system of the nut runner mechanism.

Therefore, as shown in FIGS. 19(a) through (f), FIGS. 21(a) and (b) and FIG. 22, the nut runner 121 the trunk comprises a drive mechanism 111 for engaging the socket 122 with the the head portion 102a of the bolt 102 and for driving and rotating the socket 122, the second screw position detection mechanism 129 for detecting the position of the bolt 102 screwed in a vehicle body frame 2 (Refer to FIG. 27), memory means 112 for memorizing the position of the bolt 102 detected by the second screw position detection mechanism 129, a trunk position compensating mechanism 130 for moving the socket 122 in compliance with the position of the bolt memorized in the memory means 112, and a holding mechanism 113 for holding the bolt 102 separated from the vehicle body frame by rotating the socket 122 of which position is compensated by the trunk position compensating mechanism 130.

In such a structure as the trunk can be detected only with the bolts 102 loosened but not separated from the vehicle body frame 2, the memory means 112 and the holding mechanism 113 can be omitted.

In the drive mechanism 111, the socket 122 is so inserted as to be slidable but not to be rotatable in the direction of arrows 123 and 124 for the leading edge portion of the drive shaft (not illustrated), and the socket 122 is elastically energy-charged in the direction of an arrow 123 by a coil spring (not illustrated). The drive shaft is connected to the pneumatic motor 135 through the reduction gears 134 and is normally or reversely rotated by this pneumatic motor 135.

In the second screw position detection mechanism 129, an annular detection member 138 is supported by the bracket 139, and the corresponding annular detection member 138 is idly inserted in the bolt 102 and is for detecting the position of the bolt 102 for the socket 122, by being caused to move in the X and Y direction on the plane, being roughly with the right angle to the axial center of the bolt 122, and being brought into contact therewith.

Namely, the bracket 139 is slidably supported in the direction of Y arrow by the slide bearing 140 and is driven and caused to slide by the pneumatic cylinder 141. At this time, the travelling distance of the detection member 138 in the Y direction is detected by a potentiometer 142. Furthermore, the bracket 139 is slidably supported in the X direction by the slide bearing 143 together with the slide bearing 140, and the bracket 139 is driven and caused to slide by the pneumatic cylinder 144. At this time, the travelling distance of the detection member 138 in the X direction is detected by a potentiometer 145.

The detection member 138, the bracket 139, the slide bearings 140, 143, the pneumatic cylinder 141, 144, and the potentiometers 142, 145 are slidably supported in the Z direction for the bracket 136 by the slide bearing 146. Then, they are driven and caused to slide by the pneumatic cylinder 147.

The memory means 112 consists of a memory in the control device 114 (Refer to FIG. 22) for controlling the corresponding nut runner 121 for a trunk.

In the trunk position compensating mechanism 130 (Refer to FIG. 21), the drive mechanism 111 supported by the bracket 136, the socket 122, the second screw position detection mechanism 129, etc. are slidably supported in the X direction by the slide bearing 148 and are driven and caused to slide by the ball screw 151 driven by the motor 150 by way of a belt 149.

Furthermore, the slide bearing 148, the bracket 136, the motor 150, the belt 149, the ball screw 151, etc. are slidably supported in the Y direction by the slide bearing 152 and are driven and caused to slide by the ball screw 155 driven and rotated by the motor 154 by way of the belt 153.

Successively, the ensuing description explains the procedure in the case of detecting, for example, the position of the head 102a of the bolt 102 for the socket 122 by the second screw position detection mechanism and compensating the position of the socket 122 by moving the trunk position compensation mechanism 130 (Refer to FIG. 23).

Also, in connection with the potentiometers 142 and 145, it is supposed that the elongation and contraction dimension of the detection rod is 0 through 20 mm, the resistance is 0 (zero)Ω, the voltage is 0 (zero) V, and the number of generating pulses is 0(zero) pulse when elongated and the resistance is 1 kΩ, the voltage is 5 V, and the number of generating pulses is 1,000 pulses when contracted.

Firstly, as the detection member 138 moves in the left direction on the axis X in FIG. 19(a), the potentiometer 145 is contracted, and the amount of deviation BX (mm) is expressed by;

$$BX \text{ (mm)} = [BX \text{ (Pulses)} - eBX]/dBX.$$

Where dBX = 50.0 (pulses/mm) and eBX = 0 (zero) (pulses).

As the detection member 138 moves in the left direction on the axis Y in FIG. 19(c), the potentiometer 142 is elongated, and the amount of deviation BY (mm) is expressed by;

$$BY \text{ (mm)} = BY \text{ (Pulses)} - eBY]/dBY.$$

Where dBY = −50.0 (pulses/mm) and eBY = 1,000 (pulses).

In the case that the amount of deviation of the corresponding detection member 138 on the X axis in the left direction is "BXO" and the amount of the same on the Y axis in the downward direction is "BYO" when the center of the head 102a of the bolt 102 is located at the center of the detection member 138 (also the above BXO and BYO are given in advance as parameter), the amount DX of compensation of the trunk position compensation mechanism 130 for the bolt 102 in the X (+) direction is given by;

$$DX \text{ (mm)} = BXO - BX.$$

The amount of compensation toward the Y (+) direction is given by;

$$DY \text{(mm)} = BYO - BY.$$

Therefore, the motor 150 is driven and caused to rotate according to the value of the above DX, thereby causing the position of the socket 122 to be compensated in the direction of the X axis. Also, the motor 154 is driven and caused to rotate according to the value of the above DY, thereby causing the position of the socket 122 to be compensated in the direction of the Y axis.

The holding mechanism 113 is furnished with a pair of holding claws 156 and 156 for holding a bolt 102 which is loosened after being engaged with the socket and which is about to be separated from the vehicle body frame 2. The holding claws 156 are driven and caused to be opened and closed by the actuator 157 downwards of the socket 122.

The holding claws 156 and the actuator 157 are supported by the bracket 158 and the bracket 158 is slidably supported in the Y direction (forward and backward direction) by the slide bearing 159 and is driven and caused to slide by the pneumatic cylinder 160.

Furthermore, the bracket 158 is slidably supported in the Z direction (vertical direction) by the slide bearing 161 together with the slide bearing 159, etc., and is fixed to the bracket 136. The bracket 158 is driven and caused to slide by the pneumatic cylinder 162 fixed at the bracket 136.

In this embodiment, two sets of the nut runner mechanism 121 for the trunk, the second screw position detection mechanism 129 and the trunk position compensation mechanism 130, etc., which have been so composed as shown in the above, are arranged (Refer to FIG. 25) and are mounted on the base 45. The base 45 is supported on the arm 13 and is driven and caused to slide in the Z direction by the motor 46. Therefore, it is possible to position the nut runners 121 and 121 for the trunk in the X, Y and Z directions by means of the motors 46, 150 and 154 under such a condition as to be independent from the opening and closing mechanism 4 and the holding mechanism 5.

Also, in this embodiment, the nut runners 121 and 121 for the trunk are mounted on the common base 45 by way of the trunk position compensation mechanism 130 and 130. However, it may be possible that the runners 121 and 121 for the trunk can be caused to slide independently by providing two sets of the corresponding bases 45.

Figure 25:
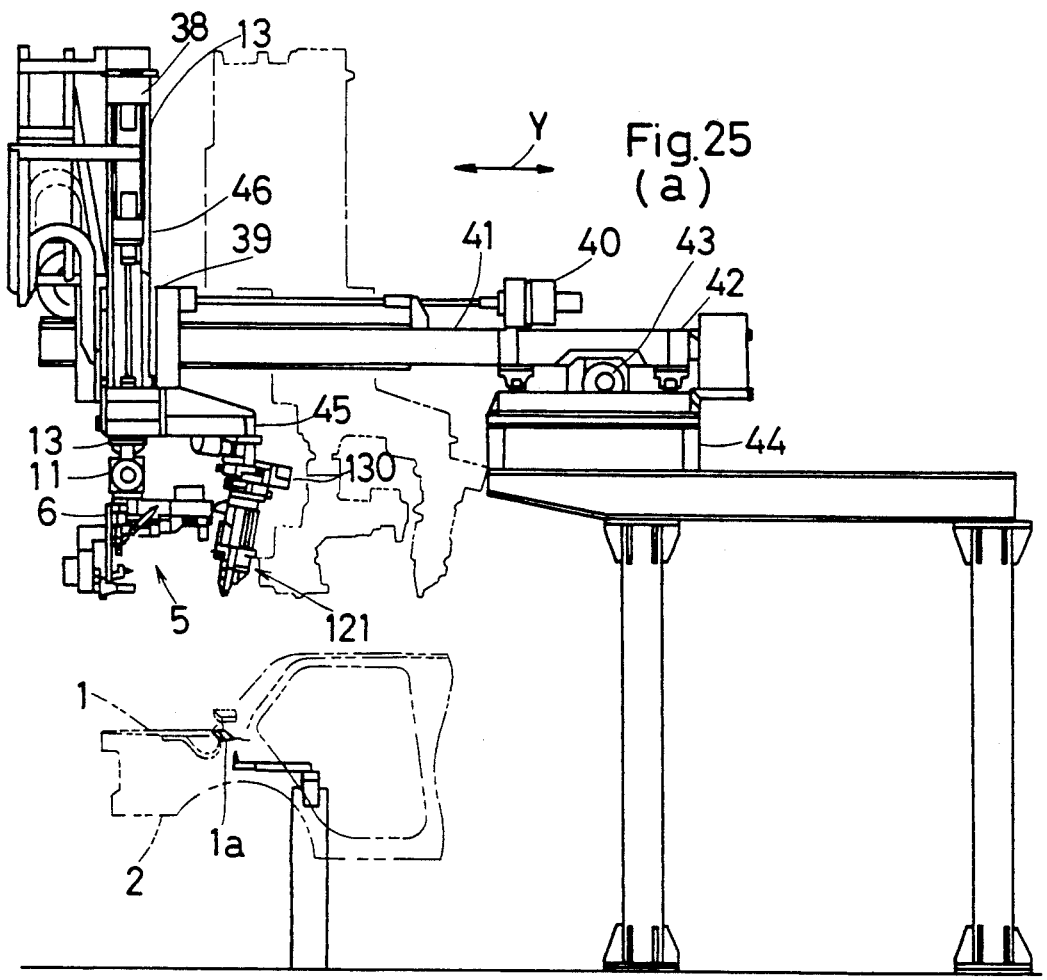
FIG. 25 shows the structure of the attaching and detaching apparatus for trunks pertaining to one of the embodiments of the invention.
Figure 25:
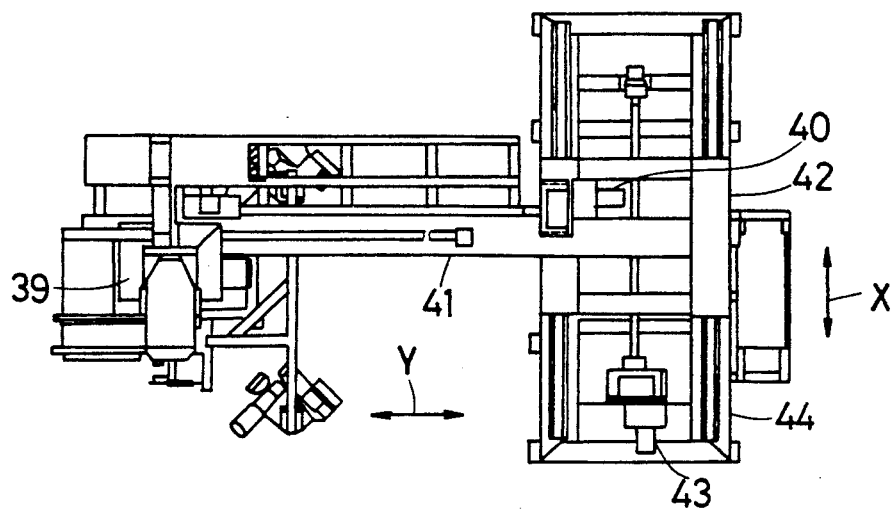

In the trunk attaching and detaching apparatus according to this embodiment, as shown in FIG. 25, two sets of hinge supporting devices 231 which support the hinges 1a so that they can not be swung downwards when the bolt 102 is automatically tightened and loosened by the nut runner 121 are provided.

In the case the hinge 1a, due to friction of the rotary portions, does not swing downwards with such a pushing force as may be produced on conducting the tightening and loosening work of the bolt 102 (the hinge 1a of the trunk 1 is comparatively tight and is apt to hardly swing immediately after a vehicle is assembled on the assembly line), the hinge supporting device 231 may be omitted.

As shown in FIG. 25, in the hinge supporting device 231, the contacting member 234 which is brought into contact with the underside of the hinge 1a is supported by the arm 235 and is elastically energy-charged upwards by the coil spring (not illustrated) at all times. The contacting member 234 is for controlling downward swinging (the advancing direction of screwing in the bolt) of the corresponding hinge 1a by pushing the hinge 1a in the direction opposite to the advancing direction on screwing in the bolt 102 at all times when automatically tightening and loosening the bolt 102, by which the hinge 1a is fixed to the vehicle body frame 2 by using the nut runner 121 for the trunk, as pushing the corresponding bolt 102 in the advancing direction (downward) on screwing the bolt 102.

The arm 235 is swingably supported on the horizontal plane for the base 240 and is driven and caused to swing by a rotary actuator 243 in the range controlled by a stopper (not illustrated) attached on the corresponding base 240. When the arm 235 is brought into contact with one stopper, the contacting member 234 enters the waiting status. And when the arm 235 is brought into contact with the other stopper, the contacting member 234 is caused to move to the position corresponding to the underside of the hinge 1a. Also, at this time, the contacting member 234 is inserted in the vehicle body frame 2 through the clearance for mounting the rear door of the vehicle body frame.

The base 240 is supported in an elevated manner by the elevation guide posts 245 and 245 which are mounted at the stand 244 and the base 240 is elevated and lowered by the cylinder 246.

The two-stage change stopper 247 is slidably supported on the upperside of the stand 244, and the two-stage change stoppers 247 are driven and caused to slide by a cylinder 248. When the two-stage change stopper 247 are driven and caused to slide and the engagement between the corresponding stopper 247 and the base 240 is cancelled, the arm 235 and the contacting member 234 which are supported by the base 240 are elevated up to the highest position. Under this condition, the contacting member 234 is brought into contact with the underside of the hinge 1a and pushes the corresponding hinge 1a upwards, thereby causing the swinging of the hinge 1a to be controlled.

On the other hand, when the stopper 247 is driven and caused to slide and it becomes possible for the corresponding stopper 247 to be engaged with the base 240, the contacting member 234 and the arm 235 are elevated up to the lower position by the cylinder 246. This state is applicable when the trunk 1 is drawn out from the vehicle body frame 2 together with the hinge 1a and, for instance, attached to the parts carrier for painting (The attaching position of the trunk 1 onto the parts carrier is set to be lower than the attaching position for the vehicle body frame 2).

The trunk attaching and detaching apparatus according to this embodiment is so composed as described above.

Figure 28:
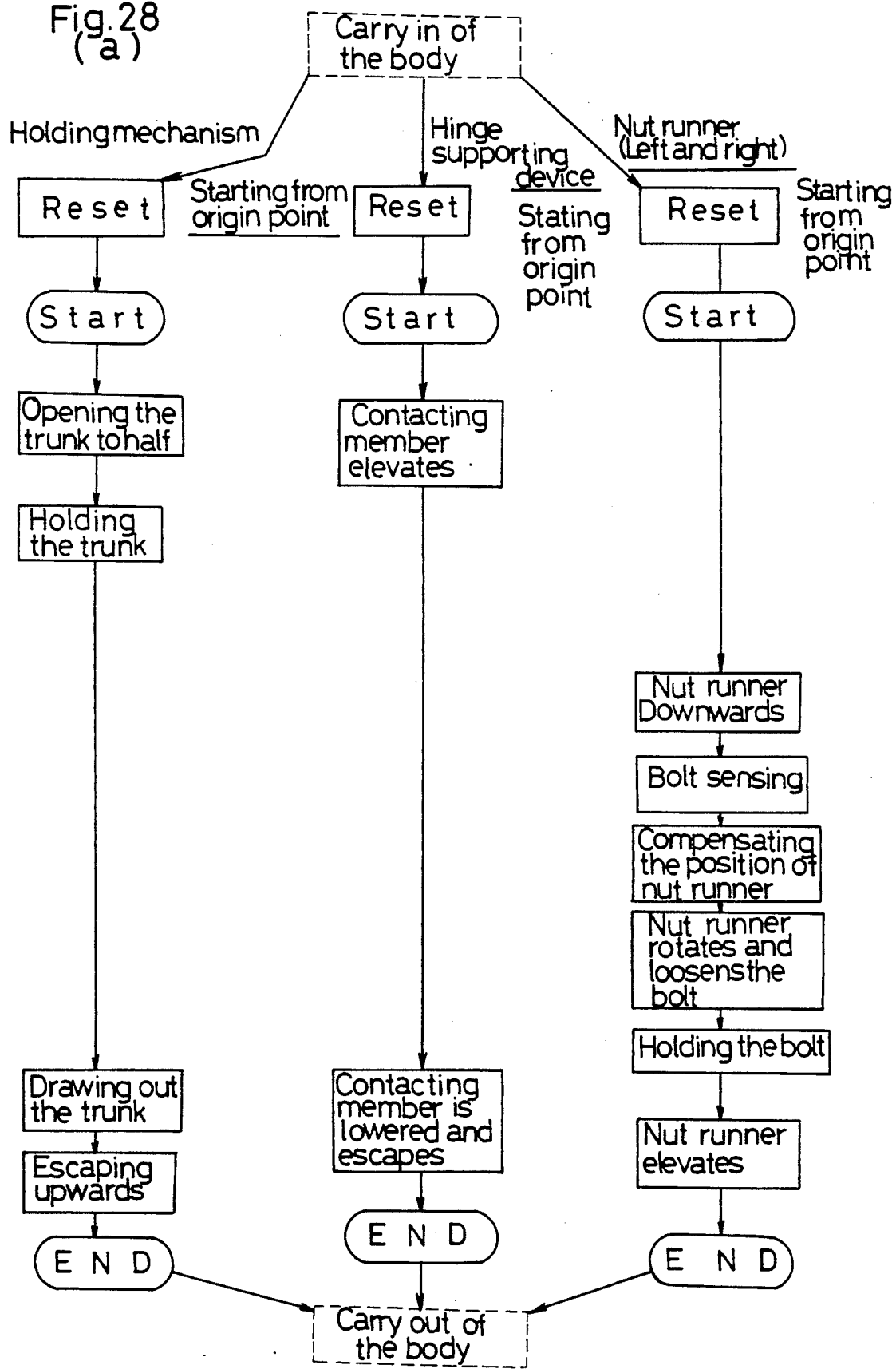
Figure 28:
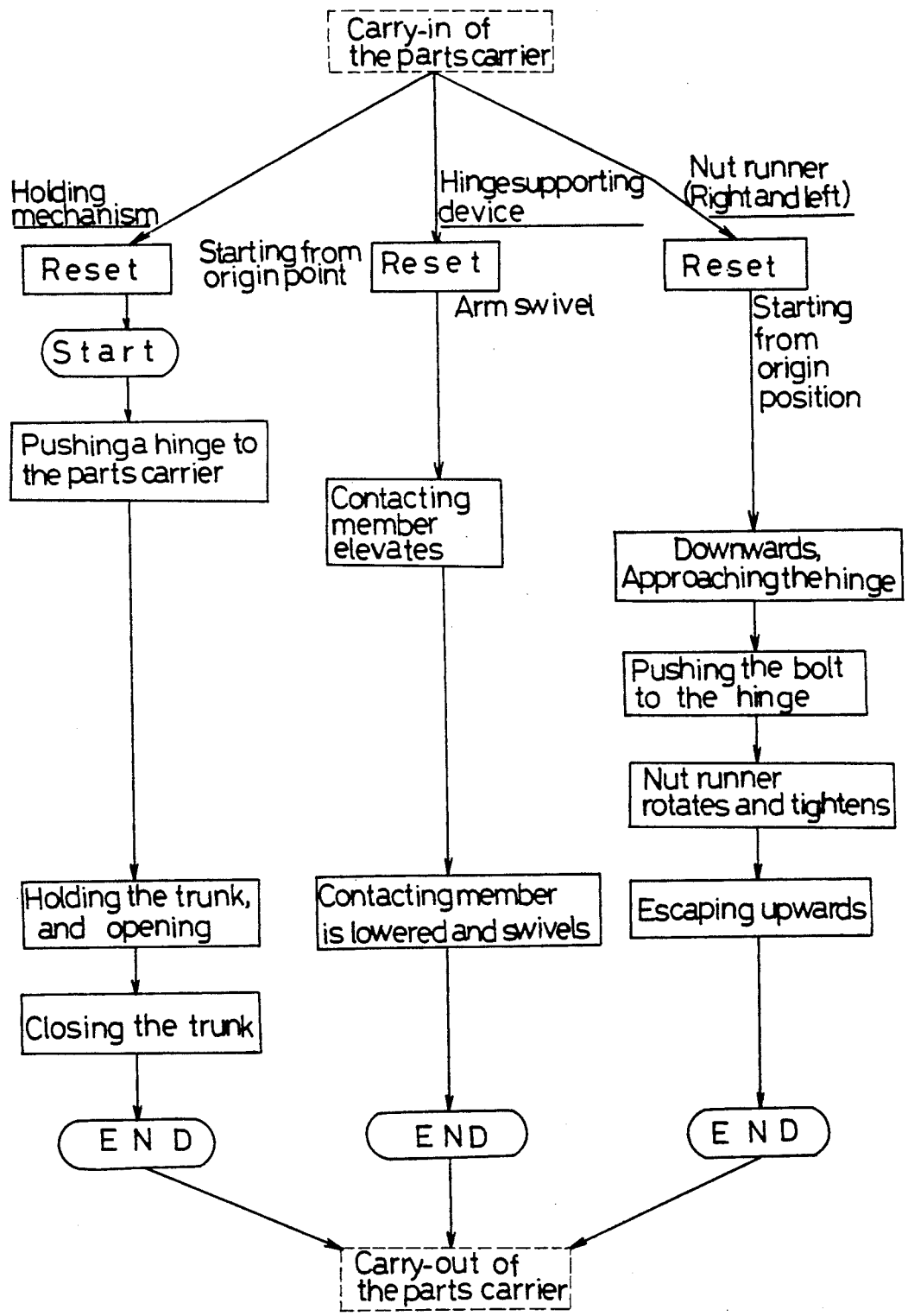
Figure 29:
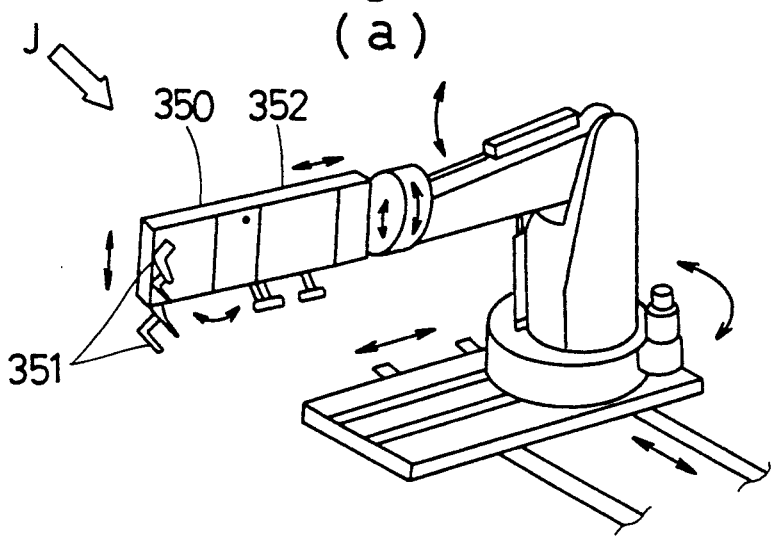
FIG. 29 shows a rough structure of one of the examples of the conventional attaching and detaching apparatus for exterior members for vehicles.
Figure 29:
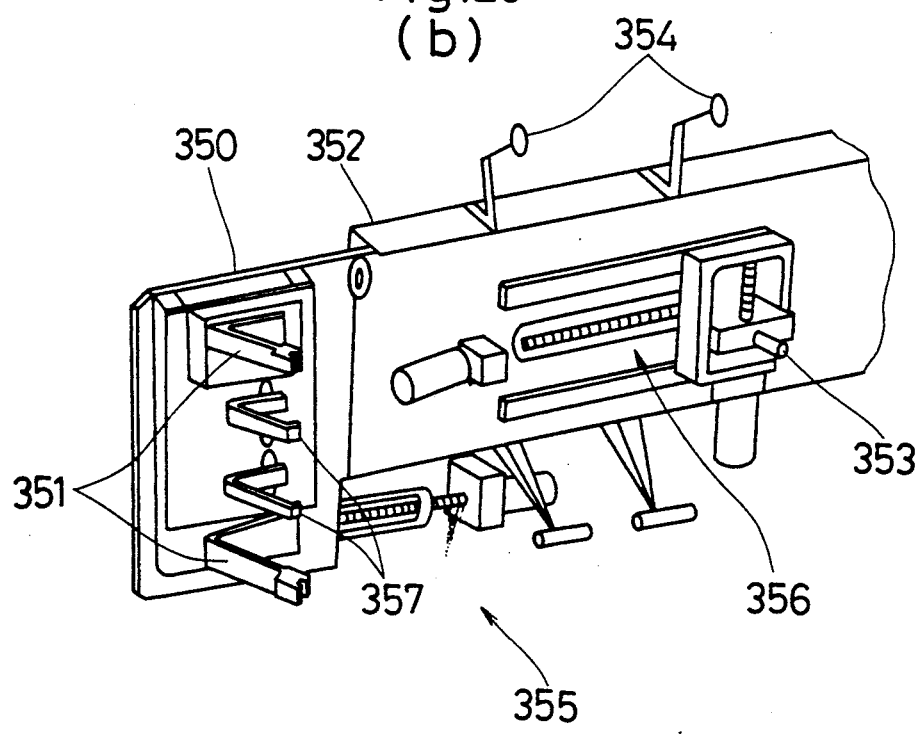

Successively, the ensuing description explains the procedure in the case that a trunk 1 is removed from the vehicle body frame and is attached to the parts carrier (not illustrated) for painting with reference to FIGS. 28(a) and (b).

In the case that a trunk 1 is disassembled from a vehicle body frame 2 (Refer to FIG. 28(a)), firstly the trunk opening and closing mechanism 4, the trunk holding mechanism 5 and the nut runner 121 for the trunk are positioned at the appointed position taught in advance, by driving the motors 38, 40 and 43 for the vehicle body frame 2 transferred to an appointed position of the assembling line. So, the arm 7 is driven and caused to swing by contraction of the cylinder 8 of the trunk opening and closing mechanism 4, thereby causing the opening and closing claw 9 to be inserted in the clearance formed between the rear lower end portion of the trunk 1 and the vehicle body frame. The opening and closing claw 9 is brought into contact with the rear lower end portion of the trunk 1 by contraction of the cylinder 10.

Thereafter, the frame 6 is driven and caused to rotate in the direction of an arrow 12 in FIG. 27 by means of the motor 11, and simultaneously the arm 13 is driven and caused to move on the appointed locus by means of the motors 38 and 40, thereby causing the trunk to be opened by the appointed angle, centering around the hinge 1a.

At the same time, the contacting member 234 of the hinge supporting device 231 is driven and caused to swing by the rotary actuator 243 and is caused to be positioned at the appointed position which is lower than the hinge 1a which supports the trunk 1.

After that, as the contacting member 234 is elevated by the cylinder 246 and is brought into contact with the underside of the hinge 1a, thereby causing the corresponding hinge 1a to be pushed upwards and the swinging of the corresponding hinge 1a to be controlled.

As the brake 26 of the trunk holding mechanism 5 is released for the trunk opened by the appointed angle as shown in the above and the cylinder 23 is operated in the direction of contraction at the same time, the holding claws 14 and 15 are supported by repsective slide bearings 19 and 22 and operated in the closing direction. As either one of the holding claws 14 or 15 is brought into contact with the leading edge portion 1b or the rear end portion 1c of the trunk 1 and the action comes to a stop, only the holding claw 14 or 15 which is not in contact with the corresponding trunk 1 yet is caused to move further in the closing direction.

As the other holding claw 14 or 15 is brought into contact with the front end portion 1b or the rear end portion 1c of the trunk 1, the trunk 1 is held by the holding claws 14 and 15. Namely, the corresponding cylinder 23 also moves in the closing direction in accompanying with the closing action of the corresponding holding claws 14 and 15 by making the closing action of the holding claws 14 and 15 by means of the cylinder 23, and the corresponding trunk 1 is held by the holding claws 14 and 15 at the position following the trunk 1. After that, the relative position of the holding claws 14 and 15 for the trunk 1 is maintained.

Successively, as the brake 36 is released and the cylinder 33 is operated in the direction of contraction, the holding claws 16 and 17 are supported by the slide bearings 29 and 32, respectively, and are caused to move in the closing direction. As either one of the holding claw 16 or 17 is brought into contact with one side portion 1d or the other side portion 1d of the trunk 1 and the action comes to a stop, the holding claw 16 or 17 which is not in contact with the trunk 1 yet moves further in the closing direction.

As the other holding claw 16 or 17 is brought into contact with one side portion 1d or the other side portion 1d of the trunk, the side portions 1d and 1d of the trunk 1 are held by the holding claws 16 and 17. Namely, the cylinder 33 moves in the closing direction in accompanying with the closing action of the holding claws 16 and 17 by making the closing action of the holding claws 16 and 17 by means of the cylinder 33, the trunk 1 is held by the holding claws 16 and 17 at the position, following the side portions 1d and 1d of the trunk 1. Thereafter, the relative position of the holding claws 16 and 17 for the side portions 1d and 1d of the trunk 1 is maintained.

After that, the bolt 102 for fixing the hinge 1a by which the trunk 1 is openably supported for the vehicle body frame 2 can be automatically loosened by the nut runner 121 for the trunk.

The nut runner 121 for the trunk is driven and lowered at the appointed position taught in advance by means of the motor 46.

After that, the detection member 138 is further driven and lowered (in the direction of Z axis) by the pneumatic cylinder 147 and is driven and caused to move to the position corresponding to the upper portion of the head portion 102a of the bolt 102, which is downwards of the socket 122, by the pneumatic cylinder 144.

Furthermore, the detection member 138 is driven and lowered to the position where the head portion 102a can be idly inserted, by means of the pneumatic cylinder 147. Then, the detection member 138 is driven and caused to move in the X and Y directions by means of the pneumatic cylinders 141 and 144. The travelling distance until the detection member 138 is brought into contact with the side of the head portion 102a is detected by the potentiometers 142 and 145, respectively, thereby causing the amount of compensating the position of the bolt 102 for the socket 122 to be detected.

As the position compensating amount of the bolt is detected by the above procedure, the position of the bolt 102 is calculated together with the position compensating amount, and these values are memorized in the memory 112. Also, the detection member 138 escapes from the head portion 102a of the bolt 102 by that the pneumatic cylinders 144 and 147 are driven.

The motors 150 and 154 are driven and caused to rotate according to the position compensating amount of the socket 122 for the head portion 102a of the bolt 102 detected by the potentiometers 142 and 145, thereby causing the position of the socket 122 for the head portion 102a of the bolt 102 to be compensated.

After that, the socket 122 is further driven and lowered by the motor 46 and is placed in the head portion 102a, thereby causing the loosening action of the bolt 102 to be effected.

When the bolt 102 is loosened according to the above procedure and can be separated, the holding claw 156 is driven and lowered by the pneumatic cylinder 162 and is driven and caused to move forward up to the position where the threaded portion of the bolt 102 can be held. After that, the holding claw 156 is closed by the actuator 157, thereby causing the bolt 102 to be held by the holding claw 156.

The nut runner 121 for the trunk returns to the origin position with the bolt 102 held by the holding claw 156.

Simultaneously, the hinge supporting device 231 is caused to return to the origin position, and the trunk holding mechanism 5 which holds the trunk 1 escapes upwards together with the trunk opening and closing mechanism 4, the nut runner 121 for the trunk, etc.

Thereafter, the vehicle body frame 2 is taken out.

In the case that the trunk 1 is attached to the vehicle body frame again, as the position of the bolt 102 is memorized by the memory means 112, the bolt 102 can be accurately screwed in this position.

Also, until the bolt 102 which is in a separatable condition is screwed in again, the bolt 102 is held by the holding claw 156. Therefore, an operator is freed from any troublesomeness of managing this bolt 102.

Successively, the following description explains the procedure for attaching the trunk 1 to the part carrier for painting with reference to FIG. 28(b). The procedure of this case is almost reverse of the procedure for removing the trunk from a vehicle body frame.

For the outline of the procedure, the parts carrier is taken in the appointed position on the assembly line.

So, the motors 38, 40 and 43 are driven, the trunk opening and closing mechanism 4, the trunk holding mechanism 5 and the nut runner 121 for the trunk are positioned at the appointed position taught in advance.

Thereafter, the hinge 1a is pushed and brought into contact with the parts carrier, the contacting member 234 of the hinge supporting device 231 is driven and caused to swivel and go upwards, thereby causing the corresponding hinge 1a to be pushed.

Successively, the nut runner 121 is driven and lowered and is positioned at the appointed position taught in advance. After that, the bolt 102 is pushed and the socket is rotated, thereby causing the bolt 102 to be screwed in the parts carrier through the hinge 1a.

Thus, the trunk 1 is attached to the parts carrier.

Thereafter, the trunk holding mechanism 5 opens the trunk 1, the contacting member 234 of the hinge supporting mechanism 231 is lowered and caused to swivel, thereby causing the nut runner 121 for the trunk to escape upwards.

After that, the trunk 1 is closed by the trunk opening and closing mechanism 4, thereby causing the parts carrier to be taken out.

Successively, in this embodiment, the trunk attached to a vehicle body frame through real parts matching is opened and the trunk 1 is held. At the same time, the corresponding bolt 102 can be automatically tightened and loosened according to the position of the bolt 102.

In other words, it is not necessary to accurately position the vehicle body frame 2.

Also, this embodiment is also applicable to a bonnet (not illustrated) of which attaching structure is the same as that of the trunk.

What is claimed is:

1. An apparatus for attaching and detaching a trunk or a hood to and from a vehicle body, wherein said trunk or hood is mounted to the vehicle body by means of a hinge mechanism which is fixed to the vehicle body with screw members, the apparatus comprising:
   opening and closing means for opening and closing a trunk or a hood of a vehicle body;
   holding means for holding said trunk or hood after said trunk or hood is opened by said opening and closing means, said holding means comprising holding members slidably disposed on opposite sides of a base plate and driving means positioned on the base plate for moving said holding members in a direction toward a front end portion, a rear end portion and side portions of said opened trunk or hood for holding said opened trunk or hood;
   screw position detection means for detecting the position of the screw members in the vehicle body; and
   nut runner means for tightening and loosening said screw members, the position of the nut runner means being adjusted in response to the position of each screw member detected by the screw position detection means.

* * * * *